United States Patent
Search et al.

(10) Patent No.: US 12,196,352 B2
(45) Date of Patent: *Jan. 14, 2025

(54) QUICK CONNECT COUPLING DEVICES FOR FLUID CARRIERS

(71) Applicants: Collin Danis Search, Kennett Square, PA (US); John Danis Search, Kennett Square, PA (US)

(72) Inventors: Collin Danis Search, Kennett Square, PA (US); John Danis Search, Kennett Square, PA (US); David E. Yaeger, Telford, PA (US)

(73) Assignees: Collin Danis Search, Kennett Square, PA (US); John Danis Search, Kennett Square, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/239,345

(22) Filed: Aug. 29, 2023

(65) Prior Publication Data

US 2023/0400132 A1    Dec. 14, 2023

Related U.S. Application Data

(63) Continuation of application No. 17/519,687, filed on Nov. 5, 2021, now Pat. No. 11,746,941, which is a
(Continued)

(51) Int. Cl.
*F16L 37/096*    (2006.01)
*F16L 37/098*    (2006.01)

(52) U.S. Cl.
CPC ......... *F16L 37/096* (2013.01); *F16L 37/0982* (2013.01)

(58) Field of Classification Search
CPC . F16L 37/096; F16L 37/0982; F16L 37/1215; F16L 37/138; F16L 37/098
See application file for complete search history.

(56) References Cited

U.S. PATENT DOCUMENTS

| 946,935 A | * | 1/1910 | Clay | F16L 37/096 |
| | | | | 285/320 |
| 1,104,955 A | * | 7/1914 | Bellows | F16L 37/096 |
| | | | | 285/332.3 |

(Continued)

FOREIGN PATENT DOCUMENTS

| CH | 278093 A | 9/1951 |
| DE | 936069 C | 12/1955 |

(Continued)

*Primary Examiner* — David Bochna
*Assistant Examiner* — James A Linford
(74) *Attorney, Agent, or Firm* — Caesar Rivise, PC

(57) ABSTRACT

A coupling device includes an engagement surface, a gasket ring, a clamp assembly, and a locking assembly. The coupling device is configured so that the clamp assembly can be actuated to mount the coupling device on the bib. The gasket ring is configured to be compressed between the engagement surface and the bib to enable liquid to flow from the bib into the coupling device and out of it into the hose or other component without leakage. The locking assembly is configured to lock the coupling device on the bib, but is releasable when desired to dismount the coupling device from the bib.

20 Claims, 31 Drawing Sheets

Related U.S. Application Data continuation-in-part of application No. 16/923,536, filed on Jul. 8, 2020, now abandoned.

(60) Provisional application No. 62/872,413, filed on Jul. 10, 2019.

(56) References Cited

U.S. PATENT DOCUMENTS

| | | | |
|---|---|---|---|
| 1,505,722 A * | 8/1924 | Merz | F16L 37/1215 |
| | | | 285/379 |
| 2,327,714 A | 8/1943 | Iftiger | |
| 2,789,838 A | 4/1957 | Palm | |
| 4,443,028 A | 4/1984 | Hayes | |
| 4,660,803 A | 4/1987 | Johnston et al. | |
| 5,439,258 A | 8/1995 | Yates | |
| 5,503,437 A | 4/1996 | Cronley | |
| 5,649,723 A | 7/1997 | Larsson | |
| 6,325,425 B1 | 12/2001 | Kierath et al. | |
| 6,786,516 B2 | 9/2004 | Cronley | |
| 7,270,350 B2 | 9/2007 | Cronley | |
| 2015/0069755 A1 | 3/2015 | Bull | |

FOREIGN PATENT DOCUMENTS

| | | |
|---|---|---|
| FR | 360241 A | 4/1906 |
| FR | 2689205 A1 | 10/1993 |
| WO | 9508734 A1 | 3/1995 |
| WO | 2004005786 A1 | 1/2004 |

* cited by examiner

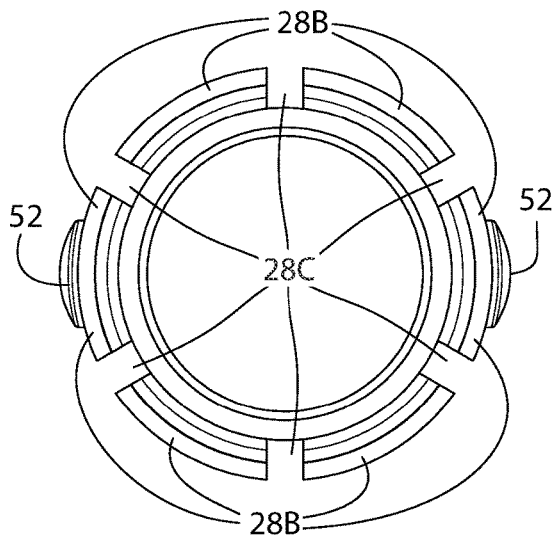
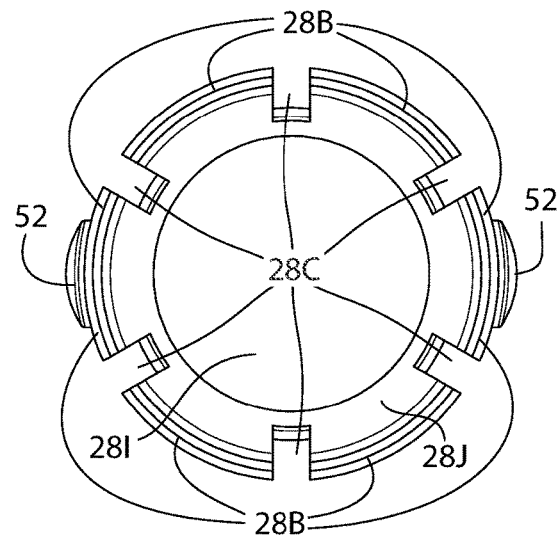
FIG. 8A  FIG. 8B
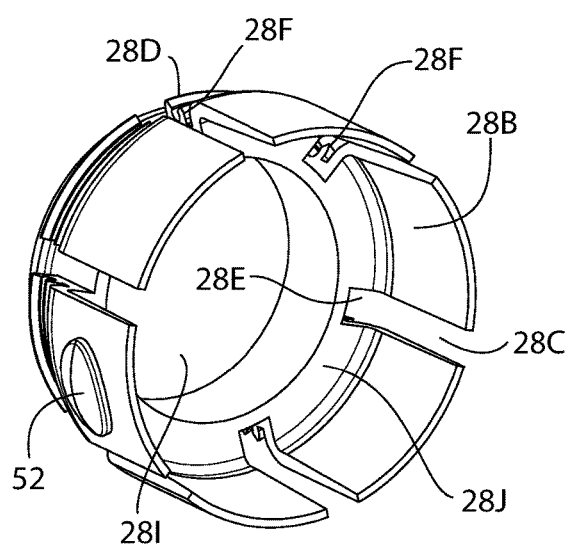
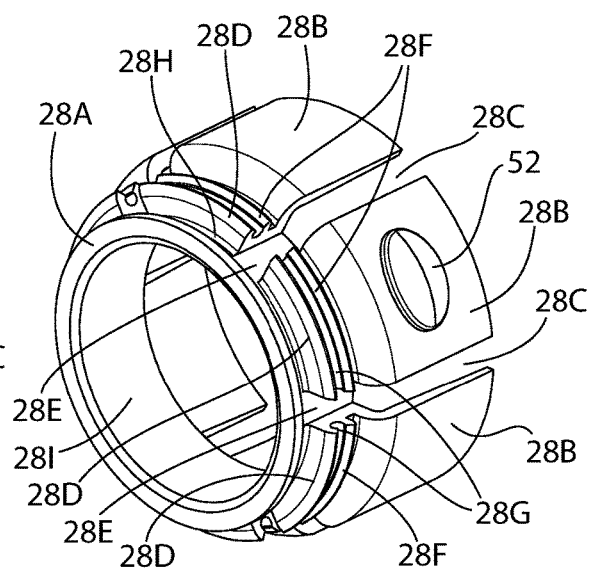
FIG. 8C  FIG. 8D
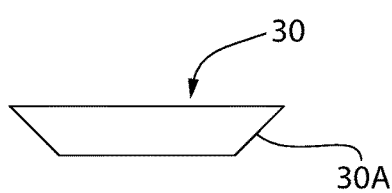
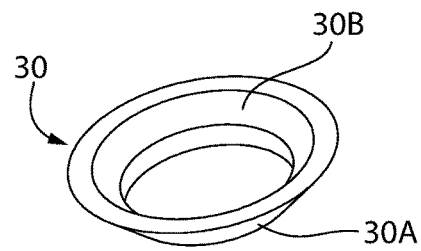
FIG. 9A  FIG. 9B

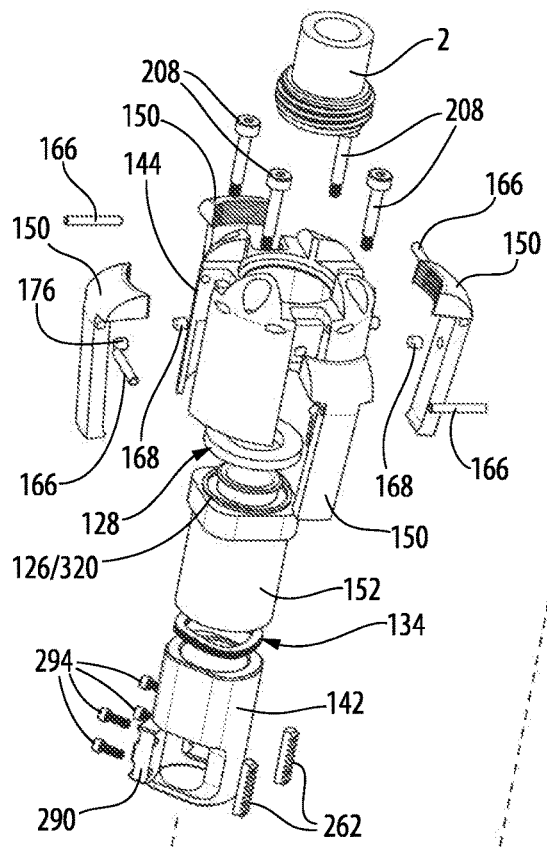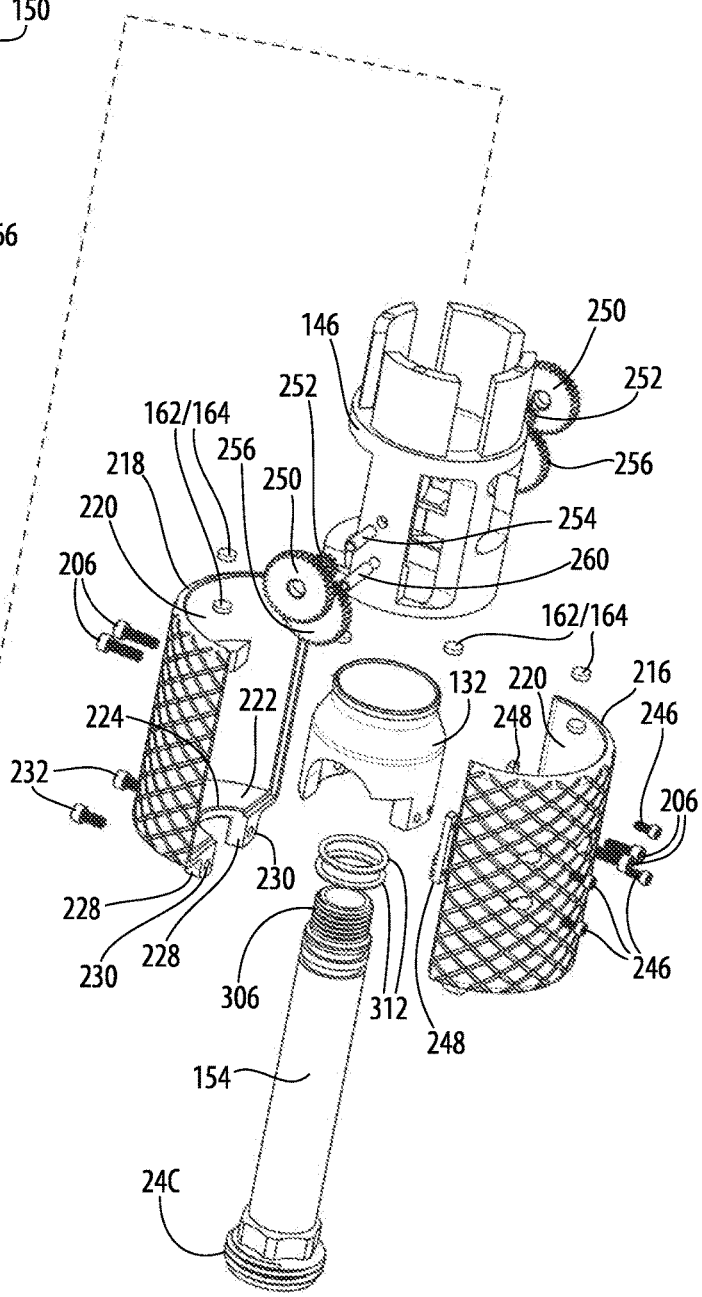
FIG. 22

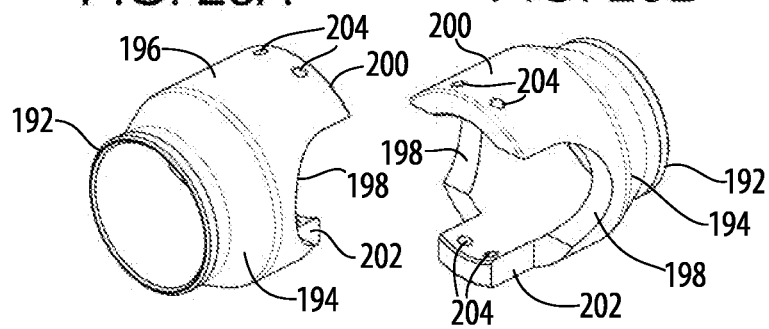

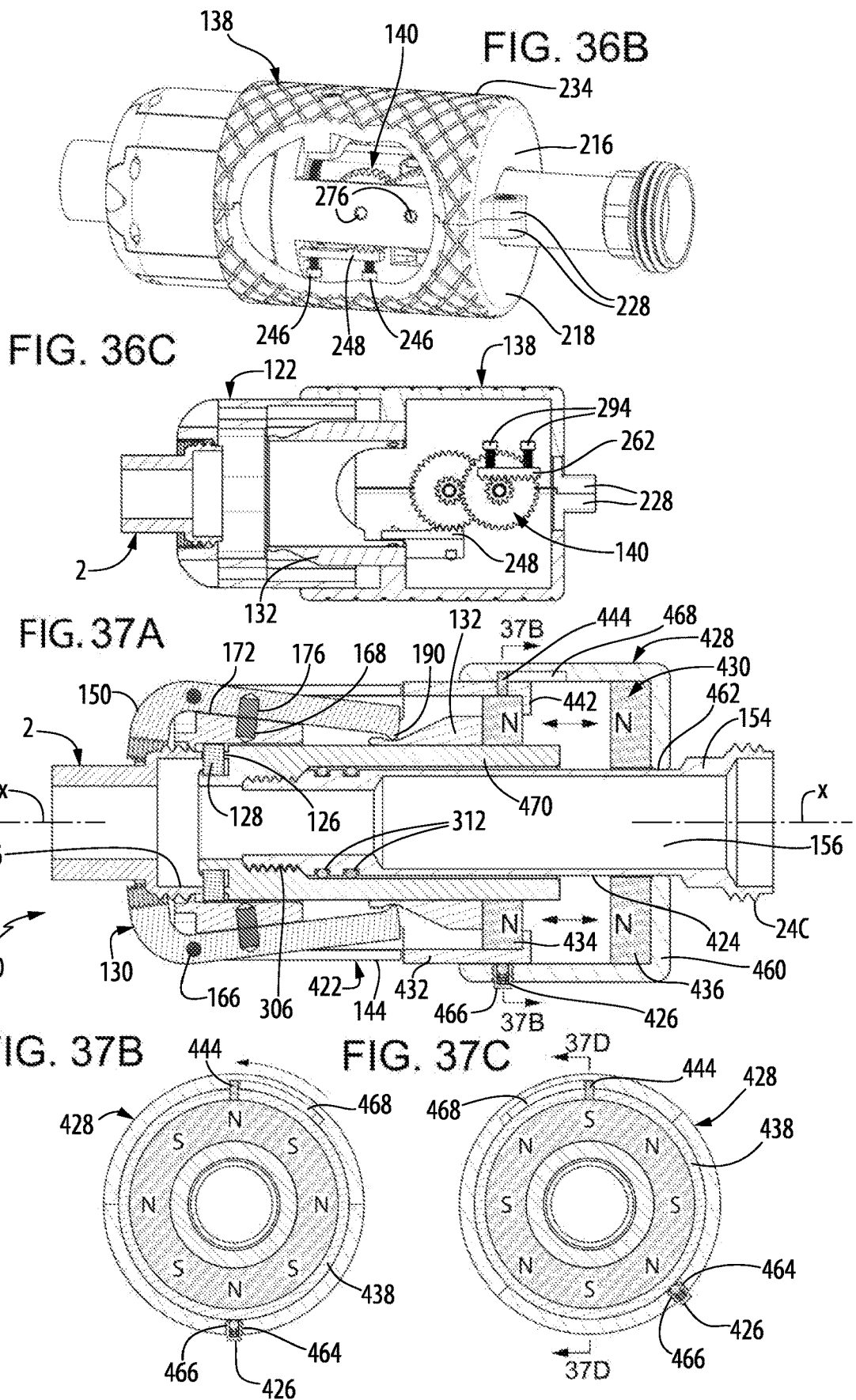

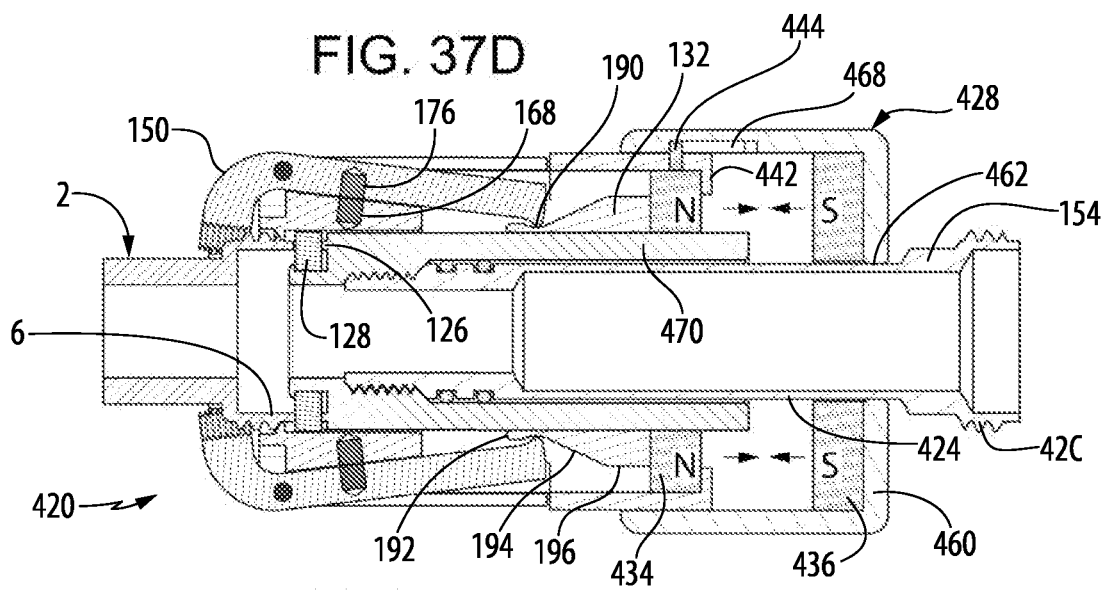
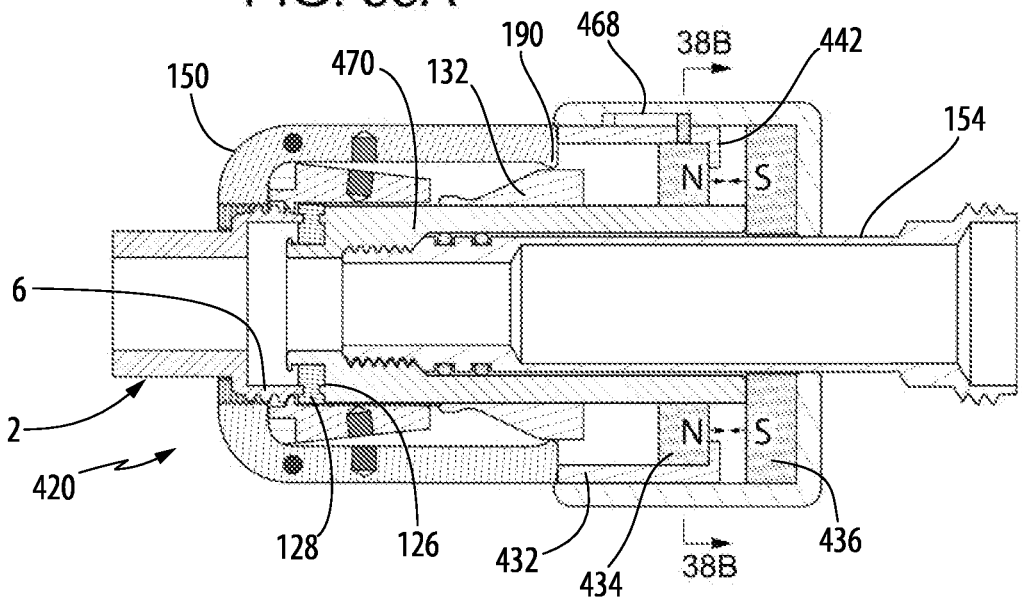
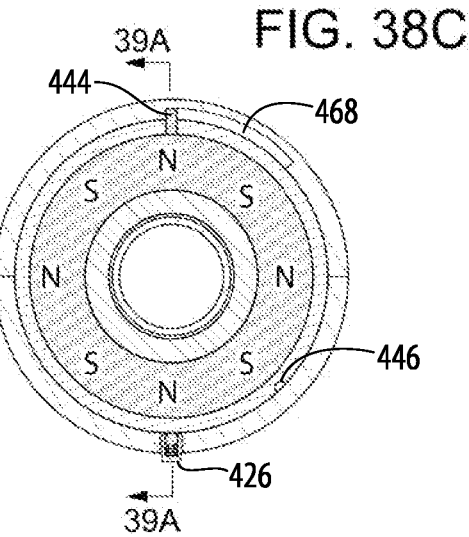

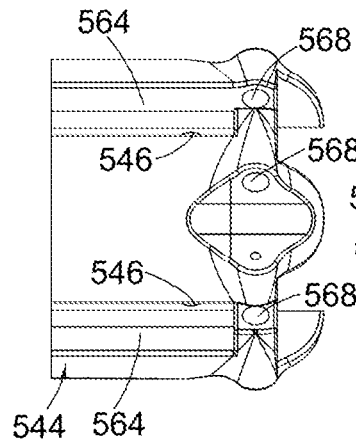
FIG. 47
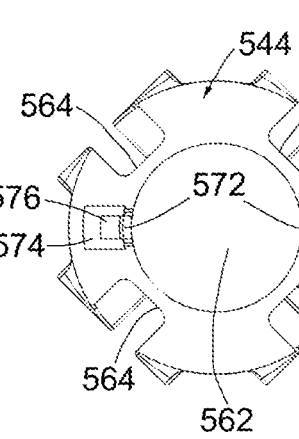
FIG. 48
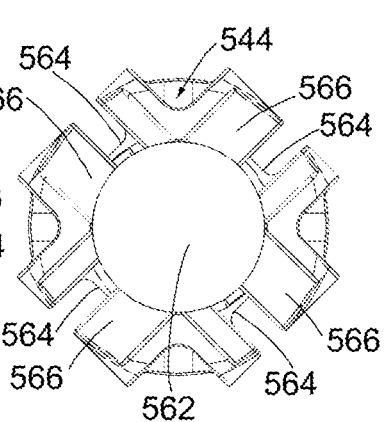
FIG. 49
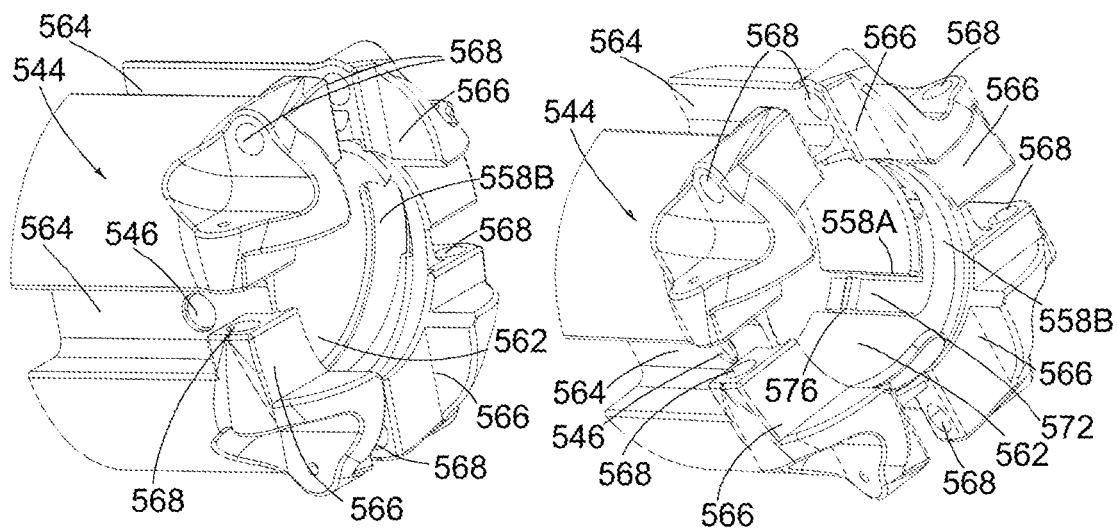
FIG. 50A
FIG. 50B
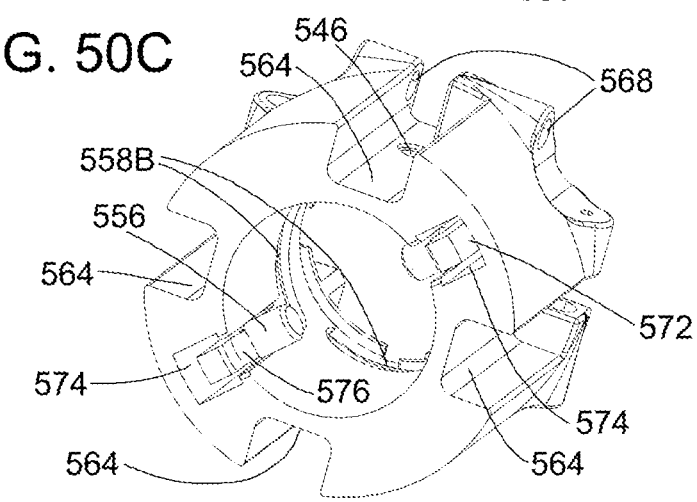
FIG. 50C FIG. 50D 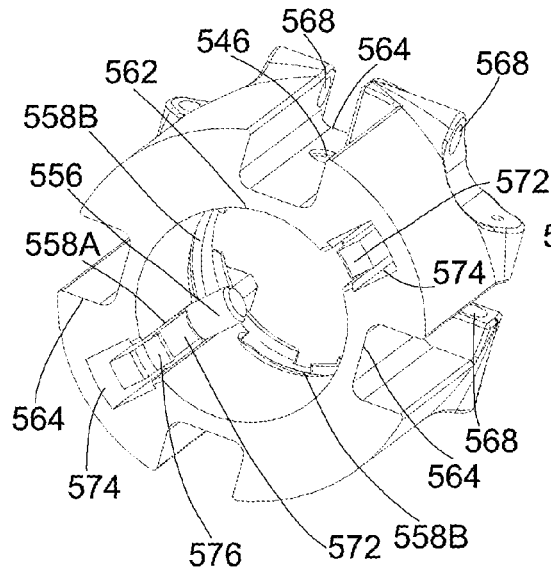 FIG. 50E 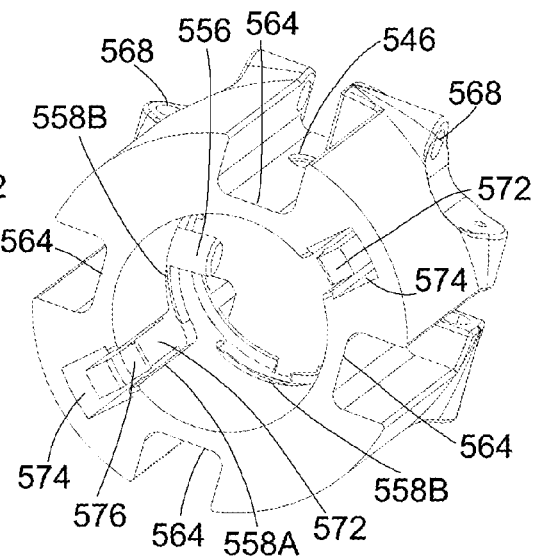
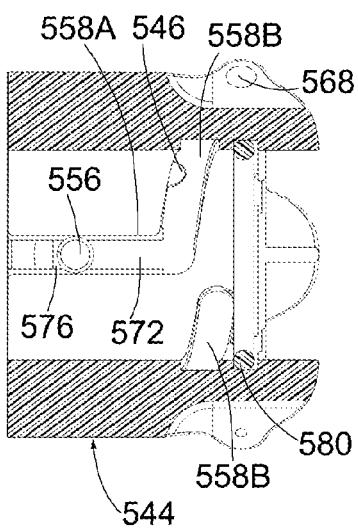 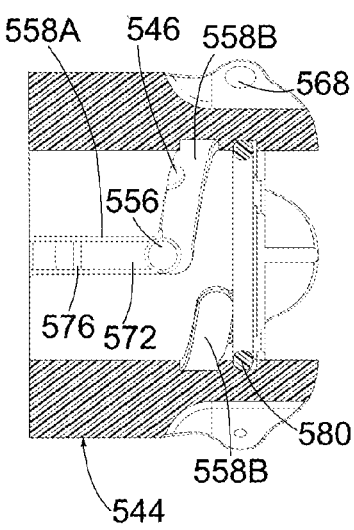 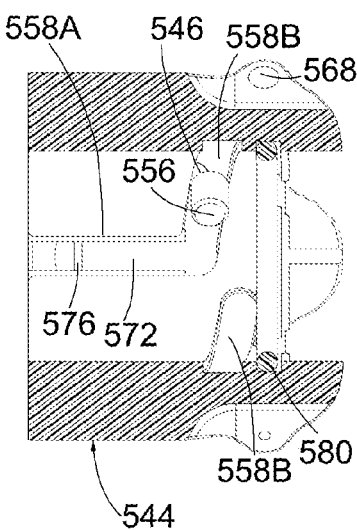
FIG. 51A  FIG. 51B  FIG. 51C

QUICK CONNECT COUPLING DEVICES FOR FLUID CARRIERS

CROSS-REFERENCE TO RELATED APPLICATIONS

This application is a Continuation of U.S. patent application Ser. No. 17/519,687, filed on Nov. 5, 2021, entitled Quick Connect Coupling Devices for Fluid Carriers, which in turn is a Continuation-in-Part of U.S. patent application Ser. No. 16/923,536, filed on Jul. 8, 2020, entitled Quick Connect Coupling Devices For Fluid Carriers, which claims priority under 35 U.S.C. § 119(e) from Provisional Application Ser. No. 62/872,413, filed on Jul. 10, 2019, entitled Quick Connect Coupling Device For Use With Hoses And Hoses Including Quick Connect Coupling Device, the entire disclosures of which applications are specifically incorporated by reference herein.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISK

Not Applicable

FIELD OF THE INVENTION

This invention relates generally to couplings for hoses and other carriers of flowable materials, e.g., liquids, and more particularly to quick connect coupling devices for garden hoses and other types of hoses and other carriers of flowable materials.

Numerous couplers or connectors for connecting the end of a hose, such as a garden hose, to an externally threaded bib or spout of a faucet are commercially available. For example, many prior art hoses include connectors in the form of an internally threaded female component secured to the end of the hose and which female member is adapted to be screwed onto the externally threaded spout of the faucet. Such a connector is typically made of a metal, e.g., brass, which will not corrode when the connector is left out of doors and subjected to the ambient weather. One particular drawback of such a connector is that it may be somewhat difficult to connect to the externally threaded spout of the faucet by persons having limited manual dexterity, e.g., aged or infirm persons suffering from arthritis or other conditions which make it difficult to screw the connectors together. Another drawback of such prior art connectors is that they typically require use of a resilient material washer or gasket to form a water-tight interface between the connector and the threaded spout of the faucet when the connector is screwed thereon. Such washers wear out or are lost, thereby subjecting the connection to water leakage at the interface. Another disadvantage of some prior art connectors is the fact that they are comprised of multiple pieces that may get separated, lost or broken rendering the connector useless.

Various quick connect couplers have been disclosed in the patent literature to enable the quick coupling of a hose to the spout of a faucet to overcome some of the disadvantages of the prior art. Examples of such devices are shown in U.S. Pat. No. 4,443,028 (Hayes), U.S. Pat. No. 4,660,803 (Johnston et al.), U.S. Pat. No. 5,503,437 (Cronley), U.S. Pat. No. 5,649,723 (Larsson), U.S. Pat. No. 6,325,425 (Kierath et al.), U.S. Pat. No. 6,786,516 (Cronley), and U.S. Pat. No. 7,270,350 (Cronley).

In our U.S. Pat. No. 10,619,777, whose disclosure is incorporated by reference herein, there is disclosed and claimed coupling devices for mounting on a faucet, hose valve, or bib to enable a garden hose or other hose to be releasably connected thereto and which overcomes the disadvantages of the prior art.

While the invention of our aforementioned patent is generally suitable for its intended purposes, it still leaves something to be desired from the standpoints of compactness, simplicity of construction, effectiveness and ease of use. The subject invention addresses those needs.

SUMMARY OF THE INVENTION

In accordance with one aspect of this invention a coupling device is provided for releasably securing a first liquid-carrier to a second liquid-carrier. The second liquid-carrier comprises one of a faucet or a hose and has a cylindrical end portion terminating in a free end surface. The coupling device comprises a housing, an engagement surface, a plunger, a gasket ring, a clamp assembly and a locking assembly. The housing has a hollow interior configured from receipt of the end portion of the second-liquid carrier. The hollow interior has a longitudinal axis. The engagement surface is located within the hollow interior. The plunger is also located within the hollow interior and has an inner end portion to which the engagement surface is coupled and an outer end portion. The plunger has a passageway extending therethrough between the inner end portion and the outer end portion. The outer end portion is configured for releasable or fixed securement to the first liquid-carrier. The plunger is movable along the longitudinal axis. The gasket ring is located within the hollow interior centered on the longitudinal axis and coupled to the inner end of the plunger. The gasket ring is interposed between the free end surface of the second liquid-carrier and the engagement surface. The clamp assembly includes plural movable members configured for movement with respect to the longitudinal axis from an open position to a closed position to tightly engage the cylindrical portion of the second liquid-carrier to releasably secure the coupling device thereto. The locking assembly is configured for releasably locking the plunger in a locked position and in an unlocked position. The sealing gasket is tightly interposed between the free end surface of the second liquid carrier and the engagement surface when the locking assembly is in the locked position, thereby resulting in the formation of a fluid-tight seal between the free end surface of the second liquid carrier and the engagement surface. The plural movable members of the clamp assembly are configured to be in the open position and released from engagement with the cylindrical portion of the second liquid-carrier when the locking assembly is in the unlocked position.

In accordance with one preferred aspect of the coupling device of this invention the plural movable members are pivotable between the open position and the closed position and vice versa.

In accordance with another preferred aspect of the coupling device of this invention, the coupling device additionally comprising a handle coupled to said housing and slidable along the longitudinal axis from a first position to a second position and vice versa.

In accordance with another preferred aspect of the coupling device of this invention, the plural movable members are pivotable between and open position and a closed position and wherein the coupling device additionally comprises a cam member coupled to the handle and slidable therewith to cause the plural moveable members to pivot to the closed position when the handle is slid along the longitudinal axis to the second position.

In accordance with another preferred aspect of the coupling device of this invention, the coupling device additionally comprises at least one magnet associated with the plural movable members to normally bias the plural movable members in the open position.

In accordance with another preferred aspect of the coupling device of this invention, the coupling device additionally comprises biasing means coupled to the handle for applying a biasing force to the engagement surface when the handle is slid along the longitudinal axis to the second position to cause the sealing gasket to be tightly interposed between the free end surface of the second liquid carrier and the engagement surface.

In accordance with another preferred aspect of the coupling device of this invention, the coupling device the biasing means comprises a spring or at least one wavy washer.

In accordance with another preferred aspect of the coupling device of this invention, the coupling device the biasing means comprises at least one magnet.

In accordance with another preferred aspect of the coupling device of this invention, the coupling device the at least one magnet comprises a polymagnet.

In accordance with another preferred aspect of the coupling device of this invention, the coupling device is configured so that sliding of the handle along the longitudinal axis from the first position to the second position requires an external force to be applied thereto, and wherein the coupling device additionally comprises a gear assembly coupled between the handle and the biasing means so that the external required is less than the biasing force.

In accordance with another preferred aspect of the coupling device of this invention, the locking assembly comprises at least one magnet configured to hold the handle in the second position.

In accordance with another preferred aspect of the coupling device of this invention, the locking assembly comprises at least one magnet configured to hold the handle in the second position.

In accordance with another preferred aspect of the coupling device of this invention, the plunger is configured to be moveable along the longitudinal axis from a first position to a second position, whereupon when the plunger is in the second position to locking assembly is in the locking position, and wherein the coupling device additionally comprises a detent mechanism configured for releasably holding the plunger in the second position.

In accordance with another preferred aspect of the coupling device of this invention, the gasket ring is elastomeric.

In accordance with another preferred aspect of the coupling device of this invention, the locking assembly is normally biased in the unlocked position.

In accordance with another preferred aspect of the coupling device of this invention, the cylindrical end portion of the second liquid-carrier includes an external tread and wherein the housing includes a stop surface configured to engage the external thread to align the free end surface with the gasket ring.

In accordance with another preferred aspect of the coupling device of this invention, the plural movable members are equidistantly spaced from one another about the longitudinal axis.

In accordance with another preferred aspect of the coupling device of this invention, the plural movable members comprise a serrated engagement surface for tightly engaging the cylindrical portion of the second liquid-carrier.

In accordance with another preferred aspect of the coupling device of this invention, the handle comprises plural sections connected together to form a member having a sidewall and an end wall. The end wall has an opening through which the outer end portion of the plunger passes.

In accordance with another preferred aspect of the coupling device of this invention, the engagement surface comprises an annular wall of substantially the same size and shape of the free end surface of the cylindrical end portion of the second liquid-carrier and is aligned therewith.

Another aspect of this invention constitutes a coupling device for releasably securing a first liquid-carrier to a second liquid-carrier, with the second liquid-carrier has a cylindrical end portion terminating in a free end surface. That coupling device, basically comprises a housing, a plunger, a gasket ring, a clamp assembly and a locking assembly. The housing has a hollow interior configured from receipt of the end portion of the second-liquid carrier. The hollow interior has a longitudinal axis. The plunger is located within the hollow interior and has an inner end portion, an outer end portion, and a passageway extending therethrough between the inner end portion and the outer end portion. The inner end portion includes an engagement surface. The outer end portion is configured for releasable or fixed securement to the first liquid-carrier. The plunger is movable relative to a first portion of the housing along the longitudinal axis. The gasket ring is located within the hollow interior centered on the longitudinal axis and coupled to the inner end of the plunger. The gasket ring is interposed between the free end surface of the second liquid-carrier and the engagement surface. The clamp assembly is located at the first portion of the housing and includes plural movable members configured for movement with respect to the longitudinal axis from an open state to a closed state to tightly engage the cylindrical portion of the second liquid-carrier to releasably secure the coupling device thereto. The locking assembly is configured for selectively releasably holding the plunger in an unlocked state, a locked state, in a locked and sealed state. The locking assembly is in the locked state and in the locked and sealed state when the plural movable members of the clamp assembly are in the closed state. The sealing gasket is tightly interposed between the free end surface of the second liquid carrier and the engagement surface when the locking assembly is in the locked and sealed state, thereby resulting in the formation of a fluid-tight seal between the free end surface of the second liquid carrier and the engagement surface. The plural movable members of the clamp assembly are configured to be in the open state and released from engagement with the cylindrical portion of the second liquid-carrier when the locking assembly is in the unlocked state.

In accordance with one preferred aspect of the coupling device, the plural movable members are pivotable between the open state and the closed state and vice versa.

In accordance with another preferred aspect of the coupling device, the first section of the housing comprises a front section, and wherein the housing additionally comprises a rear section in the form of a handle. The plural movable members are movably coupled to the front section. The handle is coupled to the plunger and configured to slide the plunger along the longitudinal axis from a first position to a second position and from the second position to a third position. The locking assembly holds the plunger in the open state when the plunger is in the first position. The locking assembly holds the plunger in the locked state when the plunger is in the second position. The locking assembly holds the plunger in the locked and sealed state when the plunger is in the third position.

In accordance with another preferred aspect of the coupling device, the plural movable members are pivotable between and open position and a closed position and wherein the locking assembly comprises a first surface on the plunger and a second surface on the plunger. The first surface is a cam surface configured to be engaged by portions of the plural movable members to cause the plural moveable members to pivot to the closed position when the handle is slid along the longitudinal axis to the second position. The second surface is configured to be engaged by portions of the plural movable member when the handle is slid along the longitudinal axis to the third position.

In accordance with another preferred aspect of the coupling device, second surface comprises a cylindrical surface.

In accordance with another preferred aspect of the coupling device, the housing comprises a front section, and wherein the housing additionally comprises a rear section in the form of a handle. The plural movable members are movably coupled to the front section. The handle is coupled to the plunger and configured to slide the plunger along the longitudinal axis from a first position to a second position and from the second position to a third position. The locking assembly holds the plunger in the open state when the plunger is in the first position. The locking assembly holds the plunger in the locked state when the plunger is in the second position. The locking assembly holds the plunger in the locked and sealed state when the plunger is in the third position.

In accordance with another preferred aspect of the coupling device, the plural movable members are pivotable between and open position and a closed position and wherein the locking assembly comprises a first surface on the plunger and a second surface on the plunger. The first surface is a cam surface configured to be engaged by portions of the plural movable members to cause the plural moveable members to pivot to the closed position when the handle is slid along the longitudinal axis to the second position. The second surface is configured to be engaged by portions of the plural movable member when the handle is slid along the longitudinal axis to the third position.

In accordance with another preferred aspect of the coupling device, the second surface comprises a cylindrical surface.

In accordance with another preferred aspect of the coupling device, the coupling device additionally comprises at least one magnet associated with the plural movable members to normally bias the plural movable members in the open state.

In accordance with another preferred aspect of the coupling device, the gasket ring is elastomeric.

In accordance with another preferred aspect of the coupling device, the coupling device additionally comprises an O-ring configured for engaging a peripheral portion of the cylindrical end portion of the second liquid carrier when the plunger is in the second position.

In accordance with another preferred aspect of the coupling device, the O-ring is located in an recess in the front section.

In accordance with another preferred aspect of the coupling device, the front section includes a portion having a passageway extending at least partially therethrough. The passageway has a cylindrical inner surface includes at least one interior track, and wherein the plunger includes at least one follower pin configured to slide along the interior track as the plunger is moved by the handle from the first position to the second position and from the second position to the third position.

In accordance with another preferred aspect of the coupling device, the interior track includes a first section and a second section. The first section is linear and extends along the longitudinal axis. The second section is spiral and extends at an acute angle to the longitudinal axis.

In accordance with another preferred aspect of the coupling device, the first section comprises a flexible finger configured to apply a bias to the follower pin.

In accordance with another preferred aspect of the coupling device, the plural movable members are equidistantly spaced from one another about the longitudinal axis.

In accordance with another preferred aspect of the coupling device, the plural movable members comprise a serrated engagement surface for tightly engaging the cylindrical portion of the second liquid-carrier.

In accordance with another preferred aspect of the coupling device, the handle comprises plural sections connected together to form a member having a sidewall, and wherein the plunger includes a flange to which the plural sections are connected to form an end wall of the handle.

In accordance with another preferred aspect of the coupling device, the engagement surface comprises an annular wall of substantially the same size and shape as the free end surface of the cylindrical end portion of the second liquid-carrier and is aligned therewith.

BRIEF DESCRIPTION OF THE DRAWING FIGURES

FIG. 8A is a rear elevation view of another component, i.e., a movable locking member or ring, of the coupling device shown in FIGS. 1-3;

FIG. 8B is a front elevation view of the locking ring shown in FIG. 8A;

FIG. 8C is an isometric view taken from a rear oblique angle of the locking ring shown in FIGS. 8A and 8B;

FIG. 8D is an isometric view taken from a front oblique angle of the locking ring shown in FIGS. 8A and 8B;

FIG. 9A is a side elevation view of another component, i.e., a sealing ring, of the coupling device shown in FIGS. 1-3;

FIG. 9B is an isometric view taken from a rear oblique angle of the sealing ring shown in FIG. 9A;

FIG. 22 is an exploded isometric view of the components making up the coupling device shown in FIGS. 20 and 21;

FIG. 23A is an enlarged isometric view of another component, i.e., a cam member, making up the coupling device shown in FIGS. 20-22;

FIG. 23B is an enlarged isometric view of the cam member shown in FIG. 23A, but taken from a different angle;

FIG. 23C is a longitudinal sectional view of the cam member shown in FIGS. 23A and 23B;

FIG. 23D is a rear end view of the cam member shown in FIGS. 23A and 23B;

FIG. 24A is an enlarged side elevation view of the rear section of the plunger assembly shown in FIG. 22C;

FIG. 24B is a longitudinal sectional view taken along line 24B-24B of FIG. 24A;

FIG. 24C is a front end view of the rear section of the plunger assembly shown in FIG. 24A;

FIG. 24D is a rear end view of the rear section of the plunger assembly shown in FIG. 24A;

FIG. 36B is reduced isometric view, partially broken away, of the coupling device of FIG. 33 in the locked and sealed position or state;

FIG. 36C is a reduced longitudinal section view showing the coupling device of FIG. 33 in the locked and sealed position or state, but with some components omitted in the interest of clarity;

FIG. 37A is an enlarged longitudinal sectional view of still another more preferred coupling device of the subject invention shown in an initial open position state ready to be mounted onto an externally threaded bib or spout of a faucet to releasably secure a hose, e.g., a garden hose, (not shown) thereto;

FIG. 37B is a reduced transverse sectional view taken along line 37B-37B of FIG. 37A;

FIG. 37C is a reduced transverse sectional view similar to FIG. 37B, but showing the coupling device of FIG. 37A at a subsequent position or state, i.e., at the initiation of a locked and sealed position or state, in the mounting of the coupling device onto the bib;

FIG. 37D is an enlarged longitudinal sectional view taken along line 37D-37D of FIG. 37C showing the coupling device of FIG. 37A at the initiation of the locked and sealed position or state;

FIG. 38A is a longitudinal sectional view, like that of FIG. 37D, but showing the coupling device of FIG. 37A in the locked and sealed position or state;

FIG. 38B is a reduced transverse sectional view taken along line 38B-38B of FIG. 38A;

FIG. 38C is a transverse sectional view similar to FIG. 38B, but showing the coupling device of FIG. 37A at a subsequent, i.e., start of release position or state, to dismount or disconnect it from the bib;

FIG. 47 is a side elevational view of the front or nose section of the coupling device of FIG. 45;

FIG. 48 is a rear elevational view of the front or nose section shown in FIG. 47;

FIG. 49 is a front elevational view of the front or nose section shown in FIG. 47;

FIG. 50A is an isometric view taken from a front oblique angle of the front or nose section shown in FIGS. 47-49 showing a portion of an interior track within the nose section;

FIG. 50B is an isometric view, similar to FIG. 50A, but rotated about the central longitudinal axis of the nose section to show another portion of the interior track;

FIG. 50C is an isometric view taken from a rear oblique angle of the front or nose section of FIG. 7 showing the follower pins of the coupling device located in respective interior tracks when the coupling device is in its initial, i.e., open, position or state in the process of mounting it on a bib of a faucet like shown in FIG. 45;

FIG. 50D is an isometric view, similar to FIG. 50C, but showing the follower pins of the coupling device located in respective interior tracks when the coupling device is in a subsequent, i.e., locked, position or state in the process of mounting it on the bib;

FIG. 50E is an isometric view, similar to FIGS. 50C and 50D, but showing follower pins of the coupling device located in respective interior tracks when the coupling device is in a still later, i.e., locked and sealed, position or state wherein it is fully mounted on the bib;

FIG. 51A is a longitudinal sectional view of the front or nose section shown in FIGS. 47-49, showing the position of one follower pin within an associated interior track when the coupling device is in its open position or state;

FIG. 51B is a longitudinal sectional view, like that of FIG. 51A, but showing the position of the one follower pin within its associated interior track when the coupling device is in its locked position or state;

FIG. 51C is a longitudinal sectional view, like that of FIGS. 51A and 51B, but showing the position of the one follower pin within its associated interior track when the coupling device is in its locked and sealed position or state;

DETAILED DESCRIPTION OF THE PREFERRED EMBODIMENTS

Figure 1:
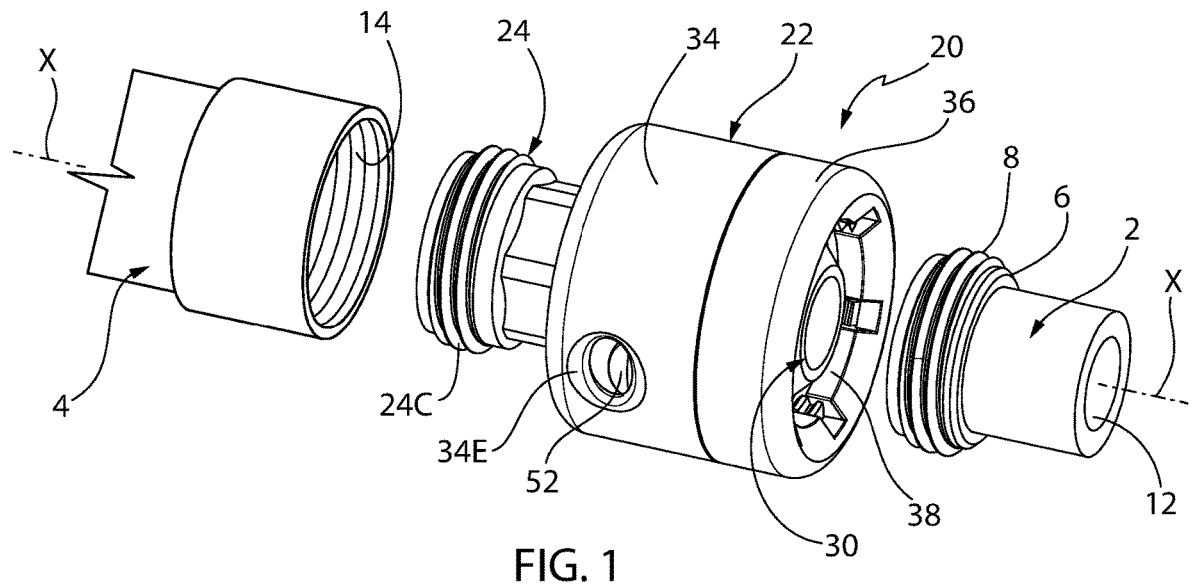
FIG. 1 is an isometric view of one exemplary embodiment of a coupling device constructed in accordance with this invention shown being ready to be mounted onto an externally threaded bib or spout of a faucet to releasably secure a hose, e.g., a garden hose, (not shown) thereto.

Referring now to the various figures of the drawings wherein like characters refer to like parts there is shown in FIG. 1 one exemplary embodiment of a coupling device 20 constructed in accordance with this invention. The coupling device 20 is a quick-connect device that is configured to be readily releasably mounted onto external helical threads of hose hydrant, hose bib, tap, faucet or other device for carrying a flowable material, e.g., a liquid-carrier 2, by anyone, irrespective of their manual dexterity or ability to grasp, and without requiring the coupling device to be screwed onto those external threads. The coupling device is also configured to enable a hose 4 or other conduit (hereinafter referred to as a "first liquid-carrier") is to be releasably secured to it. The hose hydrant, hose bib, tap or faucet 2 may be hereinafter referred to as a "second liquid carrier" and is shown in FIG. 1. It should be noted that the second liquid-carrier shown in FIG. 1 is exemplary of a multitude of liquid carriers to which the subject invention can be connected and includes a free end in the form of a bib or spout 6. In the exemplary embodiment shown in FIG. 1 the bib or spout is in the form of a hollow cylindrical end portion that is externally threaded with helical male threads 8 extending about the outer surface of the cylindrical end portion. The free end of the cylindrical end portion 6 terminates in a planar free end surface 10. A passageway 12 for carrying a liquid, e.g., water, extends through the liquid carrier's spout and terminates at the free end surface 10.

As will be seen from the discussion to follow the nature of the interconnection between the coupling device 20 and the spout 6 renders it leak-proof, such that liquid, e.g., water, can be carried from the spout 6 into the coupling device 20 to the hose 4 without any leakage out of the coupling device. Moreover, when the hose 4 is connected to the coupling device, and the coupling device is mounted on the spout 6, the hose may be rotated about the central longitudinal axis X without disconnecting the hose from the coupling device and without leakage of water out of the interface between the coupling device and the hose.

Figure 2:
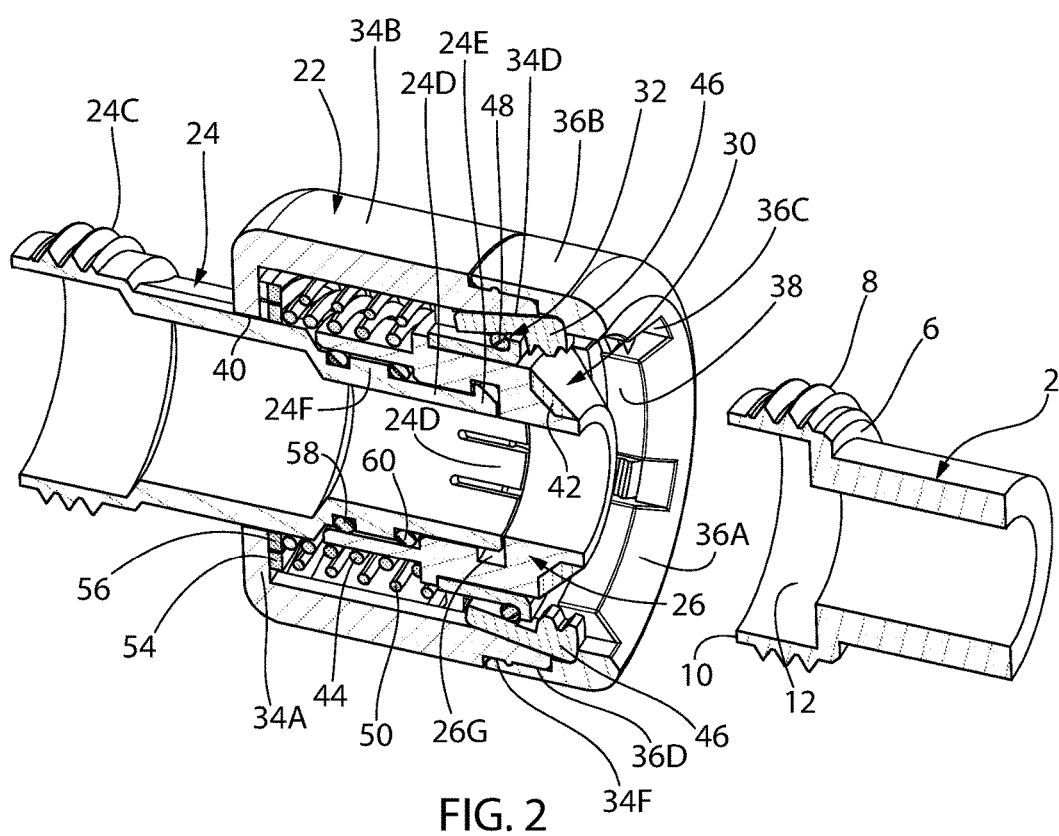
FIG. 2 is longitudinal sectional view of the coupling device and bib or spout of the faucet shown in FIG. 1.
Figure 3:
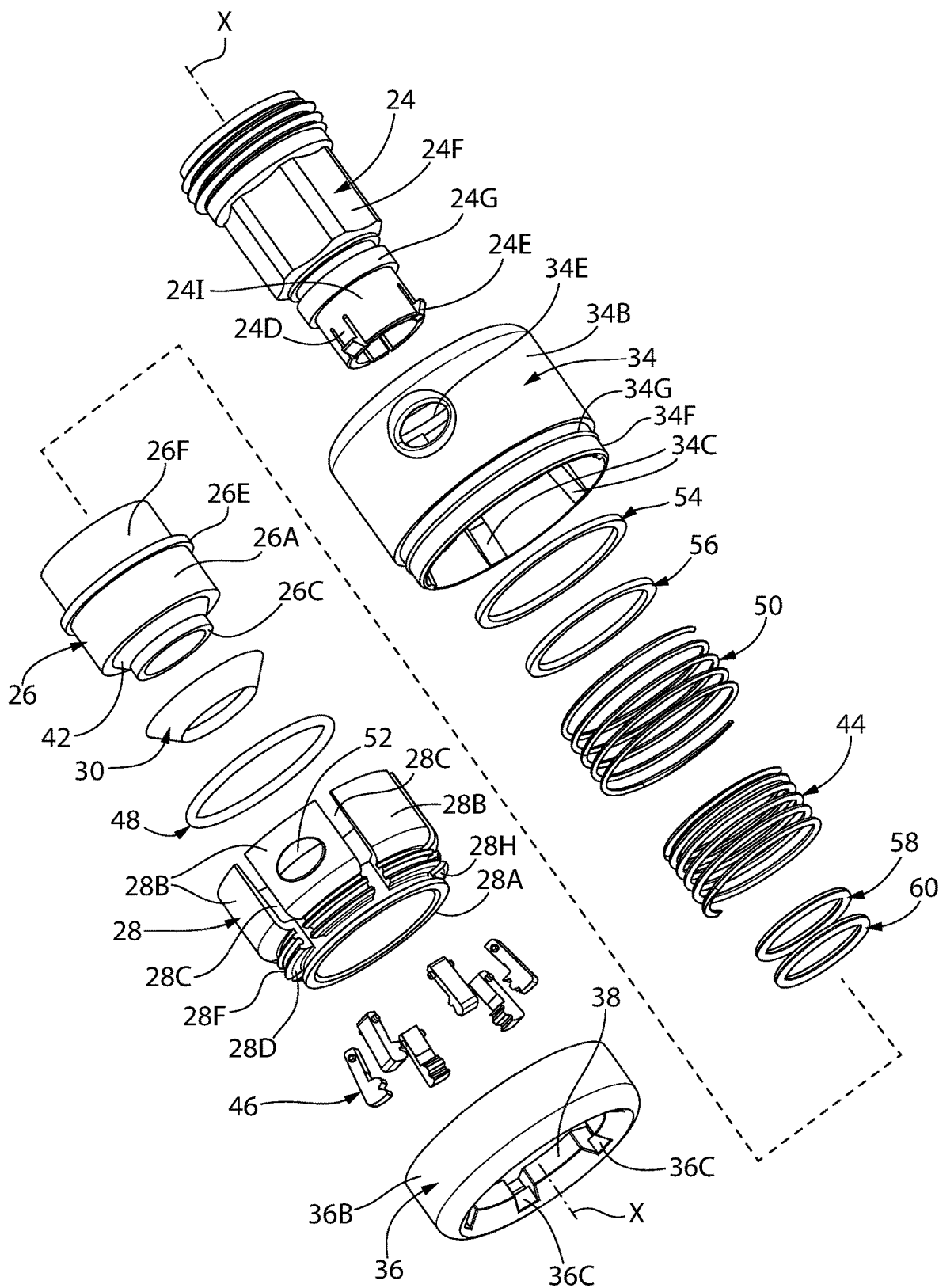
FIG. 3 is an exploded isometric view of the components making up the coupling device shown in FIGS. 1 and 2.
Figure 4A:
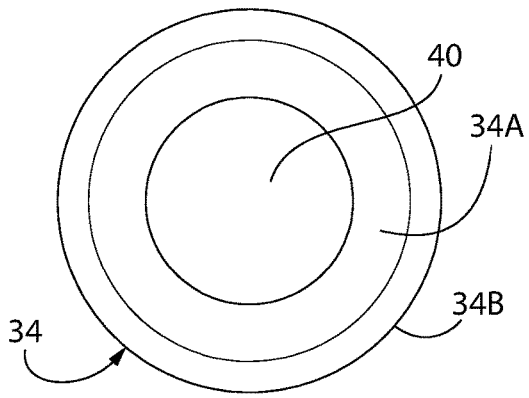
FIG. 4A is a rear elevation view of one component, i.e., the main body of a housing assembly, of the coupling device shown in FIGS. 1-3.
Figure 4B:
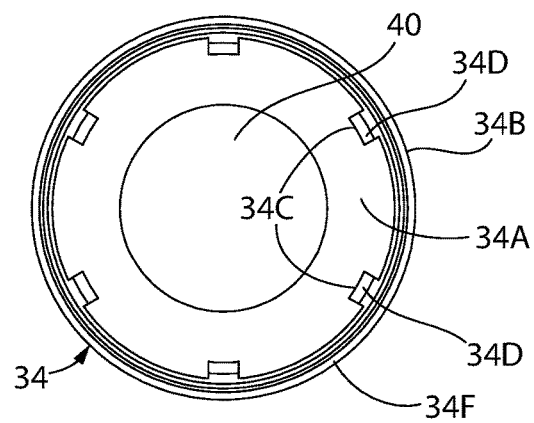
FIG. 4B is a front elevation view of the main body shown in FIG. 4A.
Figure 4C:
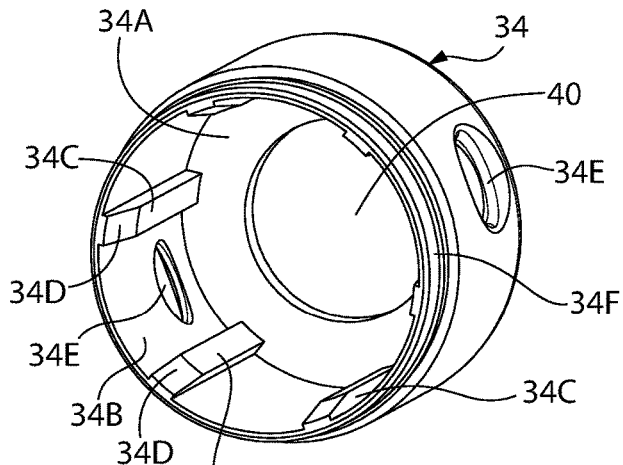
FIG. 4C is an isometric view taken from a rear oblique angle of the main body shown in FIGS. 4A and 4B.
Figure 5A:
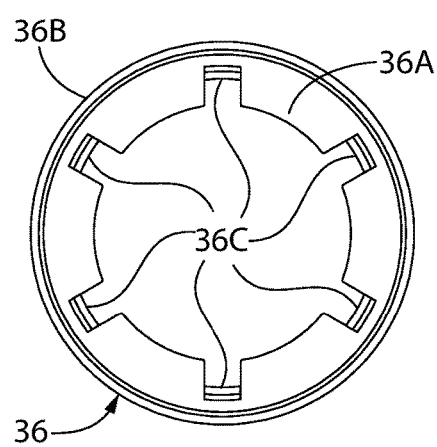
FIG. 5A is a rear elevation view of another component, i.e., a cap of the housing assembly, of the coupling device shown in FIGS. 1-3.
Figure 5B:
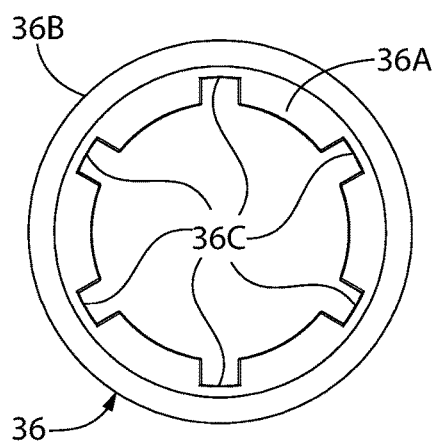
FIG. 5B is a front elevation view of the cap shown in FIG. 5A.
Figure 5C:
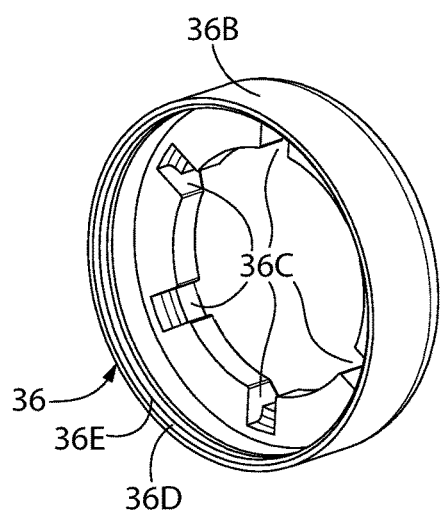
FIG. 5C is an isometric view taken from a rear oblique angle of the cap shown in FIGS. 5A and 5B.
Figure 6A:
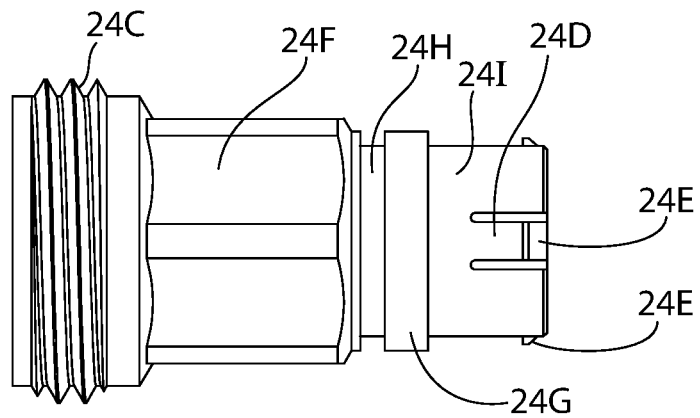
FIG. 6A is a side elevation view of another component, i.e., a hose-coupling member, of the coupling device shown in FIGS. 1-3.
Figures 6B, 6C:
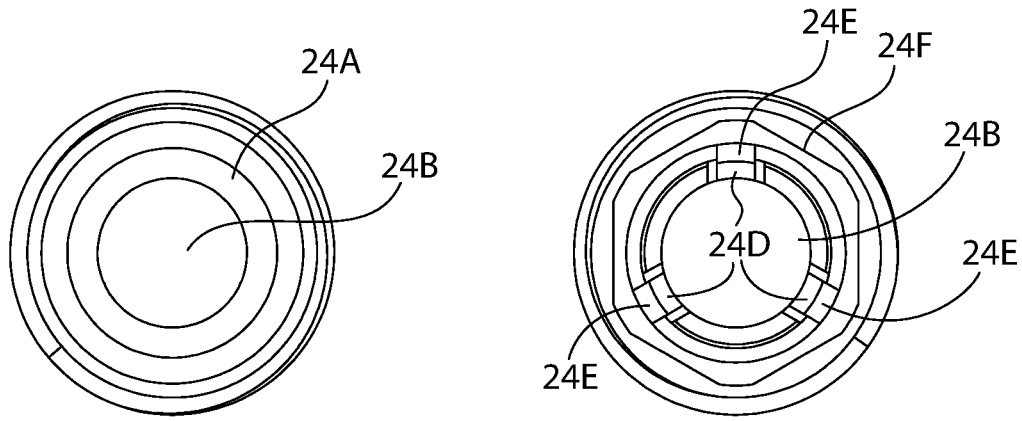
FIG. 6B is a rear elevation view of the hose-coupling member shown in FIG. 6A.
FIG. 6C is a front elevation view of the hose-coupling member shown in FIGS. 6A and 9B.
Figures 6D, 6E:
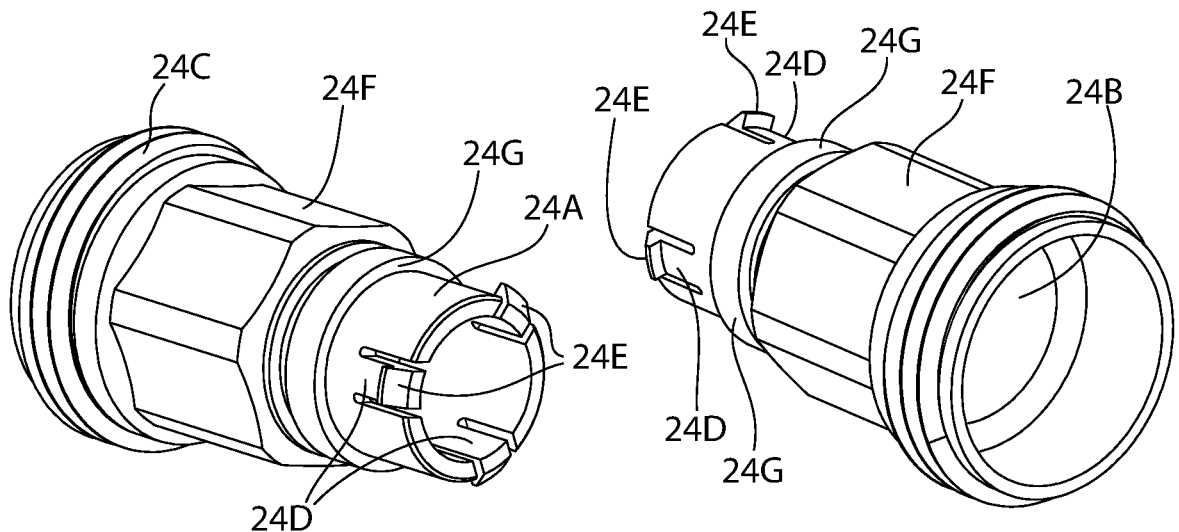
FIG. 6D is an isometric view taken from a front oblique angle of the hose-coupling member shown in FIGS. 6A-6C.
FIG. 6E is an isometric view taken from a rear oblique angle of the hose-coupling member shown in FIGS. 6A-6D.

The overall construction of the coupling device 20 is best seen in FIGS. 2 and 3, and basically comprises a housing 22, a hose-coupling member 24, a plunger member 26, a locking member 28, a gasket ring 30, and a clamp assembly 32. As will be described later the hose-coupling member 24 and the plunger member are connected together to form a plunger unit (which will be referred to simply as a "plunger"). The housing 22 is an assembly that basically comprises a main body 34 and an end cap 36. The details of the main body 34 and the end cap 36 will be described later. Suffice it for now to state that the end cap is configured for securement to the main body to form a hollow interior in which the other components of the coupling device 20 are located. The cap 36 includes an opening 38 in communication with the hollow interior of the housing and which is configured to receive the externally threaded spout 6 to mount the coupling device on the spout. The opposite end of the housing includes an opening 40 through which a portion of the hose-coupling member 24 of the plunger extends for releasable securement to an internally threaded connector 14 of the hose 4.

Figure 16:
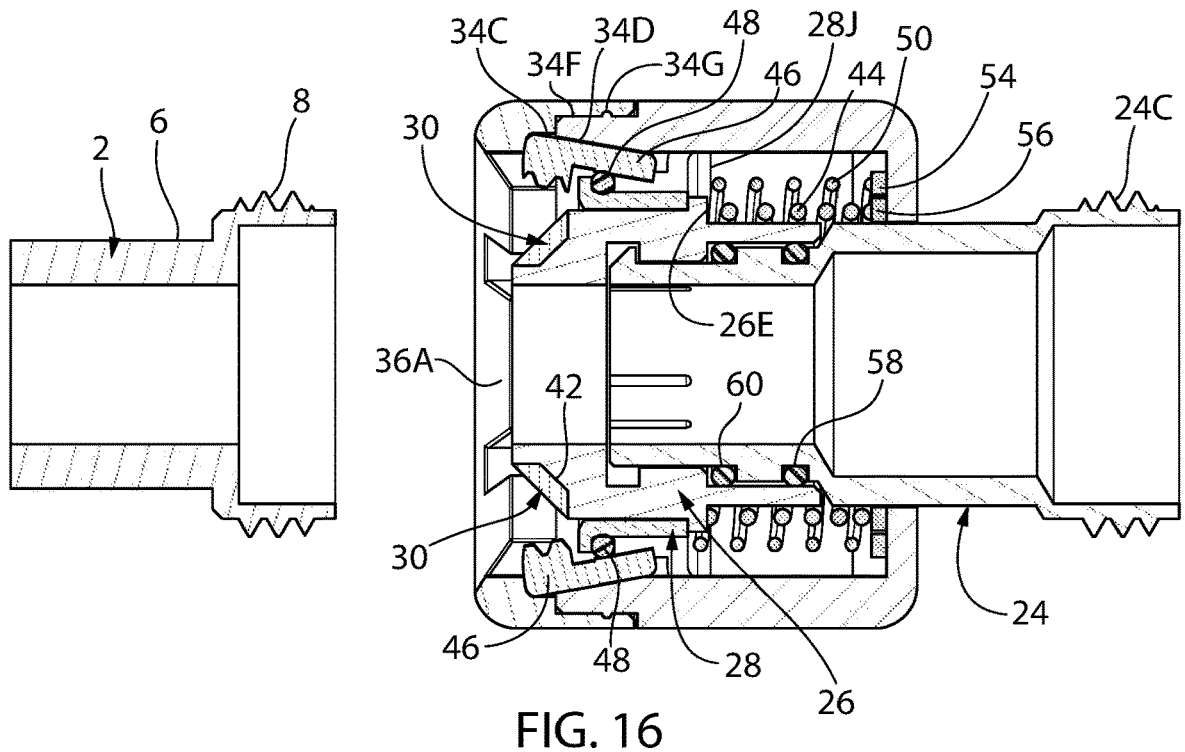
FIG. 16 is a side elevation view in longitudinal section showing an initial step in the mounting of the coupling device of FIG. 1 onto the threaded bib or spout of the faucet shown in FIG. 1 wherein components of the coupling device are in a first or open position.
Figure 17:
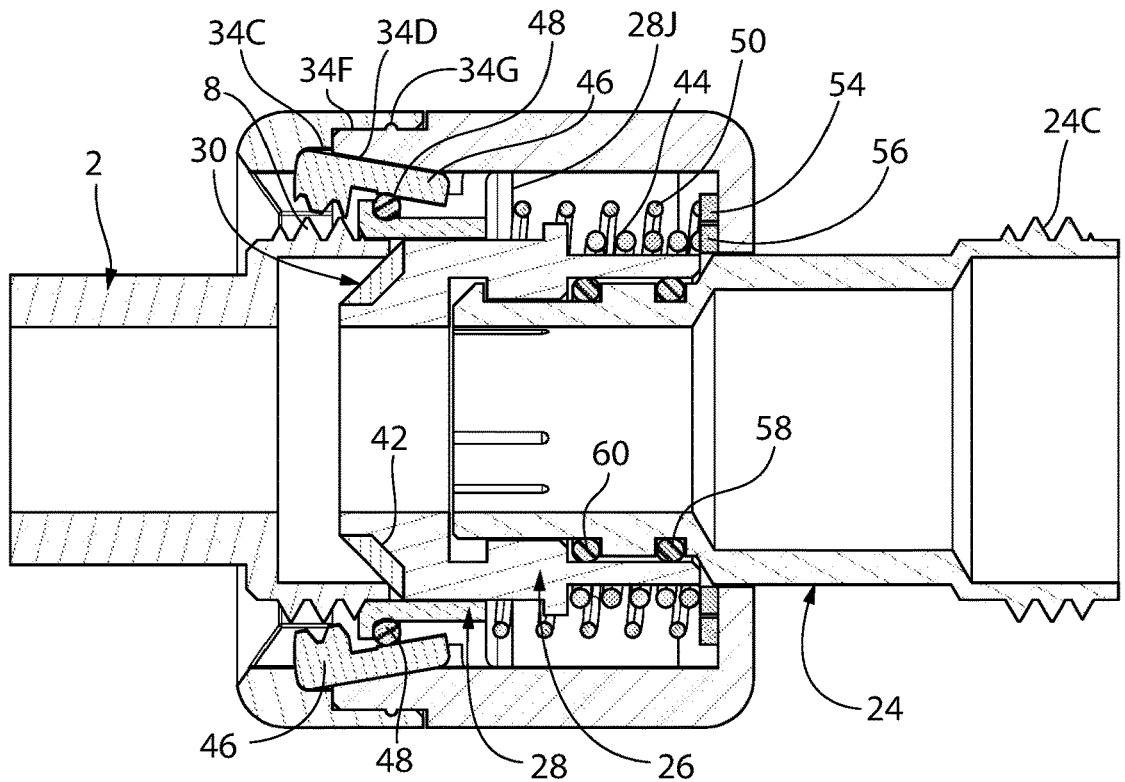
FIG. 17 is a side elevation view in longitudinal section like that of FIG. 16, but showing an intermediate step in the mounting of the coupling device of FIG. 1 onto the threaded bib or spout of the faucet shown in FIG. 1 wherein components of the coupling device are in a second or sealing position.

The gasket ring 30 will be described later. Suffice it for now to state that it is mounted on an engagement surface 42 of the plunger member 26 and movable with the plunger from a first or open longitudinal position on the longitudinal axis X, like shown in FIGS. 1, 2 and 16 to a second or sealing longitudinal position on the longitudinal axis X, like shown in FIG. 17 during the mounting of the coupling device onto the spout. In the second or sealing position the gasket ring is tightly interposed between the engagement surface 42 and the planar free end surface 10 and the contiguous portion of the passageway 12 of the spout 6. In particular, that action occurs when the spout is introduced through the opening 38 into the interior of the coupling device during an initial step in the mounting of the coupling device onto the spout, as will be described later. The tight engagement of the gasket ring 30 when in the sealing position produces a good fluid tight seal between the coupling device and the spout. As will also be described later the coupling device includes biasing means, e.g., a first helical compression spring 44, to naturally bias the plunger in the first or open position. Thus, when the spout 6 is inserted through the opening 38 into the housing's interior the free end 10 of the spout engages the sealing ring to move the plunger from the first or open position to the second or sealing position.

Figure 18:
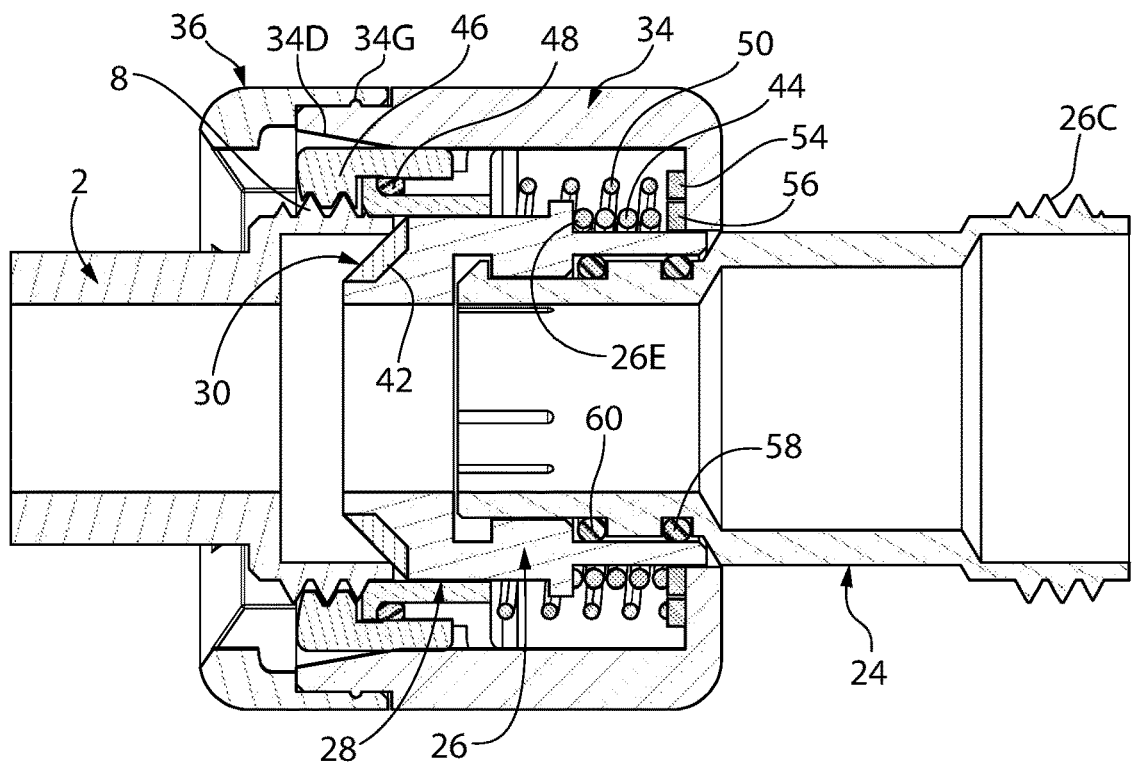
FIG. 18 is a side elevation view in longitudinal section like that of FIGS. 16 and 17, but showing the final step in the mounting of the coupling device of FIG. 1 onto the threaded bib or spout of the faucet shown in FIG. 1 wherein components of the coupling device are in a third or closed position.

In order to complete the mounting of the coupling device onto the spout and lock it in place thereon, the spout is introduced further into the interior of the housing along the longitudinal axis X to move the plunger to a third or closed position. In the third position, the clamp assembly 32 is actuated to releasably lock the housing assembly onto the spout, like shown in FIGS. 18 and 19, all the while maintaining the fluid-tight seal between the spout and the coupling assembly. The details of the clamp assembly will be described later. Suffice it for now to state that the clamp assembly is mounted on the locking member 28 and movable with the locking member to the third or closed position.

The clamp assembly 32 basically comprises a plurality of movable clamp members, which in accordance with one exemplary preferred embodiment of this invention are in the form of pivotable fingers or pawls 46, and a biasing O-ring 48. The pivotable fingers or pawls 42 are configured for pivoting into clamping engagement with the external threads 8 of the spout 6 when the plunger (and the locking member coupled thereto) is moved to the third or closed position. In particular, in the third or closed position the pivotable fingers or pawls are pivoted inward towards the longitudinal axis and towards one another so that portions thereof releasably engage the external threads 8 of the spout to lock the coupling device onto the spout. This action completes the mounting of the coupling device onto the spout.

As will also be described later the heretofore mentioned biasing means includes a second helical compression spring 50. In particular, the spring 50 serves to naturally bias the locking member 28 in the second or sealing position. In fact, the second helical compression spring 50 also serves to naturally bias the locking member and the plunger member (to which the locking member is coupled) to the first or open position.

The locking member 28 also includes a pair of projections or buttons 52, which act as detents to automatically engage portions of the housing assembly 22 to releasably lock the locking member in the third or closed position. The projections or buttons are configured to be manually pressed by a user of the coupling device to release the locking member from its closed position, whereupon the second spring 50 biases the locking member and the plunger member back to the first or open position, thereby releasing the coupling device from the spout so that it can readily be removed therefrom. That action will also be described later.

In addition to the foregoing components mentioned above, the coupling device also includes two flat washers 54 and 56, and two O-ring 58 and 60. The washers 54 and 56 form a fluid tight seal between the hose-coupling member 24 and the portion of the housing contiguous with the opening 40 through which a portion of the hose-coupling member extends. The O-rings 58 and 60 form a fluid tight seal between portions of the hose-coupling member 24 and the plunger member 26.

Turning now to FIGS. 3, and 4A-4C the details of the main body 34 of the housing assembly will now be described. The main body 34 is a generally cup-shaped member formed of any suitable material, e.g., glass-filled Ryton® synthetic resin, and has a generally planar end wall 34A and a circular peripheral sidewall 34B. The center of the end wall forms the heretofore identified opening 40. A plurality of linear rails 34C project inward from the inner surface of the sidewall and are spaced equidistantly around the longitudinal axis X, with each rail extending parallel to that axis. The end of each of the rails is in the form of a sloped cam surface 34D. The rails are configured to be received within mating longitudinally extending slots (to be described later) in the locking member 28 to serve as a guide enabling the locking member to slide along the longitudinal axis X without rotating about that axis. A pair of oval-shaped openings 34E extends through the sidewall 34B, with those openings diametrically opposed to each other. Each opening 34E is configured to receive a respective one of the buttons 52 of the locking member 28. The outer surface of the sidewall contiguous with each of the openings 34E is sloped or chamfered to enable a user to comfortably insert his/her finger into the opening to depress the button extending therein to unlock the coupling assembly from the spout, as will be described later. The outer surface of the sidewall 34A adjacent the free end thereof is in the form of an outer annular recess 34F from which a short height annular ridge 34G projects outward.

Turning now to FIGS. 3, and 5A-5C the details of the cap 36 of the housing assembly will now be described. The cap is a generally cup-shaped member formed of any suitable material, e.g., e.g., glass-filled Ryton® synthetic resin, and has an end wall 36A and a circular peripheral sidewall 36B. The center of the end wall 36A forms the heretofore identified opening 38. The end wall 36A is considerably thicker than the sidewall 36B and includes a plurality, e.g., six, notches 36C equidistantly spaced from one another about the opening 38. The front surface of the end wall 36A contiguous with the opening 38 is of conical tapering shape. Each of the notches 36C is of a stepped shape to accommodate portions of respective ones of the pivotable fingers or pawls 46, as will be described later. The inner surface of the sidewall 36B adjacent the free end thereof is in the form of an annular recess 36D configured to receive the outer annular recess 34F of the main body 34 so that they snap-fit together. In particular, the annular recess 36D includes an annular groove 36E into which the annular ridge 34G of the main body snaps when the cap and the main body are secured together, like shown in FIGS. 16 and 17. That action secures the cap 36 to the main body 34 and thereby completes the assembly of the device's housing.

The hose-coupling member 24 is best seen in FIGS. 3, and 6A-6E. As can be seen therein the hose-coupling member 24 is an elongated tubular member formed of any suitable material, e.g., e.g., glass-filled Ryton® synthetic resin, and has a circular sidewall 24A bounding a central passageway 24B centered on the longitudinal axis X and extending the entire length of the hose-coupling member. The outer end of the sidewall includes a helical male thread 24C for releasable securement to the internally threaded connector 14 of the hose 4. The inner end of the sidewall of the hose-coupling member includes three equidistantly spaced fingers 24D, each of which terminates in a flanged tab 24E, whose outer surface is sloped. Each of the fingers is configured to be flexed from its normal position like shown in FIGS. 3 and 6A-6E so that its flanged tab can snap-fit into an annular groove (to be described later) in the plunger member to connect the hose-coupling member to the plunger member. The portion of the sidewall 24A immediately adjacent the external helical thread 24C forms a grip section 24F whose outer surface is scalloped to enable one to securely and comfortably grip that portion to screw the hose's connector 14 onto the external thread 24C to connect the hose 4 to the hose-coupling member 24. An annular ridge 24G projects outward from the outer surface of the sidewall 24A adjacent the grip section 24F to form an annular recess 24H therebetween. The recess 24H is configured to receive the O-ring 58. The O-ring 58 forms a fluid-tight seal between the hose-coupling member 24 and the contiguous portion of the plunger member. The outer surface of the sidewall 24A on the opposite side of the annular ridge 24G from the recess 24H and immediately adjacent the ridge 24G is configured to receive the O-ring 60. The O-ring 60 forms another fluid-tight seal between the hose-coupling member and a contiguous portion of the plunger member.

The plunger member 26 is best seen in FIGS. 3, and 7A-7E. Thus, as can be seen therein the plunger member is an elongated tubular member formed of any suitable material, e.g., e.g., glass-filled Ryton® synthetic resin, and has a circular sidewall 26A bounding a central passageway 26B centered on the longitudinal axis X and extending the entire length of the plunger member. The outer surface closely adjacent the free end 26C of the plunger member is of conical shape and forms the heretofore identified engagement surface 42. The elastomeric sealing ring 30 is mounted on the engagement surface 42 between the free end 26C and a front surface 26D. To that end, as best seen in FIGS. 9A and 9B, the elastomeric sealing ring 30 is of a conical shape, and is formed of any suitable elastomeric material, e.g., Nitrile, urethane, and many other commonly used soft sealing materials. The elastomeric sealing ring includes a conically shaped outer surface 30A and a conically shaped inner surface 30B. The conically shaped inner surface is configured to abut and be secured to the conically shaped engagement surface 42. The sealing ring 30 is preferably over-molded onto the engagement surface 42 of the plunger member, but can be secured thereto in other ways.

Figure 7A:
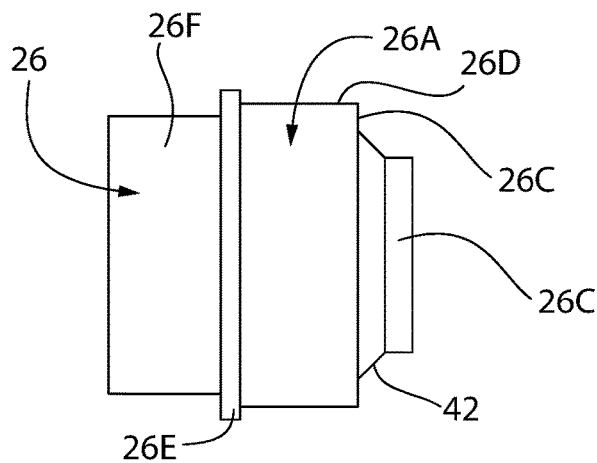
FIG. 7A is a side elevation view of another component, i.e., a plunger member, of the coupling device shown in FIGS. 1-3.
Figure 7B:
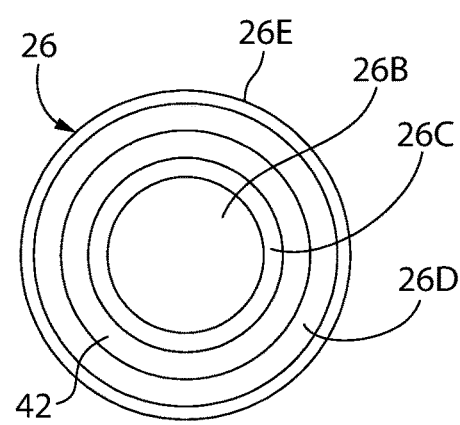
FIG. 7B is a front elevation view of the plunger member shown in FIG. 7A.
Figure 7C:
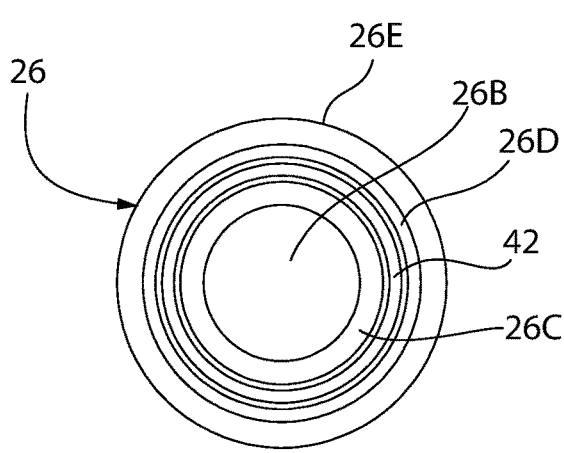
FIG. 7C is a rear elevation view of the plunger member shown in FIGS. 7A and 7B.
Figure 7D:
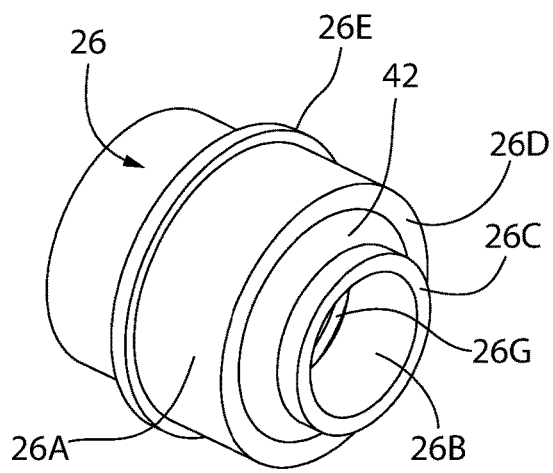
FIG. 7D is an isometric view taken from a front oblique angle of the plunger member shown in FIGS. 7A-7C.
Figure 7E:
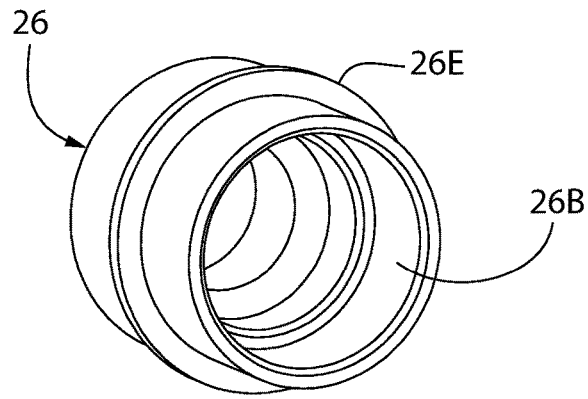
FIG. 7E is an isometric view taken from a rear oblique angle of the plunger member shown in FIGS. 7A-7D.
Figure 14A:
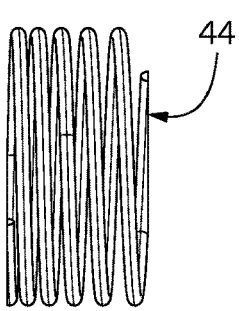
FIG. 14A is a side elevation view of another component, i.e., a small helical compression spring, of the coupling device shown in FIGS. 1-3.
Figure 14B:
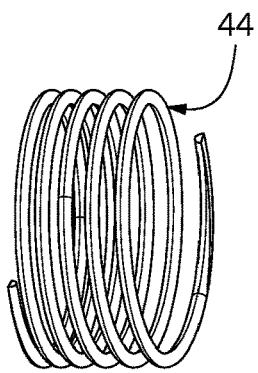
FIG. 14B is an isometric view of the small helical compression spring of the coupling device shown in FIG. 14A.

The sidewall of the plunger member includes an annular ridge 26E at an intermediate point along the length of the plunger member. The sidewall at the outer end of the plunger member is of slightly lesser external diameter than the annular ridge 26E and forms a surface 26F about which the spring 44 extends. The spring 44 is best seen in FIGS. 14A and 14B and is a helical compression spring formed of any suitable material, e.g., 302 or 316 stainless steel. As mentioned earlier, the two flat washers 54 and 56 are located within the interior of the housing assembly immediately adjacent the opening 40. The spring 50 is interposed and compressed between the flat washer 56 and the annular ridge 26E to naturally bias the plunger member into the first or open position shown in FIGS. 2 and 16. As also mentioned earlier the plunger member 26 includes an annular groove for receipt of the tabs of the fingers of the hose-coupling member 24 to connect the hose-coupling member to the plunger member to form the plunger. That annular groove is best seen in FIGS. 2 and 7D, and is designated by the reference number 26G.

Turning now to FIGS. 3, 8A-8D, the details of the locking member 28 will now be described. The locking member 28 is a generally cup-shaped member formed of any suitable material, e.g., e.g., glass-filled Ryton® synthetic resin, and has a tubular end section 28A from which a plurality, e.g., six, arcuate wall sections 28B project. Each of the wall sections forms an arc sector of a circle. The wall sections 28B are thin members which are equidistantly spaced from one another by respective gaps 28C. The outer surface of two of the wall sections 28B which are diametrically opposed to each other include oval domed projections, which form the heretofore mentioned buttons 52. The outer surface of the tubular end section 28A includes six discontinuous arcuate ridges 28D equidistantly spaced from one another by gaps 28E. Another six arcuate ridges 28F are located adjacent the ridges 28D and are also equidistantly spaced from one another by the gaps 28E. The space between two immediately adjacent ridges 28D and 28F forms a socket 28G (FIGS. 8D and 19) for receipt of a pivot pin 46A (FIGS. 10A and 10B) of one of the pivotable fingers or pawls 46, while the space between the two other immediately adjacent ridges 28D and 28F forms another socket 28G for receipt of the other of the pivot pins 46B of the one pivotable finger or pawl 46. Thus, each of the pivotable fingers or pawls is pivotably mounted in an associated gap 28E for pivotable movement between an open position like shown in FIGS. 2, 16 and 17 and a closed position like shown in FIGS. 18 and 19.

Figure 10A:
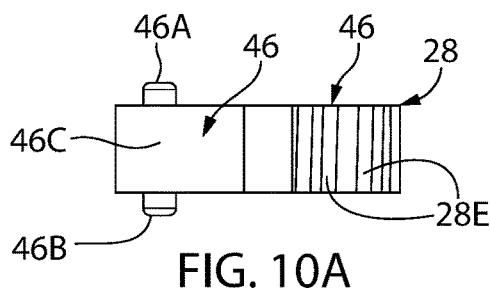
FIG. 10A is an enlarged side elevation view of another component, i.e., a pivotable finger or pawl, of the coupling device shown in FIGS. 1-3.
Figure 10B:
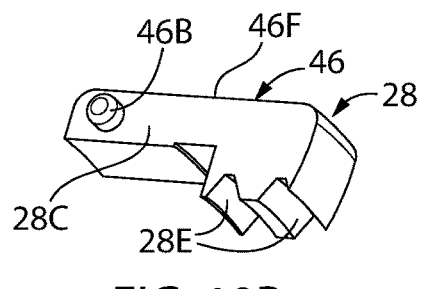
FIG. 10B is an enlarged isometric view of the pivotable finger or pawl of the coupling device shown in FIG. 10A.
Figure 11A:
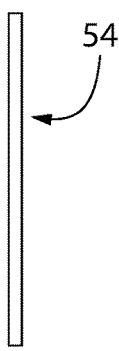
FIG. 11A is a side elevation view of another component, i.e., a large flat washer, of the coupling device shown in FIGS. 1-3.
Figure 11B:
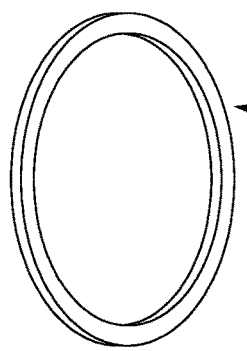
FIG. 11B is an isometric view of the large flat washer of the coupling device shown in FIG. 11A.

The details of the construction of each of the pivotable fingers or pawls 46 are best seen in FIGS. 10A and 10B. Each finger or pawl 46 is a somewhat elongated member 28C having one end portion 28D, from the sides of which the heretofore pivot pins 46A and 46B extend axially aligned. The opposite end of the elongated member 28C has a bottom surface in the form of two teeth 46E which are shaped to mate with the male helical threads 8 of the spout 6, when the finger or pawl is pivoted inward to its closed position. The upper surface 46F of each of the fingers or pawls is planar.

Figure 15A:
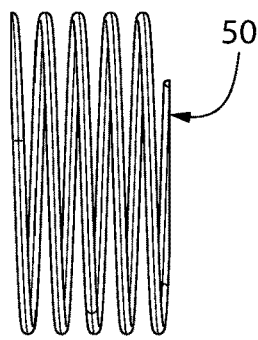
FIG. 15A is a side elevation view of another component, i.e., a large helical compression spring, of the coupling device shown in FIGS. 1-3.
Figure 15B:
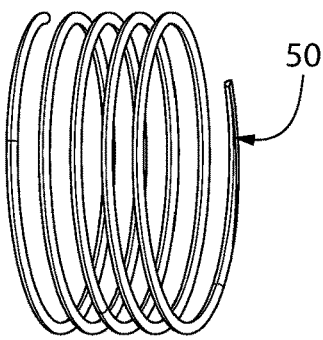
FIG. 15B is an isometric view of the large helical compression spring of the coupling device shown in FIG. 14A.

The locking member 28 is mounted on outer surface of the plunger member and configured to be slid along the longitudinal axis X with respect to the plunger member when the plunger member is moved from the second position to the third position to cause the fingers or pawls 46 to lock onto the threads 8 of the spout 6. To that end, the tubular end section 28A includes a central bore 28I which is configured to slidably receive the portion of the sidewall 26A of the plunger member that is in front of the annular ridge 28E. The tubular end section 28A includes an inner surface 28J (FIGS. 8B and 8C). The spring 50 is located interposed between the washer 54 and the surface 28J of the locking member and serves to bias the locking member in the first or open position. The spring 50 is a compression spring which is best seen in FIGS. 15A and 15B and is formed of any suitable material, e.g., 302 or 316 stainless steel.

Figure 12A:
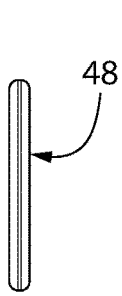
FIG. 12A is a side elevation view of another component, i.e., an O-ring, of the coupling device shown in FIGS. 1-3.
Figure 12B:
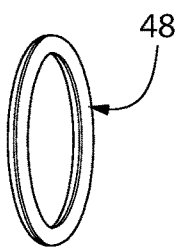
FIG. 12B is an isometric view of the O-ring of the coupling device shown in FIG. 12A.
Figure 13A:
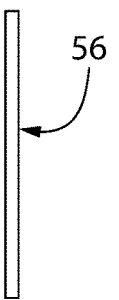
FIG. 13A is a side elevation view of another component, i.e., a small flat washer, of the coupling device shown in FIGS. 1-3.
Figure 13B:
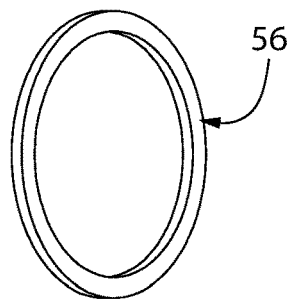
FIG. 13B is an isometric view of the small flat washer of the coupling device shown in FIG. 13A.
Figure 19:
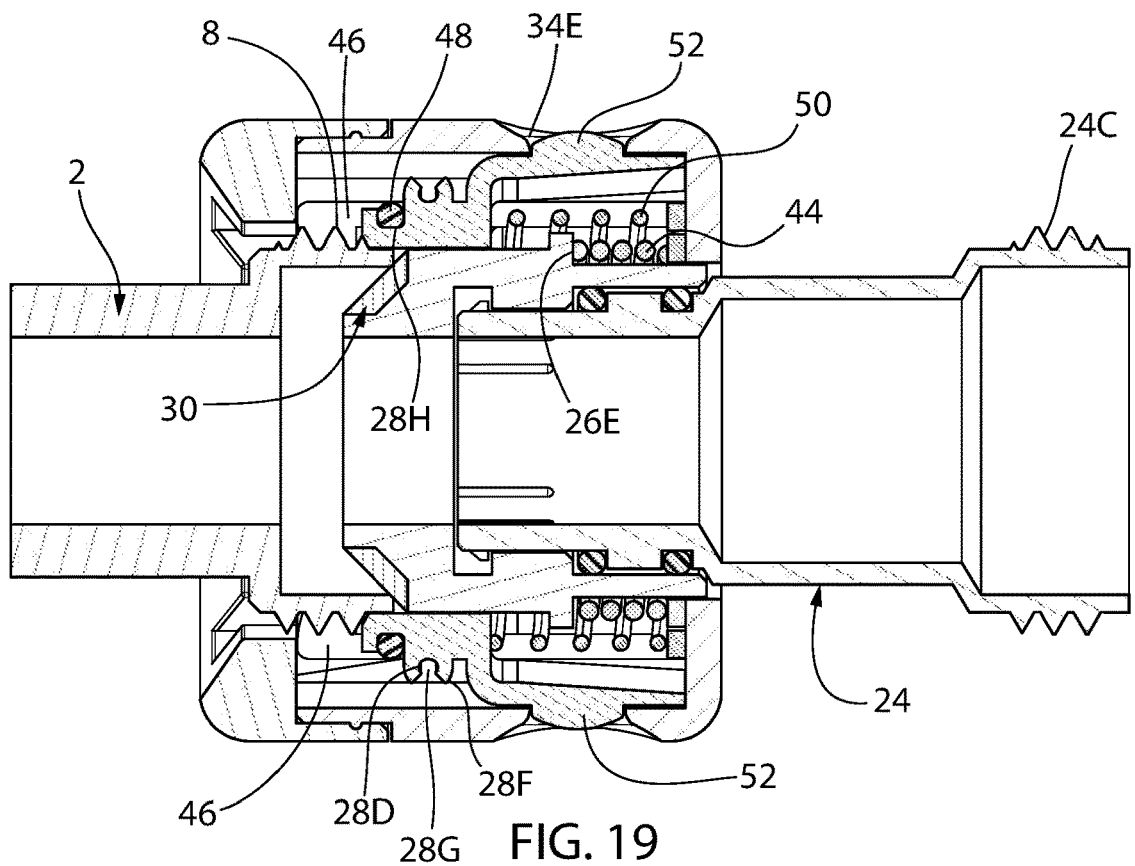
FIG. 19 is a side elevation view in longitudinal section of the coupling device in the third or sealing position, but taken perpendicularly to that of FIG. 18.

As best seen in FIGS. 8D and 19 an annular recess 28H is located in the tubular end section 28A immediately in front of the annular ridges 28D for receipt of the O-ring 48. The O-ring 48 is formed of any suitable elastomeric material, e.g., Buna-N Rubber (Nitrile). With the O-ring 48 located in the recess 28H it will be under the bottom surface of each of the pivotable fingers or pawls 46. The O-ring 48 is best seen in FIGS. 3, 12A and 12B, and serves to bias the pivotable fingers or pawls into their normally open position, like shown in FIGS. 2, 16, and 17. That action is accomplished by the O-ring 48 pushing upward on the bottom surface of each of the fingers or pawls immediately in front of the pivot pins 16A and 46B to cause them to pivot outward away from the central longitudinal axis X.

As mentioned earlier each of the fingers or pawls 46 is configured to be pivoted inward to a closed position to lock it onto the external threads of the spout. The action occurs as a result of the locking member 28 being moved along the longitudinal axis X by the movement of the plunger member 26 along that axis. That movement results in the planar upper surface 46F of each of the fingers or pawls 46 sliding along a respective sloped cam surface 34D of the rails 34C of main body 34 to cause the fingers or pawls to pivot inward about the axis of the pivot pins 46A and 46B against the bias provided by the underlying O-ring 48, i.e., the O-ring becomes compressed as the fingers pivot inward.

As can be best seen in FIGS. 8A and 8B two diametrically opposed wall sections 28B of the locking member include on their outer surfaces the heretofore identified projections or buttons 52. Those projections or buttons are configured for receipt in respective ones of the openings 34E in the main body 3 of the housing to lock the locking member, the plunger and the hose-coupling member in the third or closed position when the fingers or pawls are pivoted inward to lock onto the external threads of the spout. In particular, when the locking member is slid from the second position to the third position, the outer surface of each button 52 will ride or slide along the adjacent inner surface of the main body to cause the wall sections 28B on which it is located to flex slightly inward until the buttons reach their associated openings 34E. At that time the wall sections will flex outward due to their natural bias, whereupon the buttons 52 will snap-fit into the opening 34E and thus lock the locking assembly into the third or open position.

Turning now to FIGS. 16-19 the manner of releasably mounting the coupling device 20 onto the spout 6 will now be described. It should be noted at this point that the coupling device 20 can be mounted on the spout either before or after the hose 4 is connected to the hose-coupling member of the coupling device. If the hose is first connected, that is accomplished by grasping the gripping section 24F of the hose-coupling member and then screwing the internally threaded connector 14 of the hose onto the external helical thread 24 of the coupling device 20. Once that has been accomplished the coupling device can be mounted onto the spout 6. If not, the hose can be connected to the coupling device after the coupling device has been mounted on the spout. In any case, the coupling device and its components will normally be biased so that they are in the heretofore discussed first or open position, like shown in FIGS. 1 and 16. If the spout is fixed in position on a structure the coupling assembly will be moved, whereas if the spout is movable it may be moved and the coupling device held stationary. Alternatively both the spout and the coupling device can be moved, depending upon the construction of the spout. In any case, the externally threaded end of the spout is introduced through the opening 38 into the interior of the coupling device. Continued movement of the spout into the interior of the coupling device will cause the planar free end 10 of the spout to engage the gasket ring 30 against the bias provided on the plunger by the compression spring 44. At that point the plunger and the locking member will be in the second or sealing position, like shown in FIG. 17.

As should be appreciated by those skilled in the art, since the elastomeric ring 30 includes a conical outer surface some portion of that conical surface will extend into the central passageway 12 of the spout and a contiguous portion of that surface will engage the contiguous free end of the spout when the coupling device is in the second or sealing position. That action forms a good fluid-tight interface or seal between the spout and the coupling device irrespective of variances in tolerance of the inner diameter of the passageway.

Continued inward movement of spout into the coupling device against the bias provided by spring 44 on the plunger member 26 and the bias provided by spring 50 on the locking member, will cause the locking member 28 to slide with respect to the plunger member 26 toward the third or closed position. As the locking member slides with respect the plunger member against the bias provided by spring 50, the outer surfaces 46F of the pivotable fingers or pawls 46 will ride over the cam surfaces 34D of the housing assembly to cause those fingers or pawls to pivot inward against the bias provided by the O-ring 48 engaging the bottom surfaces of the fingers or pawls. When the locking member has been slid to the third or closed position, like shown in FIGS. 18 and 19, the fingers or pawls will have been pivoted fully inward so that the teeth on those fingers or pawls will tightly engage the external threads 8 of the spout, with the O-ring 48 somewhat compressed. Moreover, at that time the buttons 52 will have snap-fit into their respective openings 34E on the housing assembly to lock the coupling member in the closed position. That action completes the mounting of the coupling member onto the spout.

Once mounted on the spout, with the hose 4 connected to threaded end 24C of the hose-coupling member, the hose and the coupling member are rotatable as a unit about the longitudinal axis X without disconnecting the hose from the coupling member. If for any reason it is desired to dismount the coupling member from the spout, all that is required is for a user to press his/her fingers onto the buttons 52 so that the buttons are freed from the openings 34E of the housing assembly, whereupon the biasing springs 44 and 50 will carry the plunger and the locking member back towards the first or open position. The movement of those components back toward the first or open position results in the O-ring 48 pivoting the fingers or pawls 46 to their open position, thereby unlocking the fingers or pawls from the external threads 8. Once that has occurred the coupling device can be removed from the spout. When the spout is fully out of the coupling device, the biasing springs 44 and 50 will have carried the plunger member 26, the locking member 28 and the hose-coupling member 24 back to their original (first or open) position.

Figure 20:
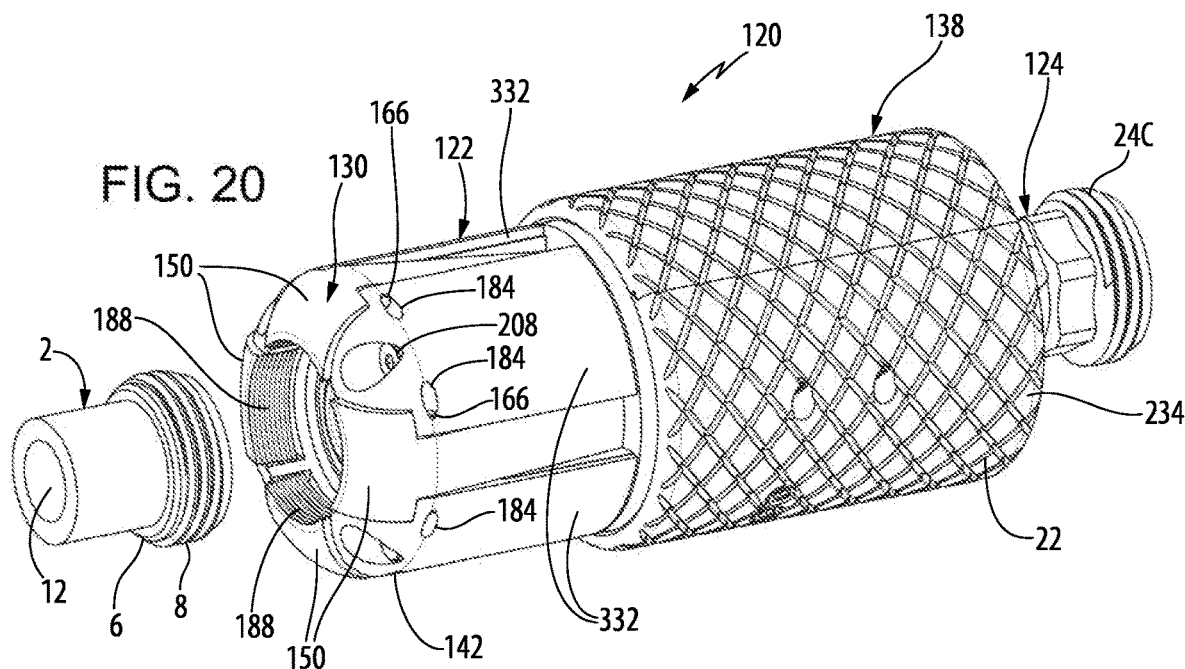
FIG. 20 is an isometric view of another and more preferred coupling device of the subject invention shown being ready to be mounted onto an externally threaded bib or spout of a faucet to releasably secure a hose, e.g., a garden hose, (not shown) thereto.
Figure 21:
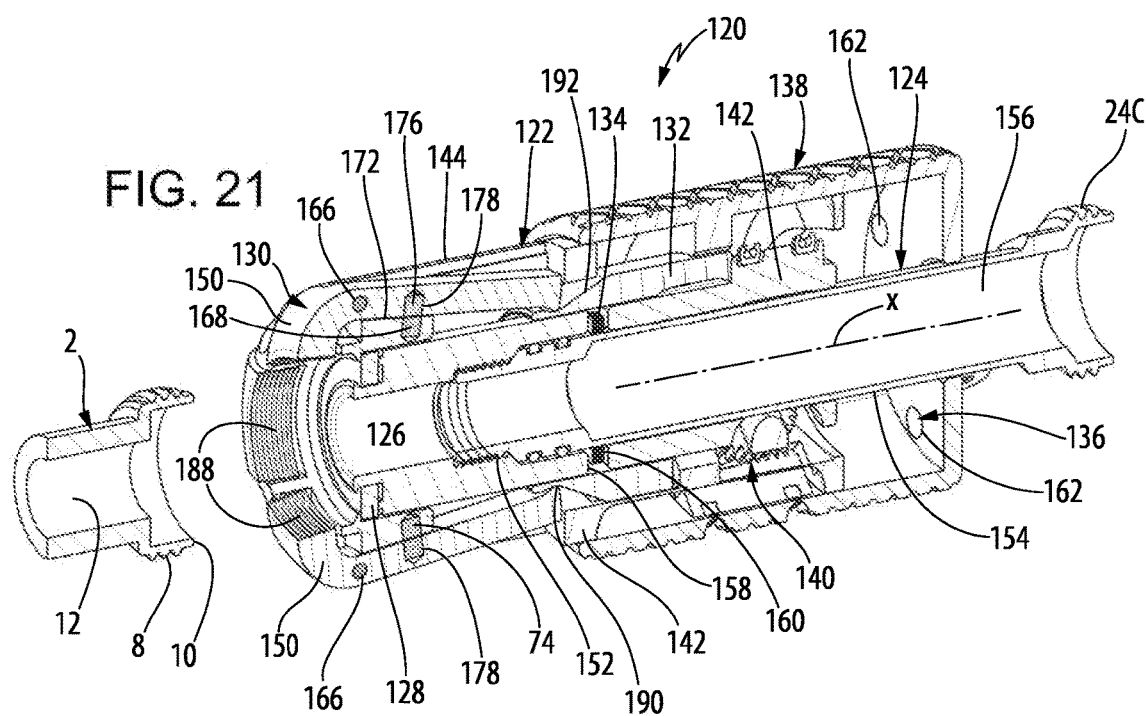
FIG. 21 is longitudinal sectional view of the coupling device and bib or spout of the faucet shown in FIG. 20.

Turning now to FIGS. 20 and 21 there is shown another and more preferred exemplary embodiment of a coupling device 120 of the subject invention. The coupling device 120 is configured for use on any type of second liquid carrier, whether the cylindrical end portion of which is threaded or not. Thus, the device 120 can be used on a liquid carrier 2 like shown in FIG. 1 and described above, or can be used on the outer surface the cylindrical portion of any liquid carrier which is not threaded, e.g., is a smooth continuous surface.

The coupling device 120 basically comprises a housing 122, a plunger 124, an engagement surface 126, a gasket ring 128, a clamp assembly 130, a cam member 132, a biasing spring 134, a locking assembly 136, a handle 138, a gear train assembly 140 and a carriage-ram 142. The housing 122 is an assembly of a nose or front section 144 (FIG. 22D) and a rear frame section 146, which are connected together to form a hollow interior space 148 having a central longitudinal axis X. The clamp assembly 130 is somewhat similar to the clamp assembly 32 of the coupling member 20 in that it includes a plurality, e.g., four, of pivotable jaws or pawls 150 for releasably clamping the cylindrical surface, e.g., the external threads 8, of the bib or spout 6. Each of the pawls 150 is pivotably mounted within an associated slots (to be described later) of the nose section 144, so that each pawl can be pivoted from the open position or state shown in FIGS. 20, 21, 33 to a closed or locked state shown in FIG. 35A. When in the closed or locked state serrated surfaces (to be described later) of the pawls 150 engage respective portions of the outside surface (diameter) of the hollow cylindrical portion of the bib, in this case the outside diameter of the external threads 8. That action locks the coupling device 120 to the bib 6. The pivoting of the pawls to the closed or locked state will be described in detail later. Suffice it for now to state that such action is accomplished by a conical cam surface (to be described later) of the cam member 132 engaging inner end portions of the pawls 150 as the cam member is moved down the longitudinal axis X in response to the sliding of the handle 138 along that axis in the distal (forward direction), i.e., towards the nose section 144. Once the pawls are in the locked state, the coupling device can be operated to move it to a sealed state. In the sealed state the gasket ring 128 will be tightly compressed to produce a good fluid tight seal between the bib and the coupling device. At that time the coupling device can be said to be in a locked and sealed position or state.

The engagement surface 126 functions in a manner somewhat similar to the function of the engagement surface 42 of the coupling device 20. To that end, the gasket ring 128 is mounted on the front end of the plunger 124 immediately in front of the engagement surface 126 so that it will be interposed between the planar free end surface 10 of the bib and the engagement surface 126 when the bib is introduced into the mouth of the coupling device 120. The plunger 124 is a hollow tubular member similar in construction and operation to the plunger of the coupling device 20. In particular, as best seen in FIG. 22C the plunger is an assembly of a front section 152 and a rear section 154, whose details will be described later. The plunger 124 includes a central passageway 156 extending through it from one end to the other for carrying liquid therethrough. The plunger is movable along the central longitudinal axis X of the coupling device 120 from an open position or state like shown in FIGS. 21 and 33, to a sealing position or state, like shown in FIG. 36A. In the sealing position or state the gasket ring 128 is tightly sandwiched between the planar free end surface 10 of the bib and the engagement surface 126 of the plunger 124 to form a good fluid-tight seal between the bib and the passageway 156. The rear end of the rear section 154 of the plunger includes a helical male thread 24C for releasable securement to the internally threaded connector 14 of the hose 4 like that described with reference to the coupling assembly 20.

The biasing spring 134 serves as the means of providing a biasing force onto the plunger to move the plunger to the sealing position once coupling device is in the locked state, i.e., the pawls 150 of the clamp assembly have engaged the outer surface of the bib to lock the jaws thereto. The bias provided by the biasing spring applies a desired compressive force to the gasket ring to cause that ring to deform slightly between the engagement surface 126 and the planar end surface 10 of the bib, thereby producing a fluid-tight seal therebetween preventing leakage of liquid at thereat.

The biasing force provided by the biasing spring 134 is achieved by the sliding of the handle 138 in the forward direction with respect to the housing 122. In particular, as will be described later, the sliding of the handle in that direction will be coupled through the gear train assembly 140 to the carriage-ram 142 and from there to the plunger 124 which then applies the bias force to the biasing spring 134. That action compresses the biasing spring between the rear end surface 158 of the front section 152 of the plunger 124 and a front end surface 160 of the carriage-ram 142 to provide a desired amount of bias force thereto to effect the appropriate compression of the gasket ring to ensure that a good fluid-tight seal results between the planar end surface 10 of the bib and the gasket ring. In one exemplary preferred embodiment of the coupling device 120 the bias force is chosen to be approximately sixty pounds to ensure that a good fluid-tight seal is produced. The gear train assembly is provided to produce a significant mechanical advantage that enables a user of the coupling device to apply significant less force on the handle 138 to slide it forward to produce the desired biasing force on the biasing spring 134. In particular, the configuration of the various gears, pinions and racks making up the gear train assembly, which will be described in detail later, enable a user to apply a force of only ten pounds on the handle to slide it forward so that the carriage-ram applies a sixty pound biasing force on the spring. That feature makes the device easy to use by persons who have limited strength and/or other physical limitations.

The locking assembly 136 is best seen in FIGS. 22, 22A, 22B, 22G, 29B, 29D, 32A and is in the form of a magnetic detent mechanism that is configured to hold the plunger 124 in the locked and sealed position or state. That mechanism basically comprises plurality or set of magnets 162 of one polarity fixedly secured in the handle 138 and a plurality or set of other magnets 164 of the opposite polarity fixedly secured to the end surface of the rear frame section 146 of the housing. In the exemplary embodiment shown the magnets 162 and 164 are of a button shape, but they can be of any other shape as well. In any case, when the handle 138 is slid forward during the sealing operation of the coupling device 120 the magnetic attraction between the magnets 162 and 164 will releasably secure the handle in the locked and sealed position. It should be noted that the magnets are configured so that the magnetic attraction between them can be overcome by the retraction of the handle to the rear of the coupling device with a force of approximately sixteen pounds. Thus, when it is desired to remove (disconnect) the coupling device 120 from the faucet that can be accomplished by pulling backward on the handle with a force of at least 16 pounds, a force well within the capabilities of most users of the coupling device.

Turning now FIGS. 22, 22D, 23A-23D, 27A-27C and 28A-28C the details of the clamp assembly 130 will now be described. That assembly basically comprises the four pawls 150, the nose or front section 144 of the housing, the cam member 132, a plurality of pivot pins 166, and a plurality of small, short height magnet rods 168 and 176. The nose or front section 144 includes a plurality, e.g., four, of equidistantly spaced slots or channels 170, each of which is configured to receive a respective pawl 150 therein. Each slot or channel includes a ramped surface 172. The ramped surface is planar and extends upward at an acute angle to the central longitudinal axis X. The surface 172 includes a bore 174 extending perpendicularly into it in which a respective short-height magnet rod 168 is fixedly secured. The magnet rod 168 is of one polarity and is configured to be magnetically attracted to an opposite polarity, but similarly sized and shaped, magnet rod 176 located in a bore 178 (FIGS. 28B and 28C) in a leg section 180 of an associated pawl 150. The magnetic attraction of the two opposite polarity magnets 168 and 176 holds the leg section of the pawl on the ramp surface 172, whereupon the pawl will be in its normally open position or state, like shown in FIGS. 21 and 33. The leg section of the pawl includes a bore 182 extending transversely to the leg section. A pivot pin extends 166 through the bore 182 and is anchored at each end in respective bores 184 (FIG. 22D) in the sidewalls of the slot or channel 170 in which the pawl is located, so that the pawl can be pivoted about the axis of the pivot pin.

Figure 28A:
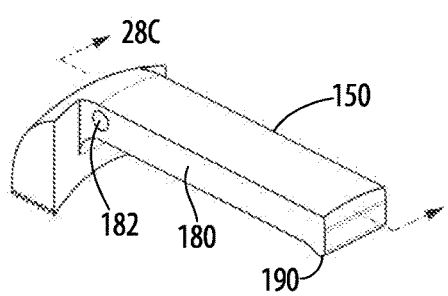
FIG. 28A is an enlarged isometric view of one pivotable jaw or pawl forming a portion of a clamping assembly of the coupling device shown in FIGS. 20-22.
Figure 28B:
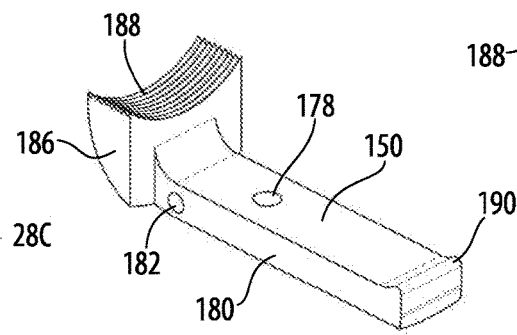
FIG. 28B is another enlarged isometric view of the jaw or pawl shown in FIG. 28A, but taken from a different angle.
Figure 28C:
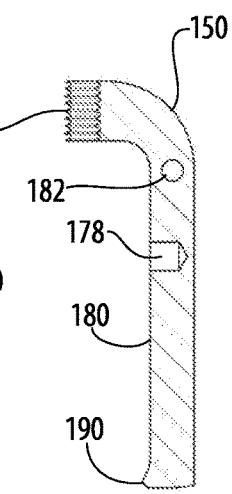
FIG. 28C is a sectional view taken along line 28C-28C of FIG. 28A.

As best seen in FIGS. 28A-28C each pawl 150 is a generally J-shaped member when viewed from the side, and whose leg section 180 is linear and elongate and whose front end is in the form of an enlarged width flange 186. The free end surface of the flange is in the form of a curved recess 188, whose radius of curvature is approximately that of the radius of curvature of the outer surface of the cylindrical portion of the bib that the pawl is to engage when the coupling device 120 is in the locked state. The surface of the recess 188 is serrated with small serrations running parallel to the width of the flange. The serrations are provided to facilitate the engagement or gripping of the pawl onto any type cylindrical portion of the faucet or bib or liquid-carrier, whether that cylindrical portion is externally threaded or is merely a smooth circular surface. The opposite or rear end of the leg 180 of each pawl is in the form of a slight rounded ridge 190 extending transversely across the leg. The ridge 190 is configured to ride or slide with respect to a cam surface of the cam 132 to effect the pivoting of the pawl from the normally open position or state shown in FIGS. 21 and 33 to the locked position or state shown in FIG. 35A.

Figure 33:
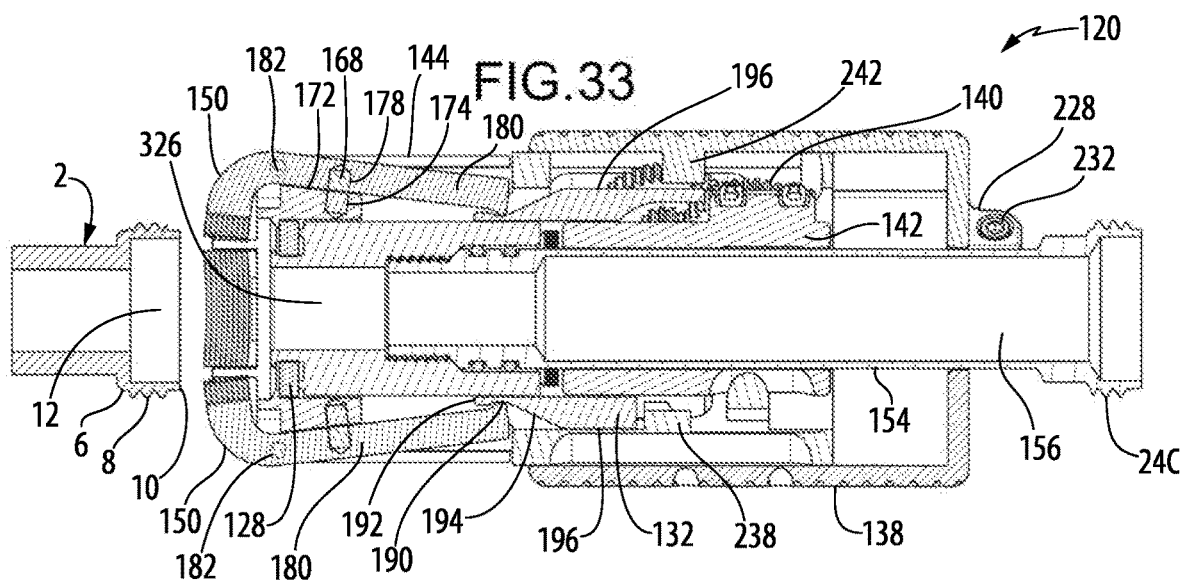
FIG. 33 is an enlarged longitudinal sectional view of the coupling device of FIGS. 20-22 shown in its normal state before being mounted on a bib of a faucet or other threaded or non-threaded liquid-carrier.

As best seen in FIGS. 23A-23D the cam member 132 is a hollow cylindrical member whose front end is in the form of a small bulbous externally projecting annular flange 192 from which a conically flared cam surface 194 projects upward and backward. The rear end of the cam surface 194 terminates in a cylindrical surface 196. A pair of recesses 198 is located diametrically opposed to each other at the rear end of the cam member to result in two tabs 200 and 202 to be located between the recesses 198. The outer surfaces of the tabs are of the same outside diameter as the cylindrical surface 196. Each tab includes a pair of internally threaded holes 204 which are configured to receive the threaded ends of hex head screws 206 to fixedly secure the cam member 132 to the handle 138. The ridge 190 of each pawl 150 is configured to be initially located within the annular space or recess between the small bulbous externally projecting annular flange 192 and the start of the cam surface 194 as best seen in FIG. 33 when the coupling device 120 is in the open position or state. As will be described later when the handle 138 is slid forward to the locked position or state that action slides the cam member 132 forward, whereupon the ridge 190 of each pawl will slide upward on the conical cam surface 194, thereby causing the pawls to pivot about their respective pivot pins 182 in the counter-clockwise direction against the bias provided by the magnets 128 and 176. When the handle is slid to the position shown in FIG. 35A each ridge 190 will start to slide on the cylindrical surface 196 of the cam member. At that point the pawls will be in their fully closed state, thereby clamping and locking them to the cylindrical surface of the bib, faucet or other liquid-carrier. Continued pushing of the handle forward will cause the ridge 190 to slide down the cylindrical outer surface of the cam member until it reaches the position shown in FIG. 36A, whereupon magnets of the locking assembly (to be described later) will engage one another so that the coupling device 120 will be in the locked and sealed position or state.

Figure 29A:
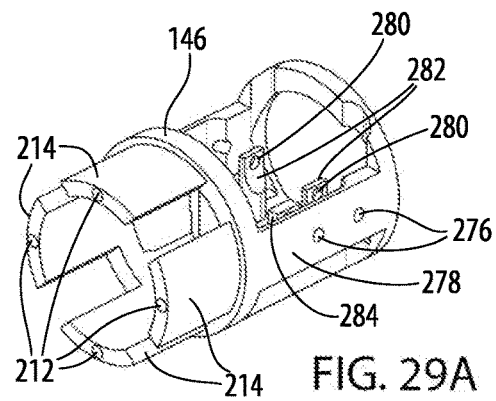
FIG. 29A is an enlarged isometric view of the rear or back section of the housing shown in FIG. 22D.
Figure 29B:
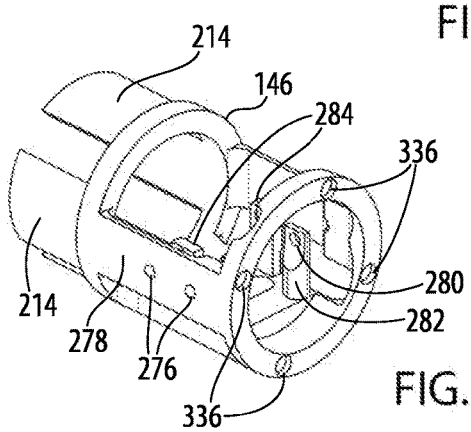
FIG. 29B is an enlarged isometric view of the rear or back section of the housing shown in FIG. 29A, but taken from a different angle.
Figure 29C:
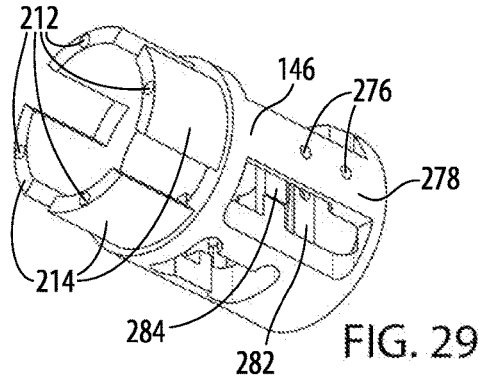
FIG. 29C is an enlarged isometric view of the rear or back section of the housing shown in FIG. 29A, but taken from still another different angle.
Figure 29D:
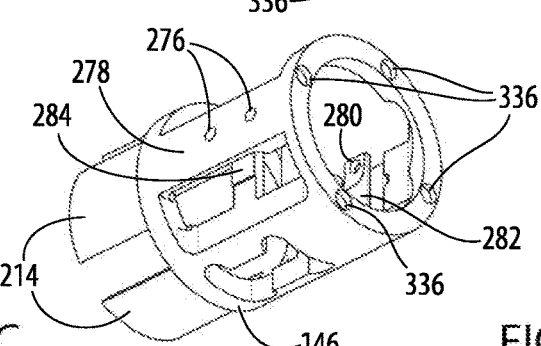
FIG. 29D is an enlarged isometric view of the rear section of the housing shown in FIG. 29A, but taken from yet another different angle.
Figure 29E:
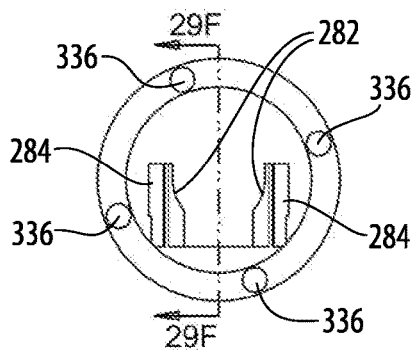
FIG. 29E is a rear end view of the rear section of the housing shown in FIG. 29A.
Figure 29F:
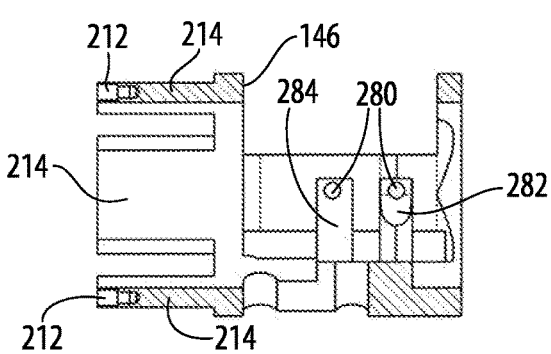
FIG. 29F is a longitudinal sectional view taken along line 29F-29F of FIG. 29E.

Turning now to FIGS. 22, 22D, 27A-27E, and 29A-29F, the details of the housing 122 will now be described. As noted earlier the housing is composed of the front or nose section 144 and the rear frame section 146, which are connected together. In particular, plural (e.g., four) partially externally threaded hex-head screws 208 are extended through longitudinally extending bores 210 (FIGS. 27A, 27D and 27E) in the nose section and into threaded engagement with longitudinally extending threaded bores 212 (FIGS. 29A, 29C and 29F) in respective arcuate tabs 214 at the front end of the rear frame section 146 to secure the nose section 144 to the frame section 146. More details of the construction of the rear frame section 146 will be given later with respect to the gear train assembly 140 and the mounting of some of its components.

Figure 34A:
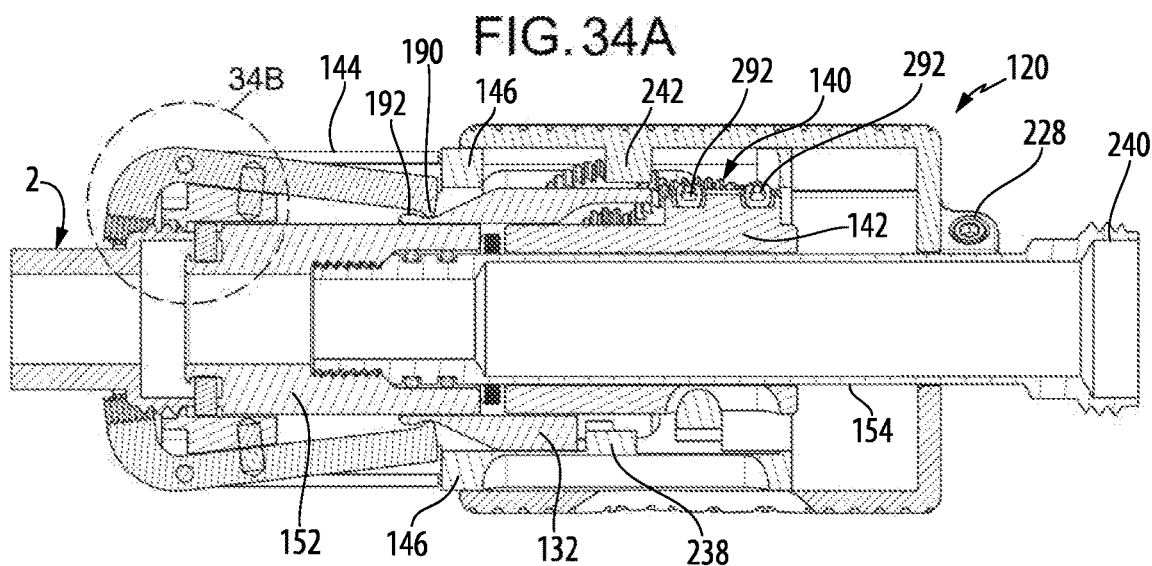
FIG. 34A is a longitudinal section view of the coupling device of FIGS. 20-22 at an initial, i.e., open, position or state, in the process of mounting it on a bib of a faucet like shown in FIG. 33.
Figure 34B:
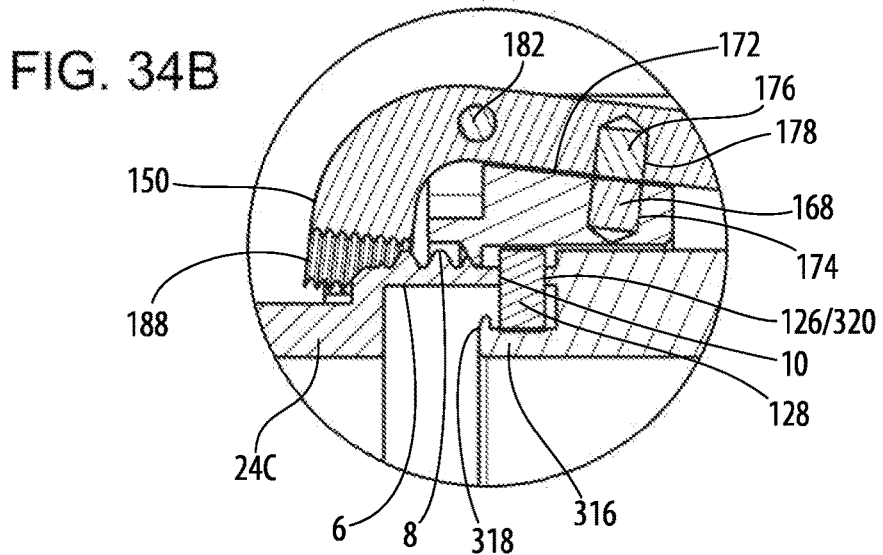
FIG. 34B is an enlarged view of the portion of the coupling device of FIG. 33 shown within the broken line circle 34B of FIG. 34A.
Figure 34C:
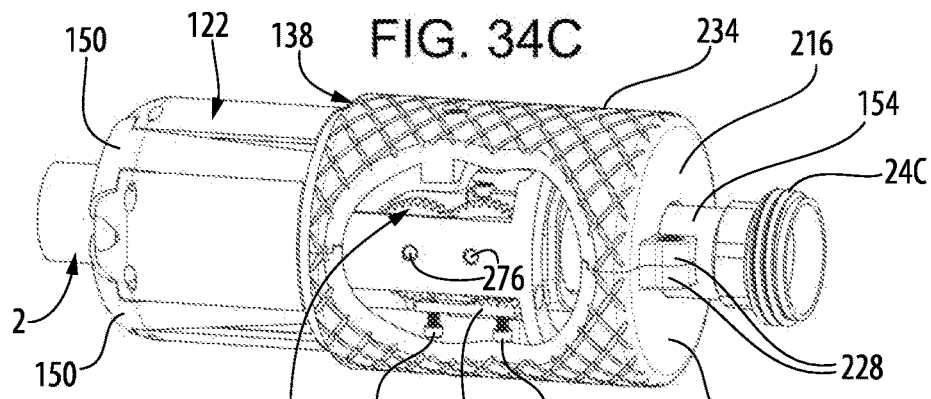
FIG. 34C is a reduced isometric view, partially broken away, of the coupling device in the open position or state shown in FIG. 33.
Figure 34D:
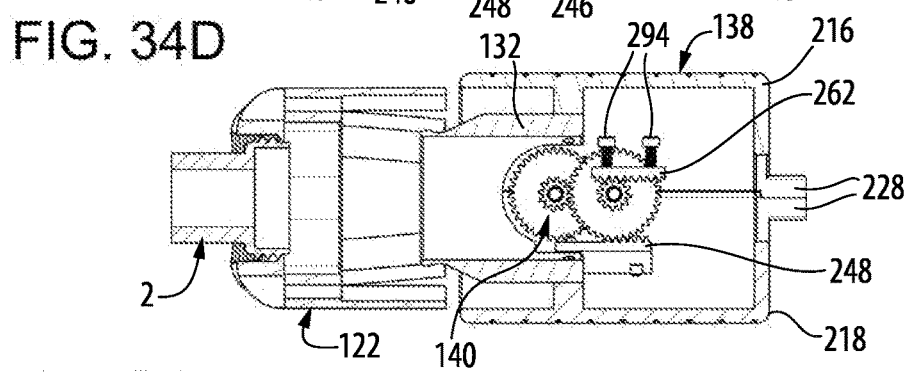
FIG. 34D is a reduced longitudinal section view of the coupling device of FIG. 33 shown in the open position or state, but with some components omitted in the interest of clarity.
Figure 34E:
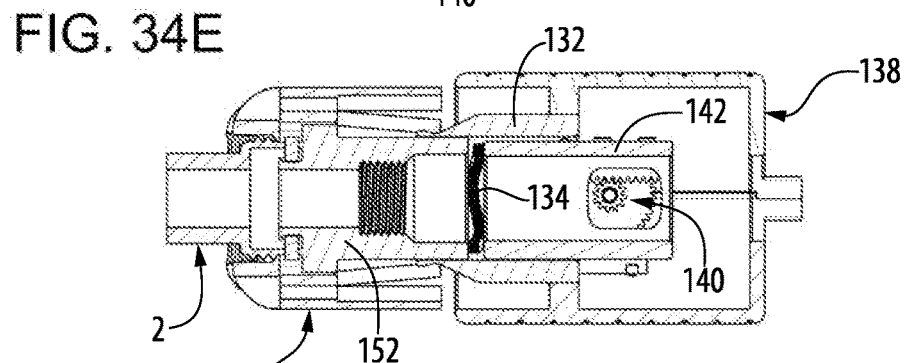
FIG. 34E is another reduced longitudinal section view of the coupling device of FIG. 33 in the open position or state of FIG. 34A, but with some components omitted in the interest of clarity.

Turning now to FIGS. 20, 22, 22A and 22B the details of the handle 138 will now be described. To that end, as can be seen the handle basically comprises an assembly of two sections 216 and 218 that are secured together. Each of the sections 216 and 218 includes a semi-cylindrical sidewall 220 and a planar semi-circular end wall 222. Each end wall 222 includes a semi-circular recess 224 located at the middle thereof. A planar flange 228 projects outward from the outer surface of the semi-circular end wall on opposite sides of the semi-circular recess 224 of the handle section 216. A similar flange 228, projects outward from the outer surface of the semi-circular end wall of the handle section 218. Each of the flanges 228 includes a threaded hole 230 therein to receive the threaded shank of a hex screw 232 (FIG. 22) to fixedly secure the two handle sections 216 and 218 to each other. When the two sections 216 and 218 are fixedly secured together the longitudinal linear edges of the semi-circular sidewalls 220 are in abutment to form a lapped joint therebetween, with the semi-cylindrical sidewalls conjoining to form a circular cylindrical sidewall 234 and with the semi-circular end walls forming a circular end wall having a central opening 236 between the flanges 228. The tubular portion of the rear section of the plunger 124 located adjacent the end portion 24C extends through that central opening as best seen in FIGS. 33, 34A and 34B. The outer surface of the sidewall 234 is knurled to facilitate gripping of the handle to slide it in the forward direction to the closed or locked position to mount the coupling device on the faucet, and to slide it to the rear to disconnect the coupling device from the faucet.

Figure 22A:
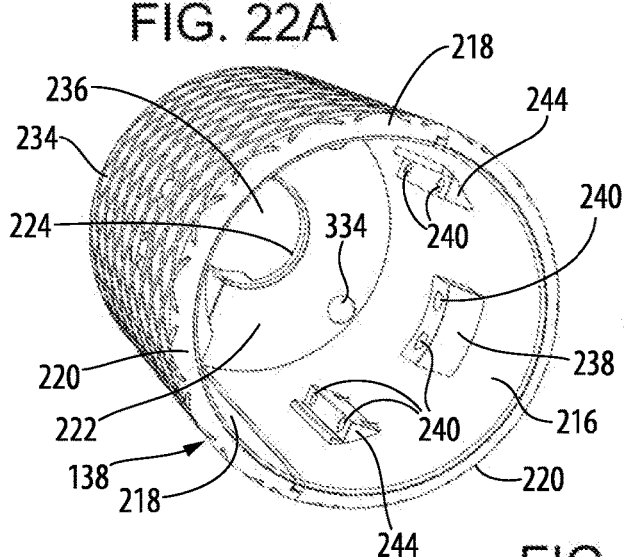
FIG. 22A is an enlarged isometric view of one component, i.e., a handle, making up the coupling device shown in FIGS. 20-22, with the handle being composed of two sections connected together.
Figure 22B:
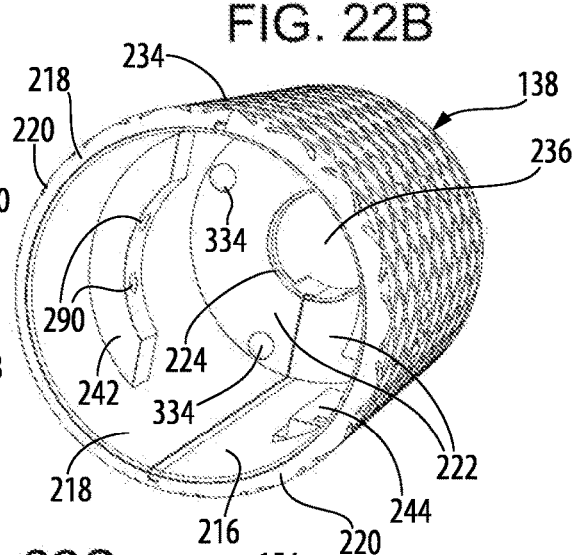
FIG. 22B is an isometric view, like that of FIG. 22A, but showing the handle from a different angle.
Figure 22C:
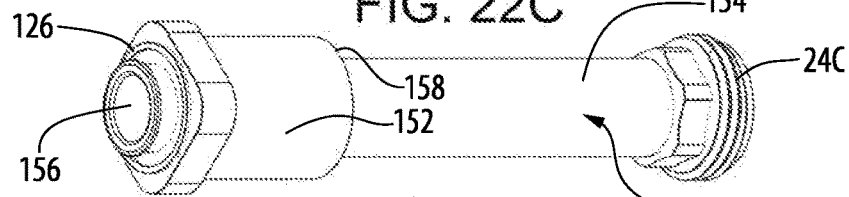
FIG. 22C is an enlarged isometric view of a plunger that makes up another component of the coupling device shown in FIGS. 20-22, with the plunger being an assembly composed of a rear section (shown in FIGS. 24A-24D) and a front section (shown in FIGS. 25A-25D), which are connected together.
Figure 22D:
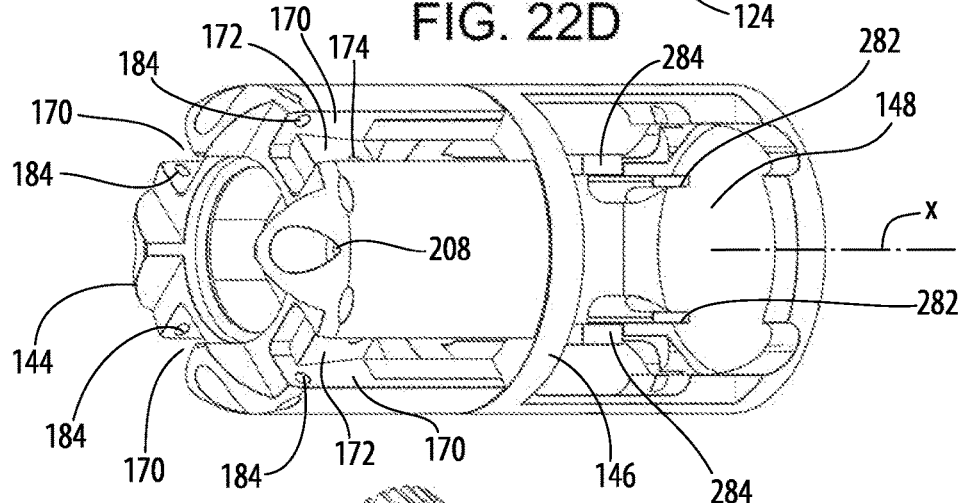
FIG. 22D is an enlarged isometric view of a housing that makes up another component of the coupling device shown in FIGS. 20-22, with the housing being an assembly composed of a front or nose section (shown in FIGS. 27A-27E) and a rear or back section (shown in FIGS. 29A-29F) which are connected together.

As can be seen in FIG. 22A the inner surface of the semi-circular sidewall 220 of the handle section 216 includes a projection or stand-off 238 projecting inward therefrom and transverse to the central longitudinal axis X. The stand-off 238 includes a concave top surface into which a pair of bores 240 extends for receipt of respective hex head screws 206 to fixedly secure the cam member 132 to that handle section. To that end the screws 206 are extended through the bores 240 and into threaded engagement with the threaded bores 204 in the tab 202 of the cam member. As best seen in FIG. 22B the inner surface of the semi-circular sidewall 220 of the handle section 218 includes a larger projection or stand-off 242 projecting inward therefrom and also transverse to the central longitudinal axis. The stand-off 242 includes a concave top surface into which a pair of bores 240 extend for receipt of respective hex head screws 206 to fixedly secure the cam member 132 to that handle section. To that end the screws 206 are extended through the bores 240 and into threaded engagement with the threaded bores 204 in the tab 200 of the cam member. As also best seen in FIG. 22A the inner surface of the semi-circular sidewall 220 of the handle section 216 includes a pair of projections or stand-offs 244 projecting inward therefrom and parallel to the central longitudinal axis X. Each of the stand-offs 244 includes a planar top surface into which a pair of bores 240 to receive the threaded shanks of respective hex head screws 246 to fixedly secure respective gear racks 248 (to be described later) of the gear train assembly 140 to the handle section 216.

Figure 22E:
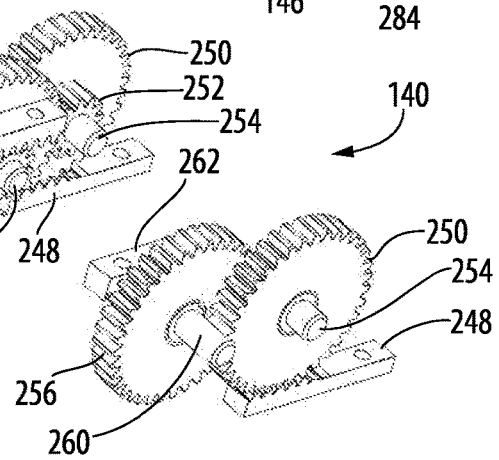
FIG. 22E is an enlarged isometric view of a gear train assembly that makes up another component of the coupling device shown in FIGS. 20-22, with the gear train being composed of a spur gears (shown in FIG. 31F), pinions (shown in FIGS. 31A and 31B) and gear racks (shown in FIGS. 31C-31F)
Figure 22F:
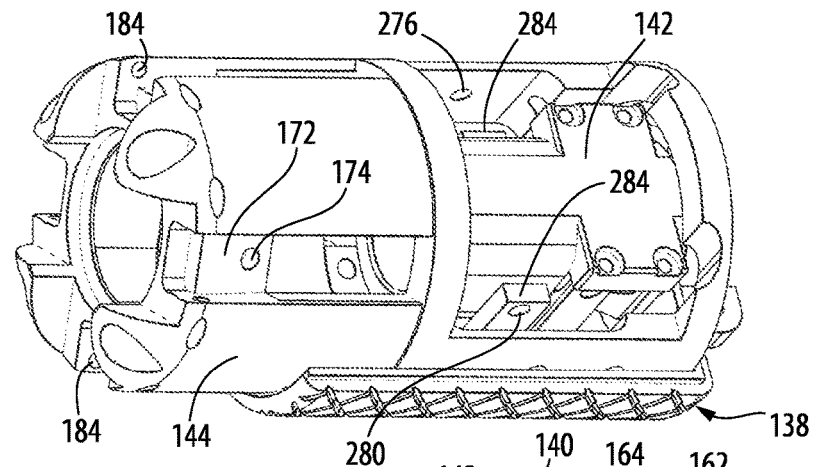
FIG. 22F is an enlarged isometric view of a portion of the coupling device of FIGS. 20-22, including the housing shown in FIG. 22D, one section of the handle shown in FIG. 22A and a carriage-ram component shown in FIGS. 26A-26D.
Figure 22G:
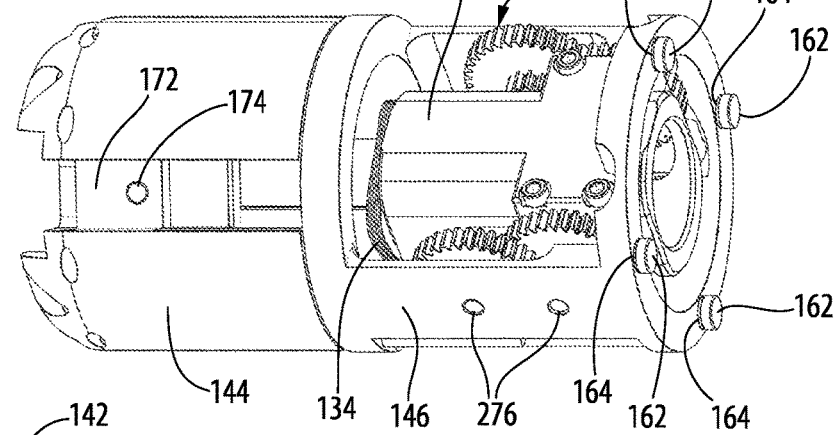
FIG. 22G is an enlarged isometric view of a portion of the coupling device of FIGS. 20-22, including the housing shown in FIG. 22D, the carriage-ram component (shown in FIGS. 26A-26D), the gear train assembly shown in FIGS. 22E, and plural magnets (shown in FIG. 32A)
Figure 22H:
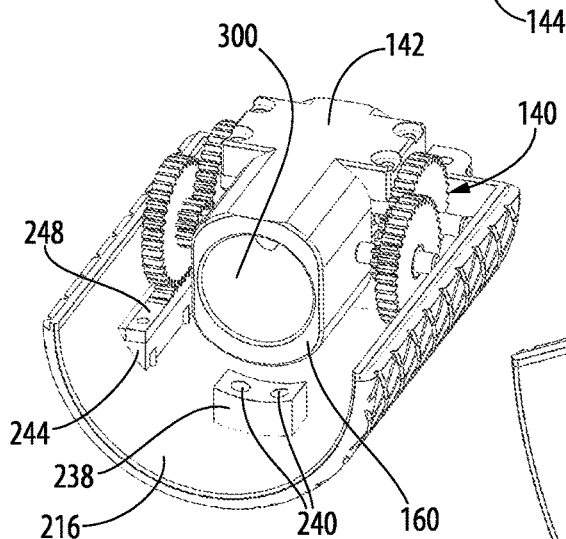
FIG. 22H is an enlarged isometric view of a portion of the coupling device of FIGS. 20-22, including the section of the handle shown in FIG. 22A, a portion of the gear train assembly shown in FIGS. 22E, and the carriage-ram component (shown in FIGS. 26A-26D) forming a portion of a locking assembly.
Figure 22I:
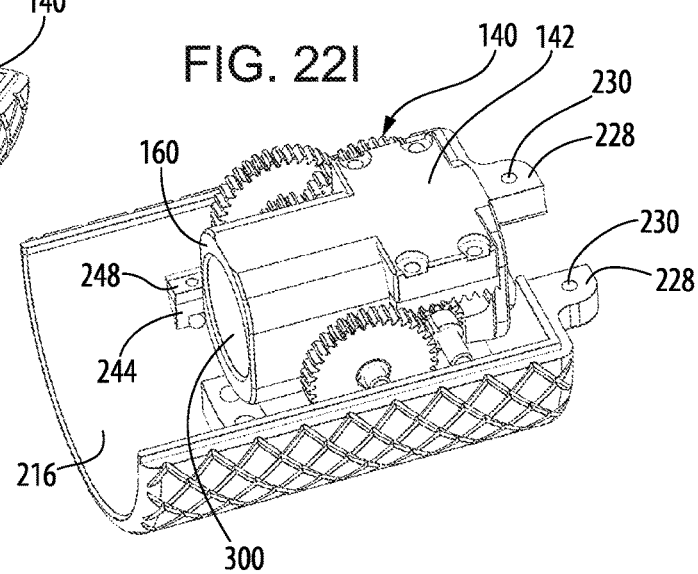
FIG. 22I is an enlarged isometric view of the portion of the coupling device shown in FIG. 22H, but taken from a different angle.
Figure 31A:
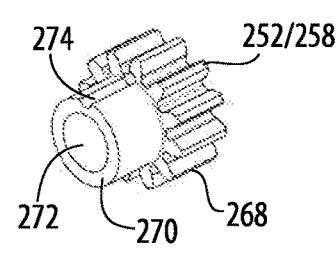
FIG. 31A is an enlarged isometric view of a pinion of the gear train assembly shown in FIG. 22E.
Figures 31B, 31C:
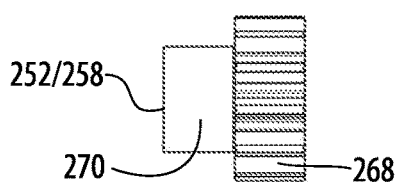
FIG. 31B is a side elevation view of the pinion shown in FIG. 31A.
FIG. 31C is an enlarged isometric view of a lower gear rack of the gear train assembly shown in FIG. 22E.
Figure 31D:
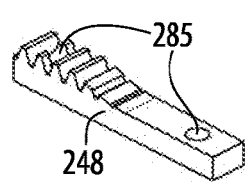
FIG. 31D is a side elevation view of the lower gear rack shown in FIG. 31C.
Figure 31G:
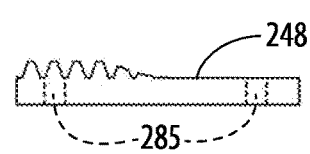
FIG. 31G is an enlarged isometric view of a spur gear of the gear train assembly shown in FIG. 22E.
Figure 31E:
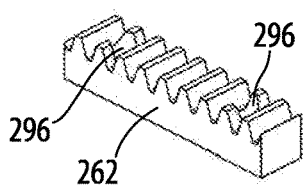
FIG. 31E is an enlarged isometric view of an upper gear rack of the gear train assembly shown in FIG. 22E.
Figure 31F:
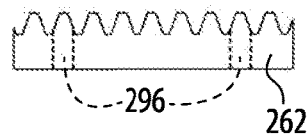
FIG. 31F is a side elevation view of the lower gear rack shown in FIG. 31C.
Figure 32A:
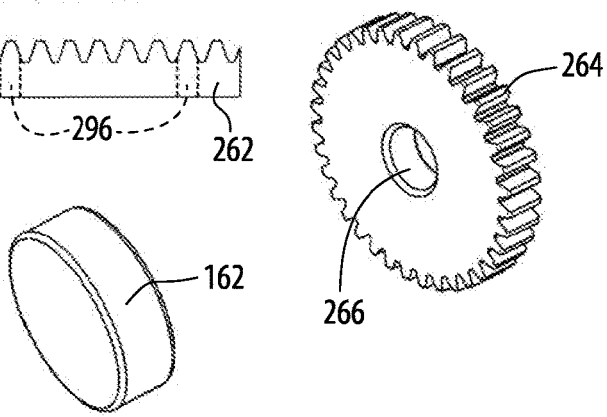
FIG. 32A is an enlarged isometric view of another component, i.e., a magnet disk forming a portion of the locking assembly, of the coupling device of FIGS. 20-22.

Turning now to FIGS. 22, 22E, 22G-22I, and 31A-31G the details of the gear train assembly 140 will now be described. It should be noted at this juncture that the gear train assembly actually comprises two identical image gear train assemblies that are fixedly secured between the handle section 216 and the rear frame section 146 of the housing 122. The two gear train assemblies are organized so that they are mirror images of each other. To that end, as best seen in FIG. 22E, each of the two gear train assemblies comprises the heretofore identified gear rack 248, a first circular spur gear 250, a first pinion gear 252, a first axle 254, a second spur gear 256, a second pinion gear 258, a second axle 260, and a second gear rack 262. The first and second spur gears are identical in construction to each other and are shown in FIG. 31G. Each basically comprises a circular disk having plural equidistantly spaced teeth 264 extending about its periphery, and a hole 266 in the center of the disk. The first and second spur gears are also of identical construction to each other and are shown in FIGS. 31A and 31B. Each basically comprises a circular disk of considerably smaller outside diameter than the spur gears 250/256, with a plural equidistantly spaced teeth 268 extending about the periphery of the disk, and an integral tubular hub 270 projecting outward from one side of the circular disk. The hub 270 includes a central bore 272 extending through it and through the disk to which the hub is secured. The outside diameter of the hub of the first pinion gear is equal to the inside diameter of the hole 266 in the first spur gear to be press fit therein so that the first pinion gear is fixedly secured to the first spur gear. In a similar manner the outside diameter of the hub 270 of the second pinion gear is equal to the inside diameter of the hole 266 in the second spur gear to be press fit therein so that the second pinion gear is fixedly secured to the second spur gear. It is important that the teeth of the first spur gear and the teeth first pinion gear be aligned at the proper angular position with respect to each other and that the teeth of the second spur gear and the teeth second pinion gear be aligned at the proper angular position with respect to each other. Thus the hub of the first pinion gear is inserted into the hole in the first spur gear and the two gears rotated with respect to each other to the desired angular orientation. Then a small hole extending parallel to the central axis of the central bore can be drilled into the interface between the outer surface of the hub and the inner surface of the hole in the spur gear and a small pin inserted into the drilled hole to fix the orientation of the teeth of the pinion gear with respect to the teeth of the spur gear and to prevent the rotation of the pinion gear with respect to the spur gear. In FIG. 31A there is shown a groove 274 that represents a half of the drilled hole that results when the interface between the hub of the pinion gear and the hole in the spur gear is drilled.

The first axle 254 extends through the central bore 270 of the first pinion gear so that the first spur gear and the first pinion gear can be rotated as a unit about the axis of the axle 254. In a similar manner the second axle 254 extends through the central bore 270 of the second pinion gear so that the second spur gear and the second pinion gear can be rotated as a unit about the axis of the second axle 260. The first axle 254 is mounted on the frame section 146 of the housing. In particular one end of the first axle is mounted in a bore 276 in a portion of the cylindrical sidewall 278 of the frame section 146. That bore is best seen in FIGS. 29A-29E. The opposite end of the first axle is mounted in a bore 280 in an upstanding projection or boss 282, which is also best seen in FIGS. 29A-29E. The second axle 260 is similarly mounted on the frame section 146. In particular, one end of the second axle is mounted in another bore 276 in a portion of the cylindrical sidewall 278 of the frame section 146 adjacent the bore in which one end of the first axle is mounted. The opposite end of the second axle is mounted in a bore 280 in another upstanding projection or boss 284 (FIGS. 22D, 22F, and 29A-29E) located adjacent the boss 282 at which the opposite end of the first axle is mounted.

The teeth of the first pinion gear 252 are configured to engage the teeth of the second spur gear, with the teeth of the second pinion gear engaging the teeth of the second gear rack 262. The second gear rack is fixedly secured to the carriage-ram 142. The teeth of the first spur gear 250 are configured to roll along and engage the teeth of the first gear rack 248, which as noted earlier is fixedly secured on the stand-off of the 244 of the handle section 216. The fixed securement of the gear rack to the stand-off is achieved by means of the threaded shafts of two threaded screws 246 extending into internally threaded holes 285 (FIGS. 31C and 31D) of the gear rack 248. Thus, when the handle 138 is slid in the forward direction the movement of the first gear rack 248 causes the first spur gear 250 to start to roll along that rack, thereby causing the first pinion gear 252 to rotate about the axis of the first axle 254. Since the teeth of the first pinion gear 252 engage the teeth of the second spur gear 256 that gear will be rotated about the axis of the second axle 260, thereby causing the concomitant rotation of the second pinion gear 258 about that axle. The rotation of the second pinion gear 258, whose teeth are in engagement with the teeth of the second gear rack 262 causes its teeth to engage the teeth of the second gear rack to thereby cause that gear rack to move in the forward direction. Since the second gear rack 262 is mounted on the carriage-ram 142, the movement of the second gear rack causes the carriage-ram to move forward. As should be appreciated by those skilled in the art, the mechanical advantage provided by the gears of the gear train as just described converts the amount of movement of the handle into a corresponding lesser movement of the carriage-ram but with a corresponding increase in the amount of force applied to the carriage-ram. Since the carriage-ram is configured to apply a bias force to the spring 134 when the carriage-ram pushes on the spring that bias force will be applied to the front section of the plunger and hence to the gasket ring 128 by the engagement surface 126. As mentioned earlier the particular embodiment of the gear train results in a mechanical advantage of 6:1, whereupon the application of 10 pounds of force on the handle will result in the application of 60 pounds of force on the gasket ring. That force is sufficient to ensure that the gasket ring is sufficiently compressed between the engagement surface and the planar end surface 10 of the faucet to ensure that liquid doesn't leak through that interface, but does not require undue effort by a user to produce that force.

Turning now to FIGS. 22, 22F-22H, and 26A-26D the details of the carriage-ram 142 will now be described. As can be seen it basically comprises a body having a front end portion 286, a rear end portion 288, and a flanged portion at the top of the rear end portion which forms a pair of ears 290. The underside of each ear 290 is configured to fixedly mount a respective gear rack 262 thereon. In particular, each ear 290 includes a pair of bores 292 extending through it for receipt of the shanks of a pair of hex head screws 294. The threaded end of each of the screws is configured to be screwed into a respective one of a pair of internally threaded bores 296 (FIGS. 31E and 31F) of a gear rack 262 to fixedly secure the gear rack to the undersurface of the ear. The body making up the carriage-ram is hollow and includes a pair of windows 298 on opposite sides of the rear end portion to accommodate the upstanding bosses 282 and 284 of the housing assembly when the carriage-ram is mounted therein. A longitudinal passageway 300 extends through the carriage-ram from the front surface 302 of the front section to the rear surface of the rear section. The front surface 302 is configured to apply the bias force to the spring 134 when the handle is slid to the locked position or state.

Figure 30A:
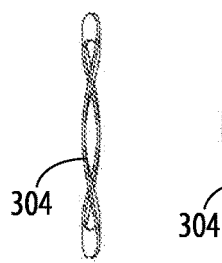
FIG. 30A is an enlarged side elevation view of another component, i.e., a wavy washer, forming a portion of biasing spring of the coupling device of FIGS. 20-22.
Figure 30B:
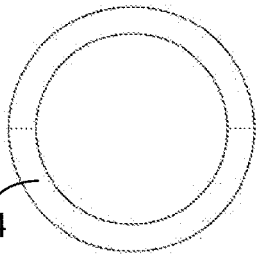
FIG. 30B is a front elevation view of the wavy washer shown in FIG. 30A.
Figure 30C:
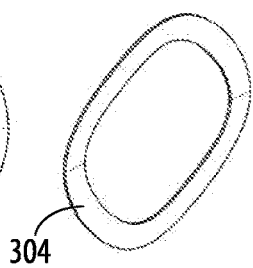
FIG. 30C is an isometric view of the wavy washer shown in FIG. 30A.

Turning now to FIGS. 22, and 30A-30C the details of the biasing spring 134 will now be described. That spring is a compression spring, which in this exemplary embodiment 120 basically comprises a stack of, e.g., eight, identical wavy washers 304, one of which is shown in FIGS. 30A-30C. Each wavy washer deformable from its normal unbiased wavy state, like shown in FIG. 304, to a flatter state by the application of a compressive force applied to it. Thus the application of the biasing force to the stack will tend to flatten the stack. One particularly suitable wavy washer for making up the stack is sold by Century Spring Corp. under the model designation WAV-24958.

Figure 25A:
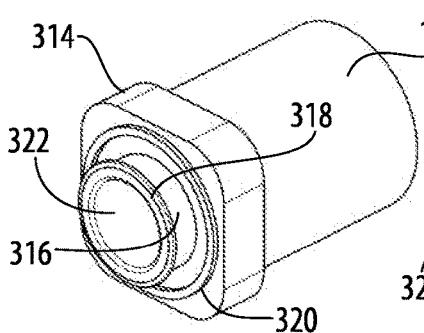
FIG. 25A is an enlarged isometric view of the front section of the plunger assembly shown in FIG. 22C.
Figure 25B:
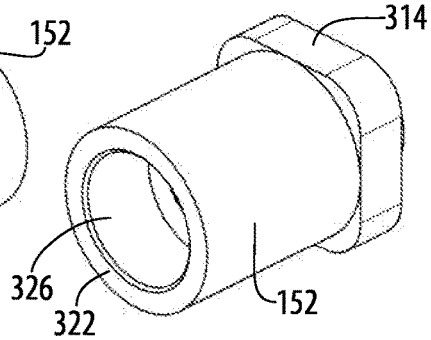
FIG. 25B is an enlarged isometric view of the front section of the plunger assembly shown in FIG. 22C but taken from a different angle.
Figure 25C:
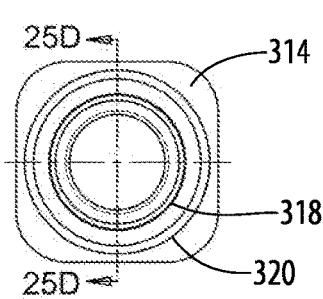
FIG. 25C is a front end view of the front section of the plunger assembly shown in FIG. 25A.
Figure 25D:
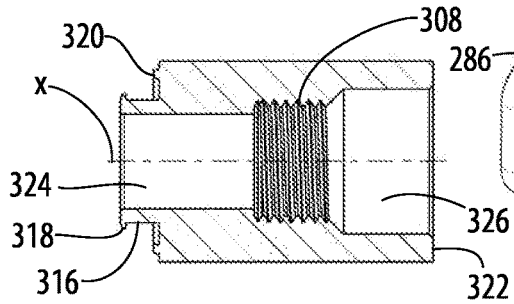
FIG. 25D is a sectional view taken along line 25D-25D of FIG. 25A.
Figure 26A:
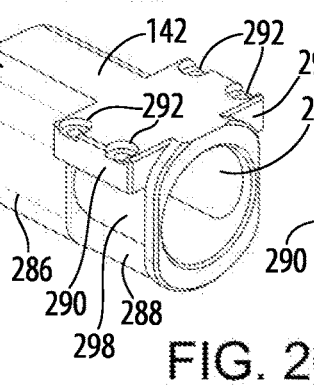
FIG. 26A is an enlarged isometric view of the carriage-ram component shown in FIGS. 22F-22I.
Figure 26B:
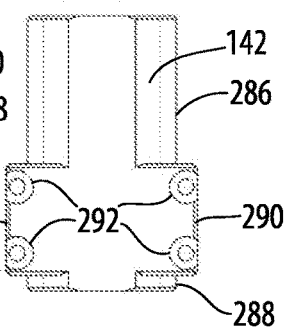
FIG. 26B is a top plan view of the carriage-ram component shown in FIG. 26A.
Figure 26C:
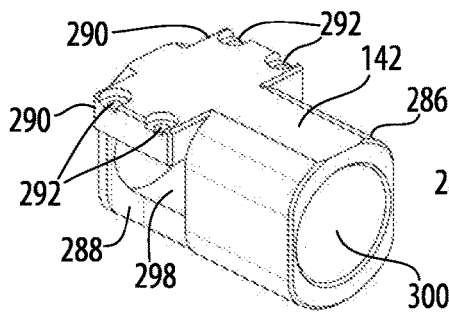
FIG. 26C is an enlarged isometric view of the carriage-ram component of FIG. 26A, but taken from another angle.
Figure 26D:
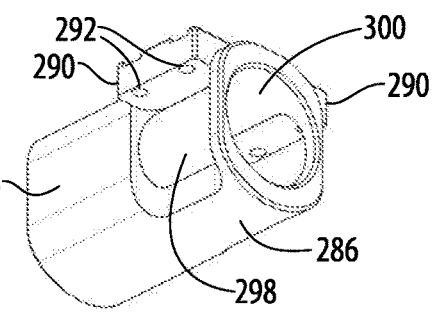
FIG. 26D is an enlarged isometric view of the carriage-ram component of FIG. 26A, but taken from still another angle.

The details of the plunger 124 will now be described. As mentioned earlier it is made up of an assembly of two components, namely, the front section a front section 152 (shown in FIGS. 25A-25D) and a rear section 154 (shown in FIGS. 24A-24D) which are connected together. As can be seen in FIGS. 24A-24D the rear section is an elongate tubular member whose rear end is constructed similarly to the rear end of the coupling member 24 of the coupling device 20. The heretofore identified passageway 156 extends through the rear section from its front end to its rear end. The front end of the rear section includes an external helical thread 306 which is configured to be screwed into a mating internally threaded bore 308 (FIG. 25D) in the rear portion of the front section 152 to secure the front and rear sections together. A pair or annular recesses 310 are provided in the outer periphery of rear section 154 immediately to the rear of the external threads 306. Each recess 310 is configured to seat a respective elastomeric O-ring 312 (FIG. 22). The front section 152 is also a tubular member whose front end is in the form of a rounded corner square flange 314. That rounded corner flange is configured to fit into correspondingly shaped hollow recess (to be described later) in the front or nose section 144. The front surface of the flange 314 is planar includes a first annular wall 316 projecting outward from it and centered about the central longitudinal axis X. The outer end of the annular wall 316 includes a small annular flange 318 extending outward from the outer surface of the annular wall at the front end of the annular wall. The annular wall 316 serves as the means for mounting the gasket ring 128 onto the front section of the plunger. The gasket ring 128 is a disk-like member formed of any suitable material, e.g., a rubber washer or other elastomeric material, and has a central opening through which the annular wall 316 extends, with the annular flange 318 overlying a portion of the front surface of the gasket ring contiguous with the central opening in the gasket ring. The front surface of the flange 314 also includes a second annular wall 320 projecting outward from it. The annular wall 320 is also centered about the central longitudinal axis and forms the engagement surface 126. In accordance with one preferred aspect of this invention the annular wall 320 is of the same size as the free end surface 10 of the bib of the faucet and is arranged to be axially aligned with the free end surface 10 when the coupling device 120 is mounted on the faucet. Thus, when the coupling device is in the locked and sealed state the gasket ring will be tightly compressed between the free end surface 10 of the bib and the engagement surface 126 to form a good fluid tight seal therebetween.

The front section 152 of the plunger includes a central passageway extending through it from the front surface of the annular wall 316 to the rear surface 322. The central passageway includes a front section 324 that is contiguous with the front surface of the annular wall 316 and a rear section 326 that is contiguous with the rear surface 322. The two sections 324 and 326 are in fluid communication with each other. The internal diameter of the front section 324 is slightly smaller than the internal diameter of the rear section 326. The interface of the front and rear sections is the internally threaded bore 308. When the externally threaded end 306 of the rear section 154 of the plunger is screwed into the internally threaded bore 308 to connect the two sections of the plunger together the two O-rings 312 are tightly compressed between the bottom of the annular grooves 310 in which they are located and the inner surface of the rear section 326 of the central passageway through the front section of the plunger. Thus, liquid can readily flow into the plunger from the bib, faucet or other liquid-carrier and through the two sections of the plunger without leakage at the interface of those two sections.

Figure 27A:
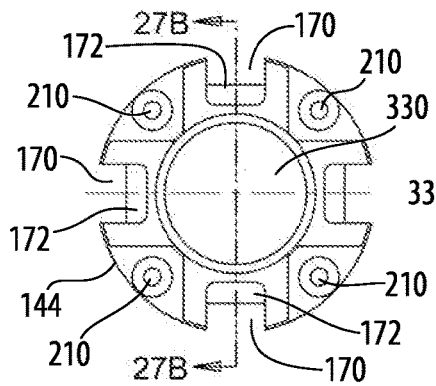
FIG. 27A is an enlarged front view of the front or nose section of the housing shown in FIG. 22D.
Figure 27B:
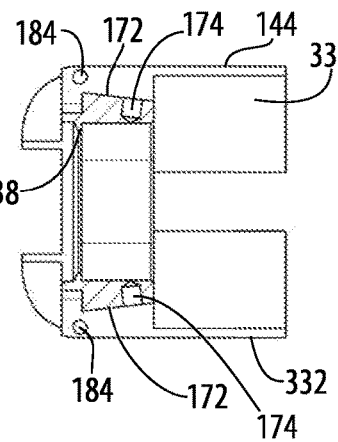
FIG. 27B is a longitudinal sectional view taken along line 27B-27B of FIG. 27A.
Figure 27C:
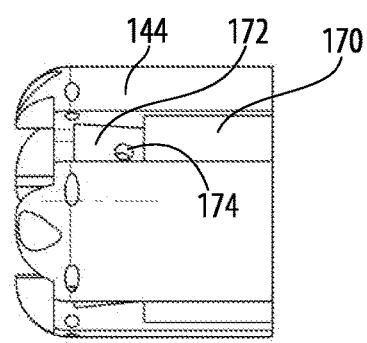
FIG. 27C is a side elevation view of the front or nose section of the housing shown in FIG. 27A.
Figure 27D:
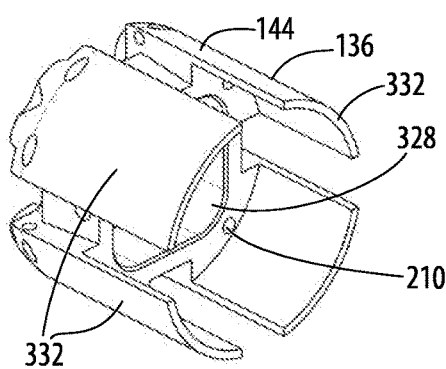
FIG. 27D is an enlarged isometric view of the front or nose section of the housing shown in FIG. 27A, but taken from a different angle.
Figure 27E:
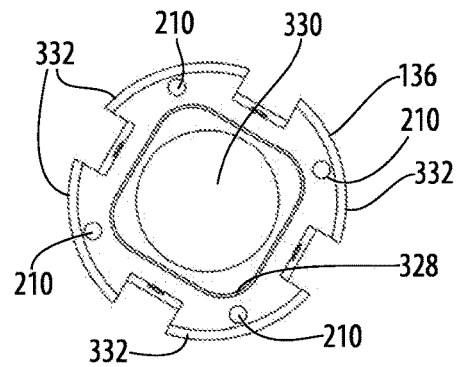
FIG. 27E is a rear end view of the front or nose section of the housing shown in FIG. 27A.

As mentioned earlier the rounded corner flange 316 of the front section 152 of the plunger is configured to fit within a correspondingly shaped hollow interior portion of the front or nose section 144 of the housing. In particular, as best seen in FIGS. 27D and 27E the front or nose section 144 includes a hollow recess 328 whose transverse cross section is a square with rounded corners so that the flange 316 of the front section 152 of the plunger can be slid into it. The front end of the hollow recess is in the form of a circular passageway 330 (FIGS. 27A and 27E) to provide access to the gasket ring 128 on the front end of the plunger section 152. The front or nose section includes four thin equidistantly space arcuate tabs 332 projecting at the rear end of the nose section 144. The tabs are configured to overlie respective ones of the arcuate tabs 214 of the rear frame section 146 when the front or nose section 144 is secured to the rear frame section.

Turning now to FIGS. 22A, 22B, 22G, 29B, 29D, and 29E the details of the locking assembly 136 will now be described. The locking assembly is in the form of a magnetic detent mechanism. In particular, as can be seen in FIGS. 22A and 22B the handle 138 includes a plurality, e.g., four, of button shaped magnets 162 of one polarity fixedly secured in respective equidistantly spaced recesses 334 in the inner surface of the circular end wall of the handle 138. A plurality of, e.g., four, button shaped magnets 164 of opposite polarity are fixedly secured in respective equidistantly spaced recesses 336 (FIGS. 22G, 29B, 29D and 29E) in the rear end surface of the rear frame section 146 of the housing. The button magnets 162 and 164 are axially aligned. Thus, when the handle 138 is slid forward during the sealing operation of the coupling device 120 the magnetic attraction between the button magnets 162 and 164 will releasably secure the handle in the locked and sealed position. It should be pointed out at this juncture that the magnetic detent assembly need not include magnets of opposite polarity. Thus, the set of magnets 162 or the set of magnets 164 can be replaced by a set of buttons that are not magnetic, but are formed of any type of material that will be attractive to a magnetic force produce by a magnet. In fact, the detent mechanism making up the locking assembly need not be a magnetic detent mechanism, but could be a mechanical detent mechanism, e.g., like that of the coupling device 20 or some other mechanical detent mechanism.

The use and operation of the coupling device 120 will now be discussed with reference to FIGS. 20, 21 and 33-36C. The coupling device 120 is normally in its open state, like shown in FIGS. 20, 21 and 33. In the open state the handle 138 is in the rearmost position, whereupon the connected cam member 132 is in its retracted position. In that position the ridge 190 on the inner end of each of the pawls 150 of the clamping assembly is located at the interface of the bulbous flange 192 and the conical cam surface 194 of the cam member, whereupon the pawls are pivoted to the open position, with their leg sections 180 resting on the ramp surface 172 of the nose section 144 and held in that position by the engagement of the small magnet rods 168 and 176. Moreover, the plunger 124 will be in its retracted position, as will be the carriage-ram 142.

When it is desired to mount the coupling device 120 onto the bib of the faucet 2 the nose of the coupling device is juxtaposed opposite the bib, faucet or other liquid-carrier like shown in FIG. 33. The coupling device 120 is then moved towards the bib like shown in FIG. 34A so that an annular wall 338 (FIGS. 27B and 34B) on the nose section 144 located radially inward from the ramp surface 172 engage the leading portion of the helical thread 8 on the bib and thus acts as a stop. That engagement action centers the coupling device to the bib, whereupon the engagement surface 126 (which is formed by the outer surface of the annular ring 320) is axially aligned with the planar end surface 10 of the bib. At this time the gasket ring 126 will be interposed between the planar end surface 10 and the engagement surface 126, but will not be compressed so that it will not produce a fluid-tight seal between the bib and the passageway in the plunger. In this open state, all of the components making up the coupling device 120 will be in the same position and state as shown in FIGS. 20, 21 and 32.

Figure 35A:
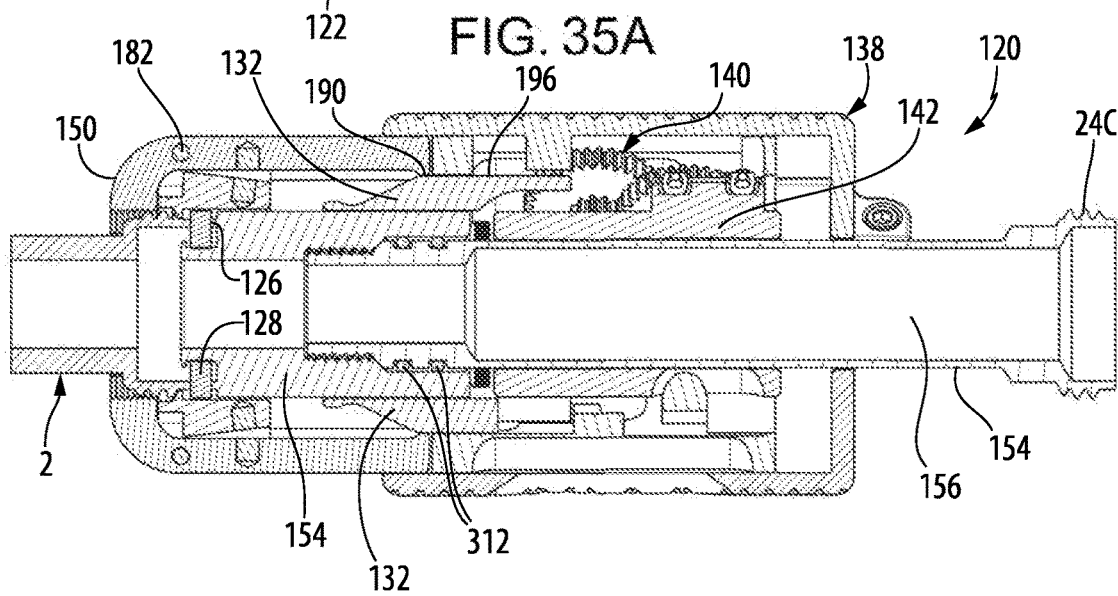
FIG. 35A is an enlarged longitudinal sectional view of the coupling device of FIG. 33 at a subsequent, i.e., locked, position or state, in the process of mounting it on the bib.
Figure 35B:
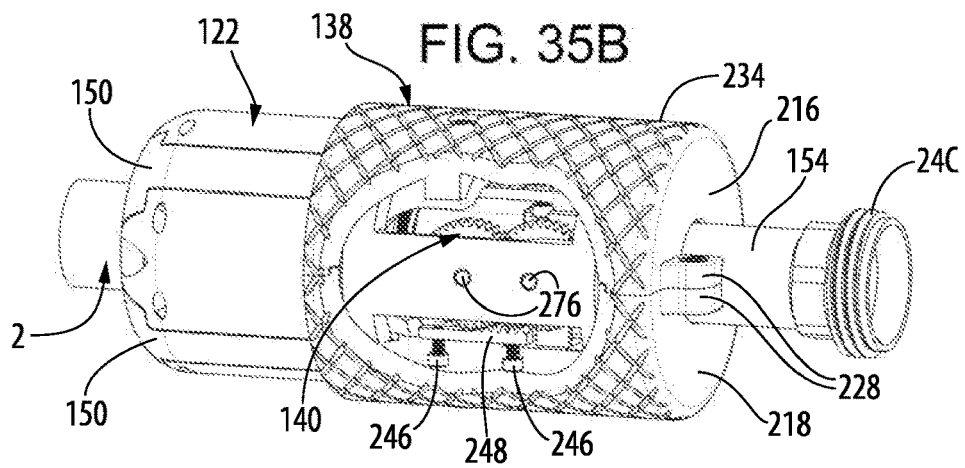
FIG. 35B is a reduced isometric view, partially broken away, of the coupling device of FIG. 33 in the locked position or state.
Figure 35C:
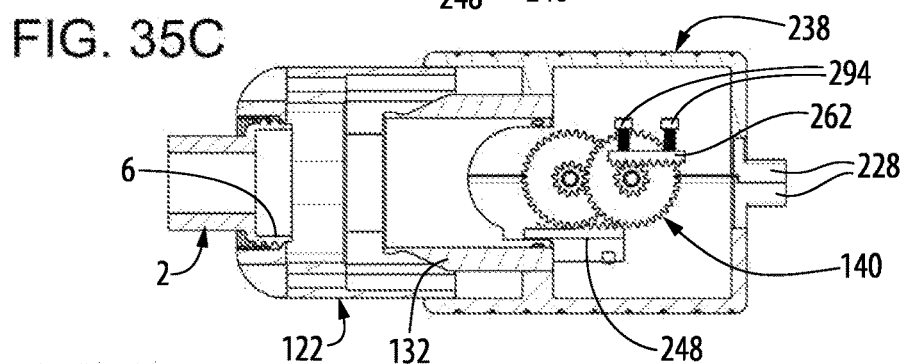
FIG. 35C is a reduced longitudinal section view showing the coupling device of FIG. 33 in the locked position or state, but with some components omitted in the interest of clarity.
Figure 35D:
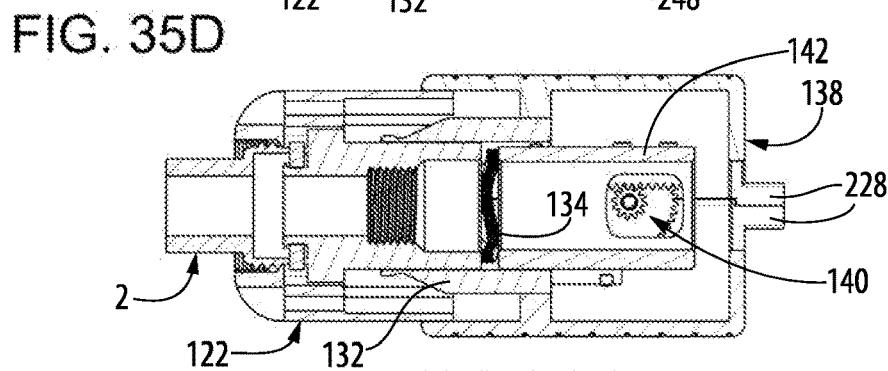
FIG. 35D is a reduced longitudinal section view showing the coupling device of FIG. 33 in the locked position or state, but with some components omitted in the interest of clarity.

In order to releasably secure or lock the coupling device 120 to the bib, the handle 138 is pushed forward along the central longitudinal axis X to the position shown in FIG. 35A, whereupon the cam member cam member 132, which is connected to the handle, is slid forward. That action causes the rounded ridge 190 on each pawl to slide up the conical cam surface 194, thereby pivoting each pawl 150 in the counter-clockwise direction about their respective pivot pins 182 against the holding force bias provided by the magnets 168 and 176, whereupon the serrated surface 188 of each pawl tightly engages the outer surface of the helical threads 8 of the bib. This action releasably locks the pawls of the clamping assembly to the bib. When the pawls are locked in place on the bib, the ridge 190 each pawl will have reached the cylindrical outer surface 196 of the cam member. At this point the plunger 124 and the carriage-ram 142 will still be in their retracted positions The coupling device 120 is now ready to be placed in its locked and sealed state (it already being in the locked stated as described immediately above). To that end, the handle 138 is slid forward along the central longitudinal axis X. This action initiates the sliding of the carriage-ram 142 forward. In particular, as described earlier the movement of the handle 138 is coupled through the gear train assembly 140 to move the carriage-ram 142 forward, thereby applying the bias force on the stack of wavy washers 304 making up the compression spring 134. The bias force applied to the spring is a multiple of the force applied to the handle 138 to move it forward to collapse the wavy washers. As described earlier in this exemplary embodiment of the coupling device 120, the gears are configured to provide a mechanical advantage of 6:1, whereupon a force of 10 pounds pushing the handle forward results in a compressive force on the spring of 60 pounds. The compressive force applied to the spring 134 is applied by the spring onto the rear surface of the front section 152 of the plunger 124, thereby sliding the plunger forward. Since the pawls of the clamping member, which are mounted in the nose section of the housing are locked to the bib, the sliding action of the plunger forward causes the engagement surface 126 to tightly sandwich and deform the gasket ring 128 between it and the planar end surface 10 of the bib. That action tightly seals the bib to the plunger so that no liquid can leak out of the interface with the compressed gasket ring. Thus, the coupling device 120 will now be in the locked and sealed state.

As discussed earlier the coupling device 120 includes a detent mechanism for releasably holding the coupling device in its locked and sealed state. Without some detent or other mechanism to hold the plunger in the sealed position the biasing spring would tend to assume its uncompressed or unbiased state, thereby tending to push the plunger back towards the rear of the coupling device, thereby undoing the fluid-tight seal of the gasket ring. The detent mechanism prevents such un-wanted action. Thus, when the handle 138 has been moved to its forward-most position tightly sealing the gasket disk in the locked and sealed state, the magnets 162 that are fixedly secured to the inner surface of the circular end wall of the handle, will be in magnetic engagement with the aligned and opposite polarity magnets 164 secured in the recesses 336 in the rear surface of the frame section 146. The magnetic attractive force produced by those magnets is sufficiently high, e.g., approximately sixteen pounds, to overcome the bias force provided by the compressed spring 134. Thus, the plunger will be releasably locked in the locked and sealed state and will remain in that state until a force higher than the magnetic attractive force is applied to the handle to move the handle in the rearward direction. The magnetic attractive force is selected to be sufficiently high to normally hold the coupling device 120 in the locked and sealed state, so that once in that state the coupling device can be left in place with the user assured that it will not be accidentally disconnected from the bib.

When removal of the coupling device from the bib is desired, all that is necessary is for a user to grasp the handle 138 and pull it to the rear (i.e., away from the bib) with a force in excess of the magnetic bias force to release the detent mechanism. Thus, once the detent mechanism has been released the compression spring will tend to assume its normal unbiased state, thereby pushing carrier-ram 142 to the rear, which rearward movement will be coupled by the gear train assembly 140 to move the handle to the rear. Since the cam member 132 is fixedly secured to the handle, the movement of the handle to the rear will result in the concomitant movement of the cam member to the rear. That action results in the ridge 190 of each pawl 150 sliding along the cylindrical surface 196 of the cam member and then onto the conical surface 194, whereupon the pawls will begin to rotate in the clockwise direction which initiates the release of the clamping assembly from the bib. The complete release of the clamp assembly from the bib occurs when the magnets 168 and 176 engage each other, whereupon a portion of the leg of each pawl 150 will be in engagement with the ramp surface 172 and the coupling device will again be in its open state.

Figure 36A:
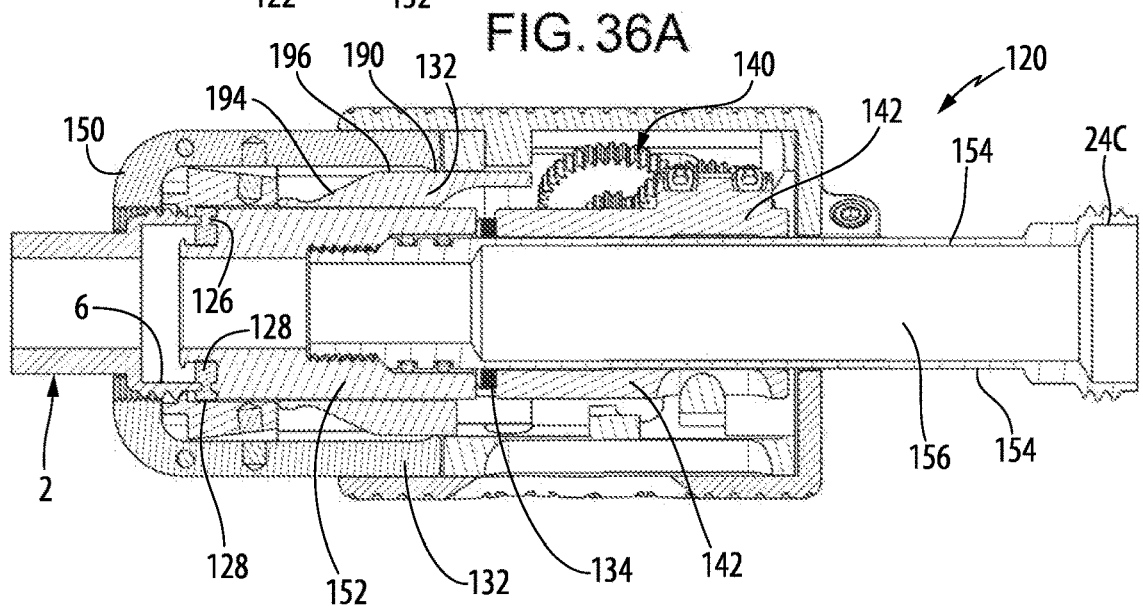
FIG. 36A is an enlarged longitudinal sectional view of the coupling device shown in FIG. 33 at a still later, i.e., locked and sealed position or state wherein it is fully mounted on the bib.
Figure 39A:
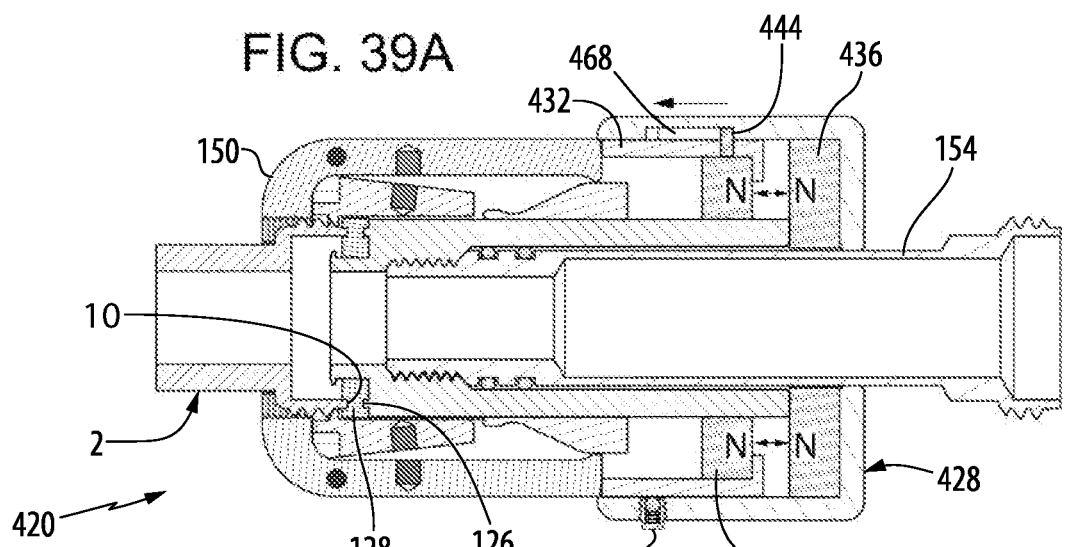
FIG. 39A is an enlarged longitudinal sectional view taken along line 39A-39A of FIG. 38C showing the coupling device of FIG. 37A at the start of the release position or state.
Figure 40A:
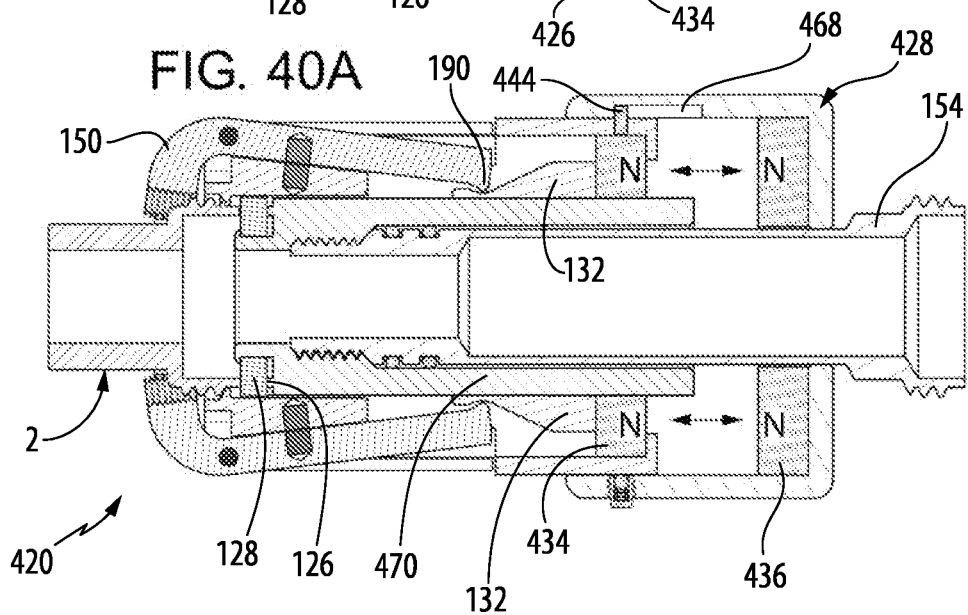
FIG. 40A is a longitudinal sectional view similar to FIG. 39A, but showing the coupling device of FIG. 37A in its fully released position or state, whereupon the coupling device can be removed from the bib.

Turning now to FIGS. 37-43A there is shown another more preferred exemplary embodiment of a coupling device 420 of the subject invention. The coupling device 420 is similar in most respects in construction and operation to the coupling device 120. For example, it is also configured for use on any type of second liquid carrier, whether the cylindrical end portion of which is threaded or not, and makes use of a similar clamping assembly, assembly, a somewhat similar plunger, a gasket ring, and similar engagement surface. The coupling device 420 differs from the coupling device 120 inasmuch as makes use of a magnetic mechanism that obviates the need for a gear assembly, a pusher and a compression spring. The coupling device 420 also makes use of a mechanical detent mechanism in place of the magnetic detent mechanism of the coupling device 120. In the interest of brevity the components of the coupling device 420 which are the same as that of the coupling device 120 will be given the same reference number and their construction, organization and operation will not be reiterated. Thus, as can be seen in FIG. 36A the coupling device 420 basically comprises a housing 422, a plunger 424, an engagement surface 126, a gasket ring 128, a clamp assembly 130, a cam member 132, a locking assembly 426, a handle 428 and a magnetic actuator mechanism 430.

The housing 422 is an assembly of a nose or front section 144 (FIG. 22D) and a rear frame section 432, which are connected together to form a hollow interior space therein having a central longitudinal axis X. The clamp assembly 130 includes a plurality, e.g., four, of pivotable jaws or pawls 150 for releasably clamping the cylindrical surface, e.g., the external threads 8, of the bib or spout 6 or a smooth external surface of the bib or spout if that bib or spout does not include external threads. Each of the pawls 150 is pivotably as described above so that each pawl can be pivoted from the open position or state shown in FIG. 37A to a locked and sealed state shown in FIG. 39A. When in the locked and sealed state the serrated surfaces 188 of the pawls engage respective portions of the outside surface (diameter) of the hollow cylindrical portion of the bib 6 (in this case the outside diameter of the external threads 8). That action locks the coupling device 420 to the bib 6. The pivoting of the pawls to the locked and sealed state is accomplished by a conical cam surface 194 of the cam member 132 engaging ribbed inner end portions 190 of the pawls 150 as the cam member is moved down the longitudinal axis X in response to the sliding of the handle 428 along that axis in the distal (forward direction), i.e., towards the nose section 144.

Figure 42A:
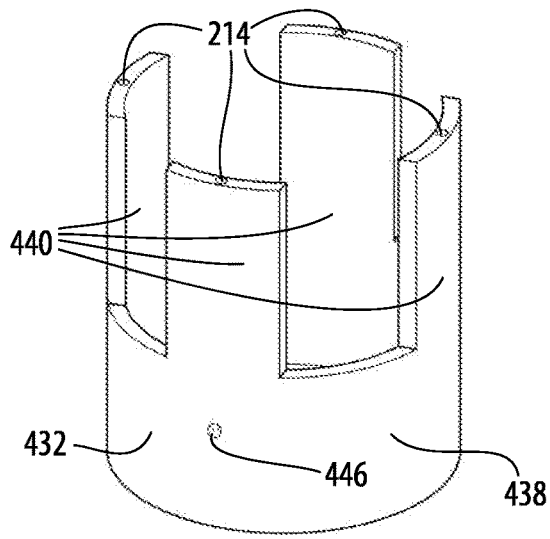
FIG. 42A is an enlarged isometric view of a rear housing component of the coupling device of FIG. 37A.
Figure 42B:
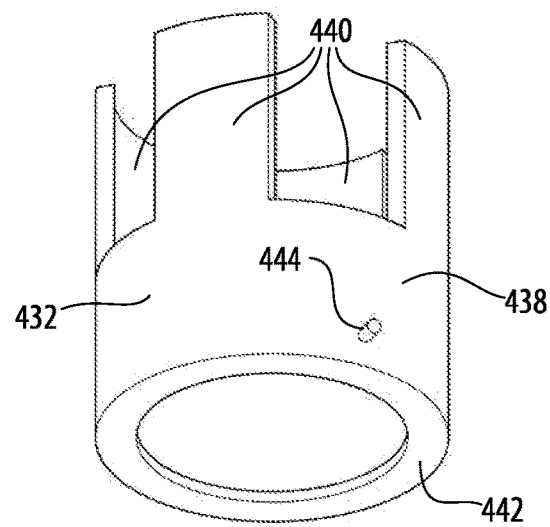
FIG. 42B is an enlarged isometric view of the rear housing component shown in FIG. 42A, but taken from a different angle.
Figure 43:
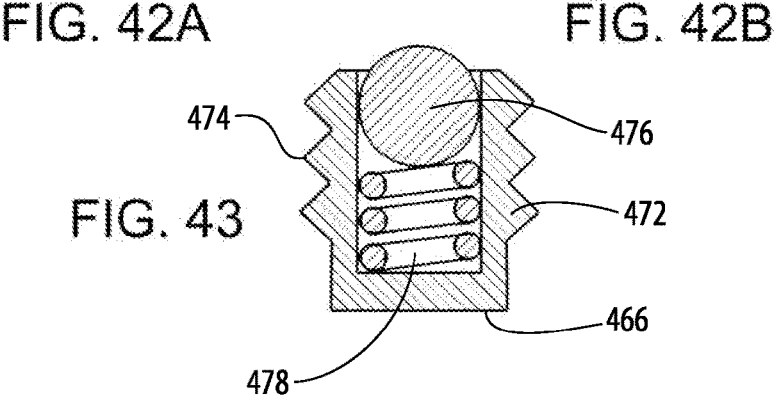
FIG. 43 is an enlarged longitudinal sectional view of a portion of a mechanical detent mechanism forming a portion of the coupling device of FIG. 37A.

The magnetic actuator mechanism 430 basically comprises two ring-shaped magnets 434 and 436. Each of those magnets includes a plurality of sections composed of opposite polarity poles designated by "N" for the North poles and "S" for the South poles. As can be seen the N and S poles are sequentially interposed about each of the ring-shaped magnets 434 and 436. The ring-shaped magnet 434 is a fixed magnet, in that it is fixedly secured in the rear end of the rear frame section 432. As best seen in FIGS. 42A and 42B the frame section 432 basically comprises a cup-shaped member having a cylindrical sidewall 438 having a front end from which four arcuate tabs 440 project. Each of the tabs 440 includes a threaded bore 212 like that described above with respect to the coupling device 120. Each bore 212 extends parallel to the central longitudinal axis X for receipt of a respective one of a partially externally threaded hex-head screws 208, like those described with respect to the coupling device 120 to secure the frame section 432 to the nose section 144. The rear end of the frame section 432 includes an annular flange 442. The ring-shaped magnet 434 is fixedly secured within the frame section 432 in abutment with the inner surface of the flange 442. The sidewall 438 of the frame section 432 includes a small guide pin 444, whose function will be described later, projecting outward from the outer surface of the sidewall and oriented radially to the central longitudinal axis X. A small semi-spherical depression or recess 446 is located in the outer surface of the sidewall diametrically opposed to the guide pin 444. The depression 446 forms a portion of a mechanical detent mechanism forming the locking assembly 426 and will be described later.

Figure 41A:
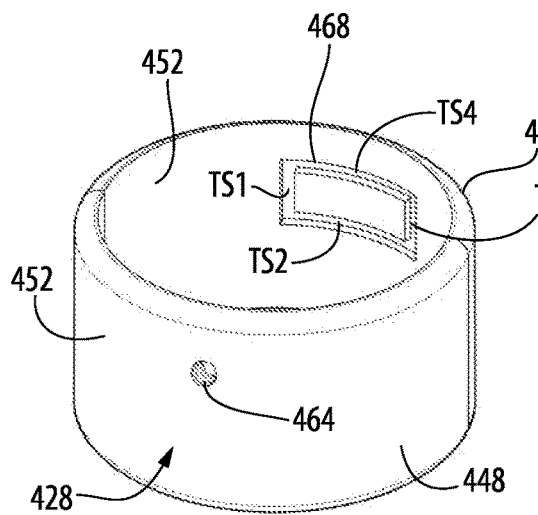
FIG. 41A is an enlarged isometric view of a handle component of the coupling device of FIG. 37A.
Figure 41B:
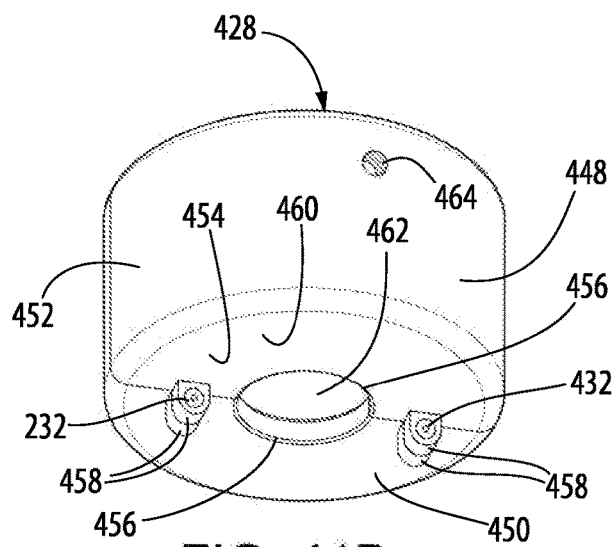
FIG. 41B is an enlarged isometric view of the handle component shown in FIG. 41A, but taken from a different angle.

The handle 428 is best seen in FIGS. 41A and 41B and is formed of two sections 448 and 450 that are secured together. Each of the sections 448 and 450 includes a semi-cylindrical sidewall 452 and a planar semi-circular end wall 454. Each end wall 454 includes a semi-circular recess 456 located at the middle thereof. A pair of planar flanges 458 project outward from the outer surface of the semi-circular end wall 454 on opposite sides of the semi-circular recess 456 of the handle section 448. A similar pair of planar flanges 458 project outward from the outer surface of the semi-circular end wall 454 of the handle section 450. Each of the flanges 458 includes a threaded hole to receive the threaded shank of a hex screw, like the hex screw 232 described above, to fixedly secure the two handle sections 448 and 450 to each other. When the two sections 448 and 450 are fixedly secured together the longitudinal linear edges of the semi-circular sidewalls are in abutment, with the semi-cylindrical sidewalls conjoining to form a circular cylindrical sidewall and with the semi-circular end walls forming a circular end wall having a central opening 460.

Figure 44:
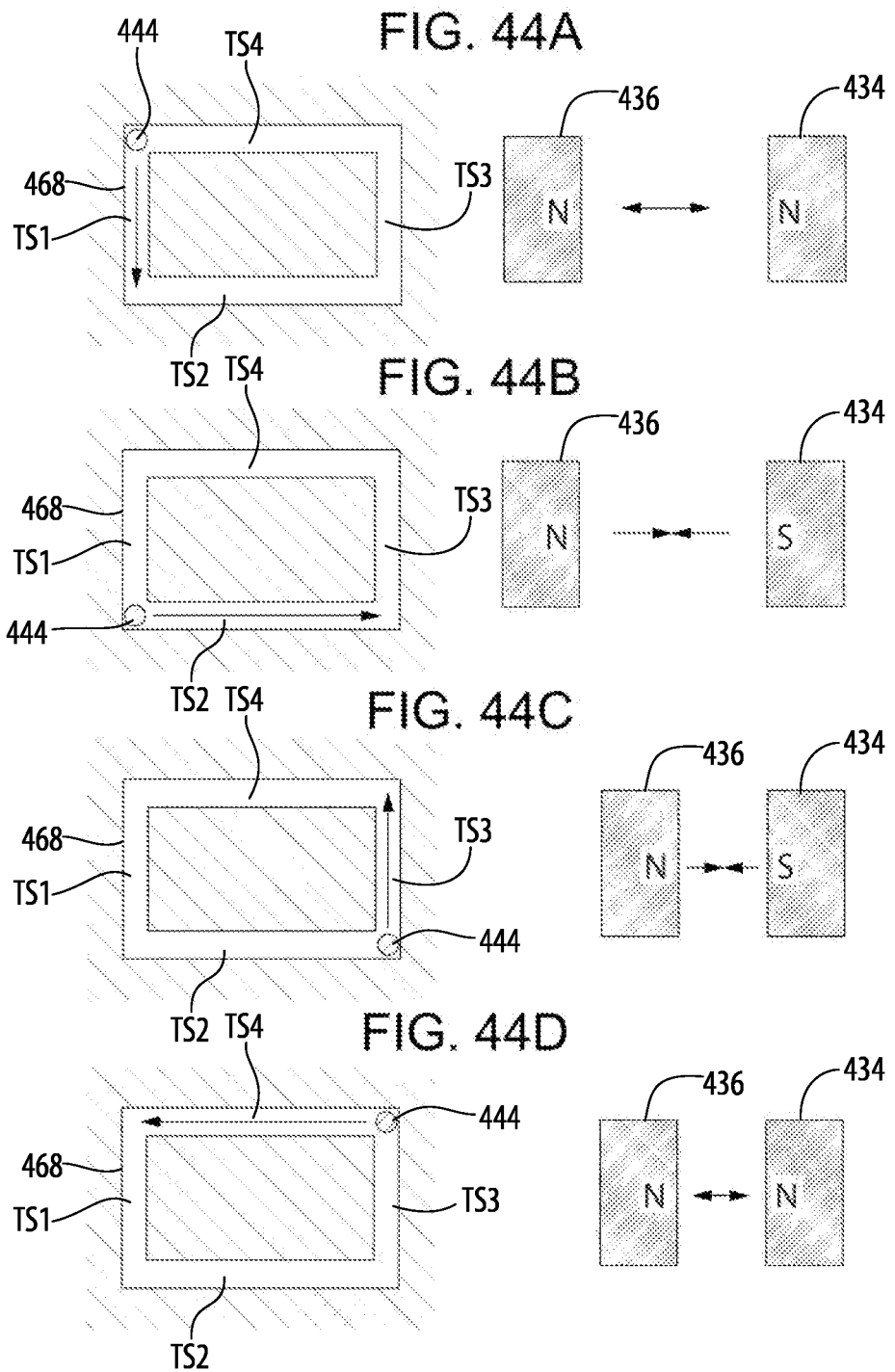
FIGS. 44A-44D are a series of illustrations showing the relationship between a track forming a portion of the handle component of the coupling device of FIG. 37A and other components, i.e., a guide pin, and a fixed magnet and a movable magnet forming a portion of the locking assembly, of the coupling device of FIG. 33 during the mounting and dismounting of it on the bib.

As best seen in FIG. 41A a threaded bore 464 extends through the sidewall 452 of the handle section 448, with the central axis of the bore being oriented radially to the central longitudinal axis X. The bore is configured to threadedly receive a spring-biased component 466 of a mechanical detent mechanism making up the locking assembly 426. That mechanical detent mechanism also includes the semi-spherical depression or recess 446 located in the outer surface of the sidewall of the frame section 432. The inner surface of the semi-cylindrical sidewall 452 of the handle section 450 includes a rectangular recess or track 468 located diametrically opposed to the threaded bore 464 in the handle section 448. The rectangular track includes four sections TS1, TS2, TS3, and TS4, which are in communication with one another. The section TS1 which when viewed from above like shown in FIG. 44A is linear and extends parallel to the central longitudinal axis X. The second section TS2 which when viewed from above like shown in FIG. 44A is linear and extends perpendicular to the central longitudinal axis X. The third section TS3 which when viewed from above like shown in FIG. 44A is linear and extends parallel to the central longitudinal axis X and to the first track section TS1. The fourth section TS4 which when viewed from above like shown in FIG. 44A is linear and extends perpendicular to the central longitudinal axis X and parallel to the second track section TS2.

The plunger 424 is an assembly of a front section 470 and a rear section 154. The rear section 154 is constructed like that of the rear section of the coupling device 120. The front section 470 is a hollow tubular member whose front end is of the same construction as the front end of the plunger section 152 of the coupling device 120. Moreover, the front section 470 is threadedly secured to the rear section 154 in the same manner as described with reference to the securement of the front section 152 to the rear section 154 of the coupling device 120. The cam member 132 is mounted on the plunger and configured to be slid over it along the central longitudinal axis X by the movement of the handle 428, as will be described later. The cam member is fixedly secured to the ring-shaped magnet 434, which as noted above is fixedly secured within the frame section 432 of the coupling device's housing. The plunger 424 is movable along the central longitudinal axis X of the coupling device 420 from an initial or open position like shown in FIG. 37A to a locked and sealed position or state, like shown in FIG. 38A. In that locked and sealed position or state the pawls of the clamp assembly will be locked in engagement with the bib of the faucet and the gasket ring 128 will be tightly sandwiched between the planar free end surface 10 of the bib and the engagement surface 126 of the plunger 424 to form a good fluid-tight seal between the bib and the passageway 156 in the plunger. Like the embodiment 120 the rear end of the rear section 154 of the plunger of the coupling device 420 includes a helical male thread 24C for releasable securement to the internally threaded connector 14 of the hose 4 like that described earlier. The tubular portion of the rear section 154 of the plunger 424 extends through the central opening 462 in the rear wall of the handle 428.

The ring-shaped magnet 436 is a movable magnet which is configured to be moved toward the fixed magnet 434 to bring the coupling device 420 from its initial or open state, as shown in FIG. 37A to its locked and sealed state as shown in FIG. 38A. To that end, the ring-shaped magnet 436 is fixedly secured in the rear end of the handle 428, e.g., in abutment with the inner surface circular end wall 460 of the handle 428. The guide pin 444 which projects from the outer surface of the rear frame section 432 extends into the track 468 and is configured to consecutively slide down the track sections as the handle 428 is moved to place the coupling device in its various states. In particular, when the coupling device in its normally opened state, like shown in FIG. 37A the handle 428 will be in the rotational position wherein the pin 444 will be located in the track section TS1 at the portion of it located immediately adjacent the track section TS4 like shown in FIG. 44A. At that position the N poles of the ring-shaped magnet 436 will be axially aligned with the N poles of the ring-shaped magnet 436, so that the two magnets will tend to repel each other as shown by the double-headed arrow in FIG. 37A.

In order to mount the coupling device 420 onto the bib, the bib is located within the nose section between the open pawls 150 like described with reference to the operation of the coupling assembly 120. The handle 428 is then rotated in a counter-clockwise direction 45 degrees as shown by the curved arrow in FIG. 37B to the state shown in FIG. 37C, whereupon the guide pin 444 will have slid down the track section TS1 until it reaches the end of that track section and the entrance to the track section TS2 like shown in FIG. 44B. That rotation of the handle rotates the ring-shaped magnet 436 with respect to the ring-shaped magnet 434, whereupon the N poles of the magnet 436 will be moved from the position at which they were axially aligned with the N poles of the magnet 434 to the position where they are axially aligned with the S poles of the magnet 434. With the two magnets 434 and 436 being in the position with their opposite polarity poles N and S aligned, the magnets will be attracted to each other as shown by the direction of the arrows in FIG. 37D. Moreover, the pin 444 will be at the entrance to the track section TS2. Accordingly, the user can then slide the handle 428 in the forward direction along the central longitudinal axis X, whereupon the guide pin 444 will slide down the track section TS2 until it reaches the entrance to the track section TS3 like shown in FIG. 44C, whereupon the coupling device 420 will be in the locked and sealed state shown in FIG. 38A. The magnetic attraction of the magnets 434 and 436 will assist the sliding of the handle forward to bring the coupling device to its locked and sealed state. When the coupling device is in the locked and sealed state the mechanical detent mechanism of the locking assembly 426 is actuated automatically to lock or hold the device in that state, by preventing the handle from being rotated about the central longitudinal axis.

The mechanical detent mechanism of the locking assembly basically comprises the semi-spherical depression or recess 446 and the spring-biased component 466. The spring biased component is best seen FIG. 43 and is in the form of a hollow set-screw 472 having external threads 474 configured to be screwed into the threaded bore 464 of the handle 428. The interior of the set-screw is hollow and includes a ball 476 and a compression spring 478. The spring tends to bias the ball 476 outward. The ball is configured to be received in the semi-spherical depression 446 to hold the handle in position when the coupling device is in the locked and sealed state. Thus, as can be seen in FIG. 38B, when the coupling device is in the locked and sealed state, the ball 476 will be located in the recess 446, and held therein by the bias of the spring 478, thereby holding the handle in place against accidental displacement.

When it is desired to remove or disconnect the coupling device 420 from the bib of the faucet the handle 428 is rotated in the clockwise direction about axis X as shown by the curved arrow in FIG. 38B by the user applying sufficient force to the handle to cause the spring 478 to compress so that the ball 476 (FIG. 43) rides out of the recess 446. That action frees the handle so that continued rotation of the handle about the central longitudinal axis X in the clockwise direction for forty-five degrees brings the handle to the position shown in FIGS. 38C and 39A, whereupon the guide pin 444 will have slid down the track section TS3 to the end of that track section and the entrance to the track section TS4 like shown in FIG. 44D. The rotation of the handle to the position that the guide pin 444 is located at the entrance to the track section TS4 will result in the N poles of the ring-shaped magnet 436 being axially aligned with the N poles of the ring-shaped magnet 434. Accordingly those two magnets will repel each other as shown by the arrows in FIGS. 39A and 44D, whereupon the handle 428 can then be slid rearward along the central longitudinal axis until it is back in it normal fully open position or state. The magnetic repulsion of the magnets 434 and 436 will assist in bring the coupling device back to its normal open position or state.

The outer surface of the sidewall making up the handle 428 is knurled, like the handle of the coupling member 120, to facilitate gripping of the handle to move it as described above.

Polymagnets available from Amazing Magnets, LLC can be used for the ring-shaped magnets 434 and 436 of the coupling assembly 420 and are preferably 0.75 inch inside diameter, by 2.0 inch outside diameter, by 0.25 inch thick. Other polymagnets can be used, providing that they provide sufficient force to enable the coupling device to operate as described above, without requiring the user to apply excessive or undue force to operate the device. Other magnets or magnetic arrangements are also contemplated to enable the operation of the coupling device 420 as described above.

Turning now to FIGS. 45-55C there is shown another and most preferred exemplary embodiment of a coupling device 520 of the subject invention. The coupling device 520 is similar in most respects in construction and operation to the coupling devices 120 and 420. For example, the coupling device 520 is configured for use on any type of second liquid carrier, whether the cylindrical end portion of which is threaded or not and makes use of a similar type of clamping assembly, a somewhat similar plunger with a similar engagement surface, and a gasket ring. The coupling device 520 differs from the coupling devices 120 and 420 inasmuch as it is much simpler in construction and obviates the use of a gear assembly, a pusher, a compression spring, and polymagnets. The coupling device 520 does include a mechanical detent mechanism, but that mechanism is much less complex than those of the coupling devices 120 and 420.

Figure 45:
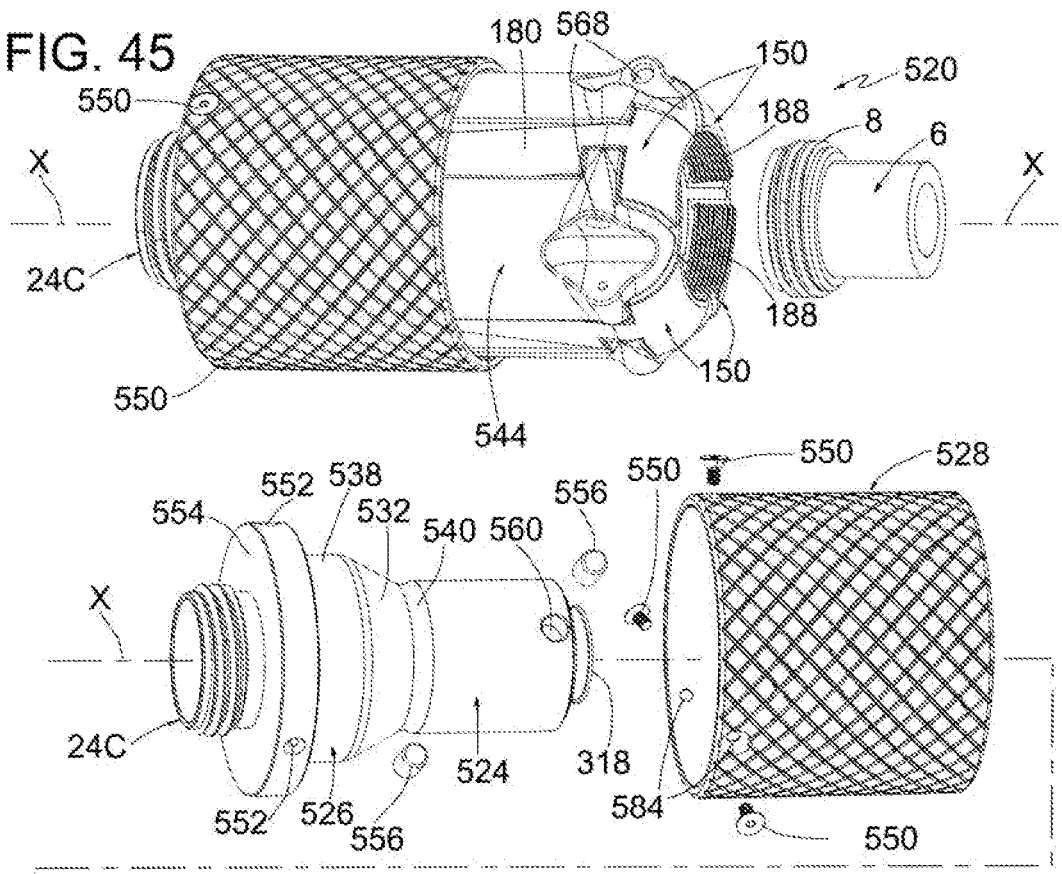
FIG. 45 is an enlarged longitudinal sectional view of still another and most preferred coupling device of the subject invention shown in an initial open position state ready to be mounted onto an externally threaded bib or spout of a faucet to releasably secure a hose, e.g., a garden hose, (not shown) thereto.
Figure 46:
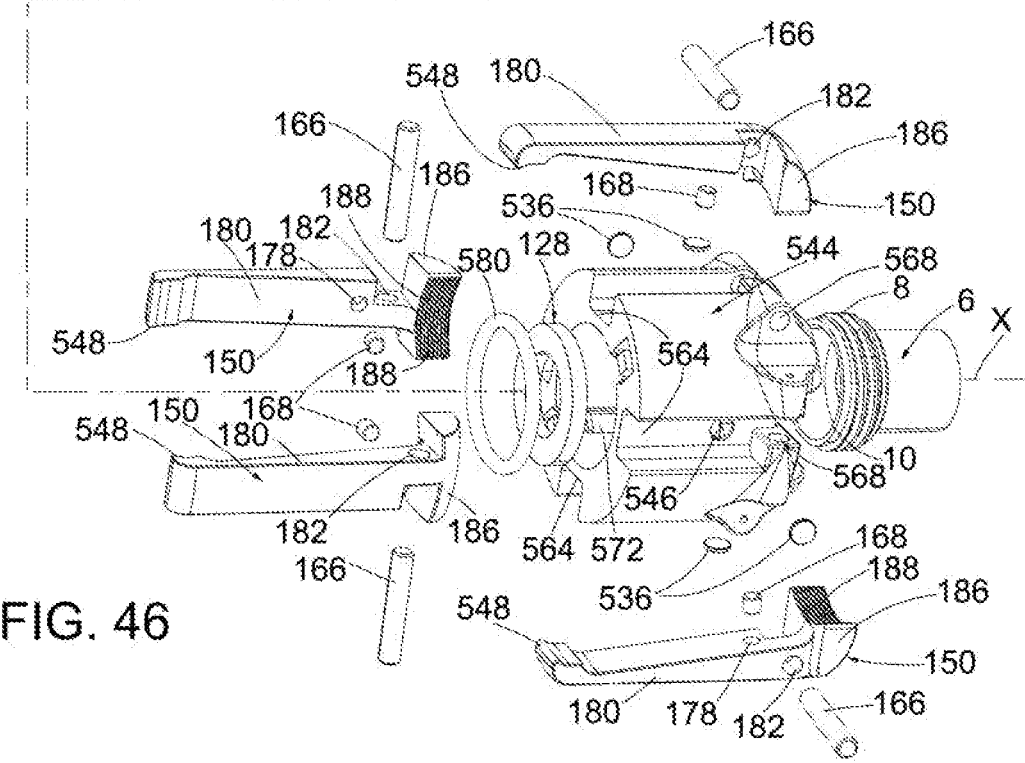
FIG. 46 is an exploded isometric view of the coupling device of FIG. 45.

In the interest of brevity the components of the coupling device 520 which are the same as that of the coupling device 120 and 420 will be given the same reference numbers and their construction, organization and operation will not be reiterated. Thus, as can be seen in FIGS. 45 and 46 the coupling device 520 basically comprises a housing 522, a plunger 524 having an engagement surface 126 at the distal or front end of the plunger, a gasket ring 128, a clamp assembly 530, a locking assembly 526, and a handle 528. As will be seen in FIGS. 45 and 54A-55C the locking assembly includes portions of the plunger 524 (e.g., the annular surface 538 and the conical cam surface 532 as shown in FIG. 45 and which will be described later) and portions of the clamp assembly 530 (e.g., the transverse ridge 548 at the proximal end of the pawls 150 as shown in FIGS. 54A-55C and which will also be described later)

Figure 54A:
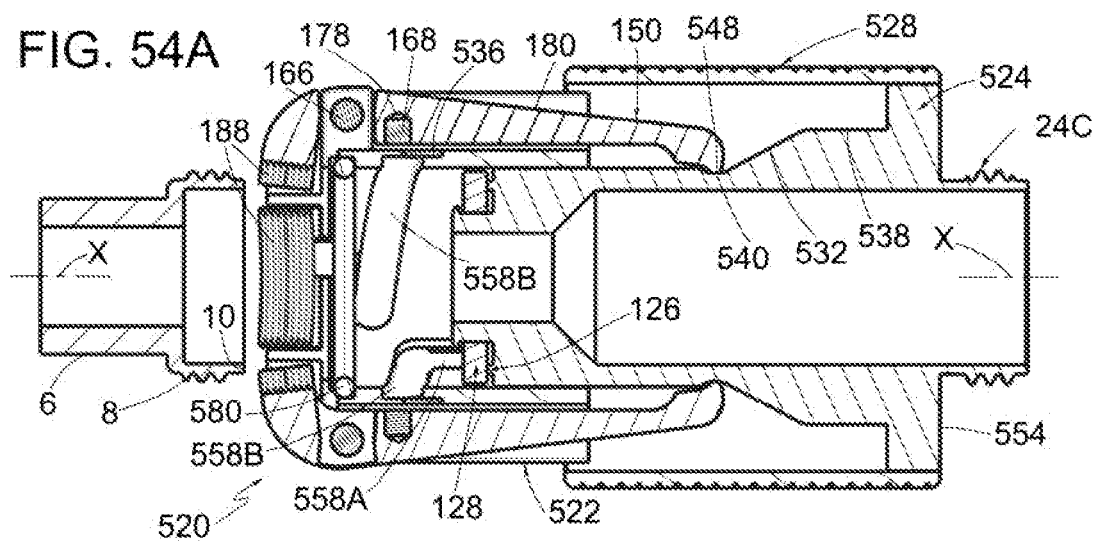
FIG. 54A is a longitudinal sectional view taken along a plane of the coupling device of FIG. 45 when the coupling device is in its open position or state.
Figure 54B:
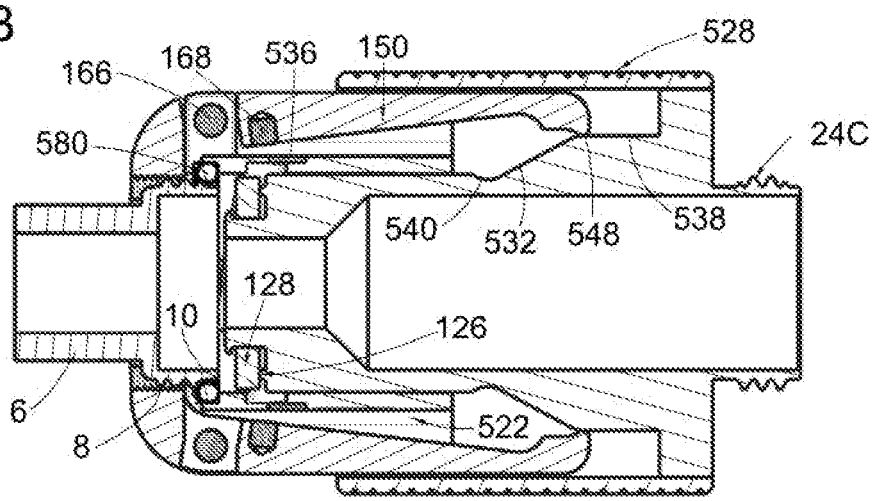
FIG. 54B is a longitudinal sectional view, similar to FIG. 54A, but showing the coupling device of FIG. 45 when it is in its locked position or state in the process of mounting it on the bib.
Figure 54C:
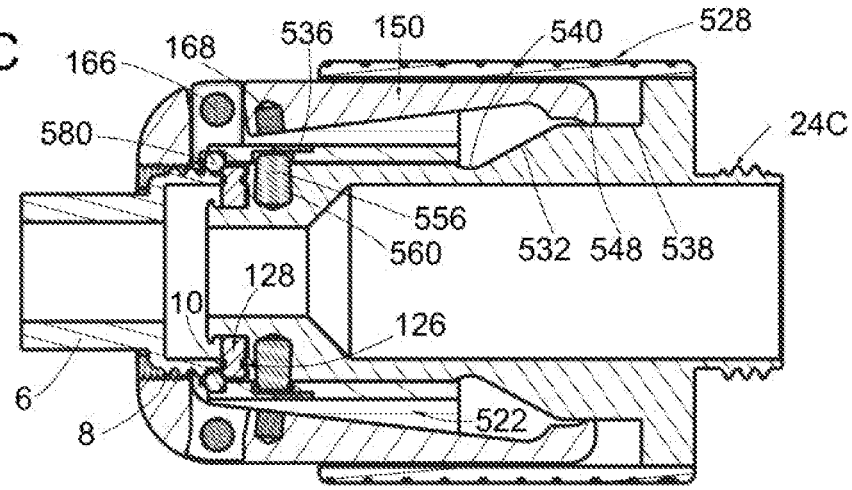
FIG. 54C is a longitudinal sectional view, similar to FIGS. 54A and 54B, but showing the coupling device of FIG. 45 when it is in its locked and sealed position or state wherein it is fully mounted on the bib.

The housing 522, which is best seen in FIGS. 54A-54C, is an assembly of a nose or front section 544, which is similar in many respects to the front section 144 of coupling device 120, and a rear section which constitutes the handle 528. The nose section 544 and the handle 528 are slidably coupled together to form a hollow interior space having a central longitudinal axis X.

The clamp assembly 530 will be described in detail later. Suffice it for now to state that the clamp assembly includes components of the housing 522 (e.g., portions of the nose or front section 544), a plurality, e.g., four, of pivotable jaws or pawls 150, components of the plunger (e.g., a conical cam surface 532 of the plunger 524, a plurality, e.g., four, of pivot pins 166, a plurality, e.g., four, of short height magnet rods 168, and a plurality of small, thin disks 536. The disks 536 6 may be magnets or merely formed of a material which is magnetically attracted to the magnet rods. In any case the disks 536 will be referred to hereinafter as the target disks.

Like the pawls of the coupling devices 120 and 420, the pawls 150 of the coupling device 520 are identical in construction to one another and are configured for releasably clamping the cylindrical surface, e.g., the external threads 8, of the bib or spout 6 or a smooth external surface of the bib or spout if that bib or spout does not include external threads. Each of the pawls 150 is pivotably mounted on the nose section 544 so that each pawl can be pivoted from an open position or state shown in FIG. 54A to a locked position or state shown in FIG. 54B. To that end, the pawls 150 are pivotably mounted within respective recesses in the nose section 544 by respective ones of the pivot pins 166. In particular, each pivot pin is located in the bore 182 slightly to the rear or proximally of the enlarged width flange 186 at distal free end of the associated pawl to form a pivot axis thereat. Each magnet rod 168 is located in a bore 178 in the leg 180 of a respective associated pawl slightly to the rear of the pivot axis. Each magnetic disk 536 is mounted in a respective recess 546 in the front or nose section 544 somewhat aligned with a respective one of the magnetic rods 168. Accordingly, when the coupling device 520 is in its open state, like shown in FIGS. 54A, the proximal end of each of the pawls will be pivoted inward toward the central longitudinal axis X, whereupon the magnet rods 168 will be moved to a position immediately adjacent respective ones of the target disks 536, so the magnetic attraction between the magnetic rods and the target disks tends to hold or bias the pawls into their open state. In the open state the flanged heads 186 of the pawls are separated from one another to form a mouth of the coupling device which is configured to receive the bib 6 to mount the coupling device onto the bib. When the coupling device is in its open state the plunger 524 will be in what will be referred to hereinafter as its "first" position. When the plunger 524 is in the first position a transverse ridge 548 at the proximal (rear) end of the leg 180 of each of the pawls 150 will be located within an annular recess 540 (FIGS. 52A and 52B) at the lowermost end of the conical cam surface 532 and will be held in that position by the bias provided by the magnetic attraction between the magnet rods 168 and the target disks 536.

The handle 528 is fixedly secured to the plunger 524 by three screws 550 threadedly engaged in three respective threaded bores 552 in a flange 554 of the plunger. That feature enables the plunger to be slid along the central longitudinal axis X from the first position like shown in FIGS. 54A and 55A (whereupon the coupling device is in its "open" state), to a second position like shown in FIGS. 54B and 55B (whereupon the pawls will be in what will be referred to as their "closed" state). As will be described later, the plunger 524 is movably coupled to the nose section 544 by a pair of follower pins 556 slidably located in respective guide tracks 558 (FIGS. 50A-51C) in the nose section 544. That arrangement enables the plunger to be moved with respect to the nose section so that the plunger can assume the first and second positions with respect to the nose section.

When the pawls 150 are in their closed state, the serrated surfaces 188 tightly engage respective portions of the outside surface (diameter) of the hollow cylindrical portion of the bib 6 (in this case the outside diameter of the external threads 8). That action effectively secures or locks the coupling device 520 to the bib 6 so that the coupling device can be said to be in its "locked" state. The pivoting of the pawls to the closed state is accomplished by the transverse ridge 548 of each of the pawls 150 sliding into engagement with a conical cam surface 532 (to be described later) of the plunger 524 as the plunger is moved from a first position to the second position. The sliding of the plunger to the second position is achieved by the user grasping the handle 528 and sliding it in the distal (forward direction) along longitudinal axis X. In particular, the sliding of the plunger from the first position to the second position causes the transverse ridge 548 to exit the annular recess 540 and from there to slide up the conical cam surface 532. That action causes the pawls to pivot about their pivot axis, whereupon the flanged front end portion 186 of each of the pawls pivots inward towards the central longitudinal axis X, against the bias provided by the magnetic attraction between the magnet rods 168 and their respective disks 536, whereupon the serrated surfaces 188 of the pawls tightly engage respective portions of the external threads 8 of the bib, like shown in FIG. 54B, thereby locking the coupling device 520 on the bib.

Figure 55A:
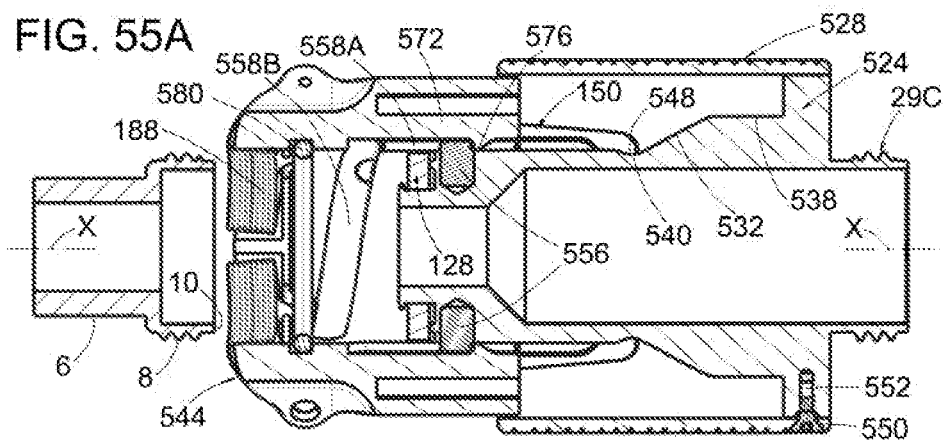
FIG. 55A is a longitudinal sectional view similar to FIG. 54A, but taken along a plane which is 320° from the plane shown in FIG. 54A, to show the coupling device in its open, position or state in the process of mounting it on a bib of a faucet like shown in FIG. 45.
Figure 55B:
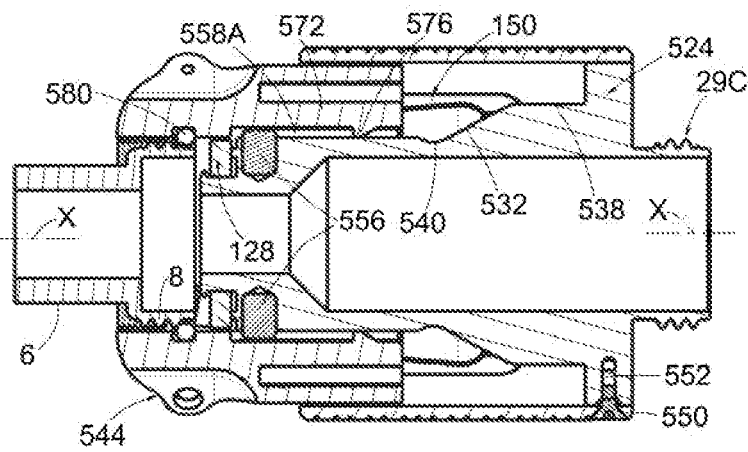
FIG. 55B is a longitudinal sectional view similar to FIG. 54B to show the coupling device in its locked position or state in the process of mounting it on the bib.
Figure 55C:
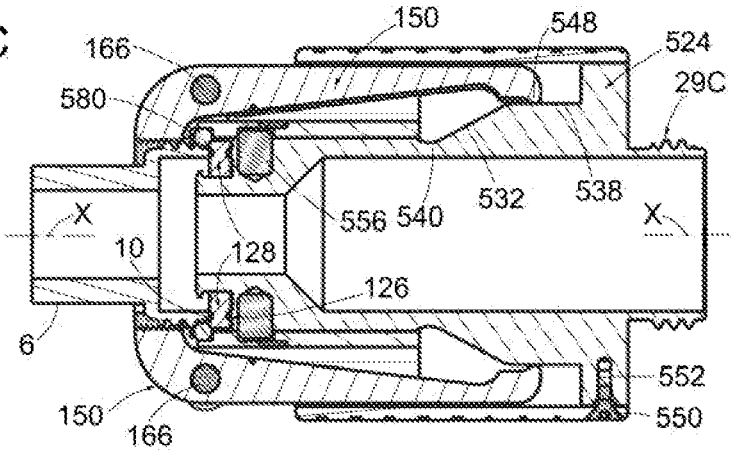
FIG. 55C is a longitudinal sectional view similar to FIG. 54C to show of the coupling device in its locked and sealed position or state wherein it is fully mounted on the bib.

In order to form a fluid-tight seal between the bib 6 and the coupling device 520 to prevent any leakage of fluid through the interface therebetween, the coupling device is configured so that the plunger can be moved from the second position (the "locked" state) to a third position like shown in FIGS. 54C and 55C. In the third position, the gasket ring 128 will be tightly interposed or compressed between the engagement surface 126 at the distal end of the plunger and the planar free end surface 10 of the bib 6, as clearly shown in FIGS. 54C and 55C. Thus, when the plunger is in the third position the coupling device 520 can be said to be in its "locked and sealed state" since the coupling device will be secured (locked) onto the bib, with its gasket ring 128 tightly interposed (sealed) between the end face 10 of the bib and the engagement surface 126 of the plunger.

The movement of the plunger from the second position to the third position is achieved the user twisting the handle 528 in the clockwise direction about the central longitudinal axis X, whereupon the follower pins 556 enter into respective spiral sections 558B (FIG. 51C) of the guide track 558 and then slide down those spiral sections. That action will be described in detail later. Suffice it for now to state that sliding of the follower pins in the spiral sections of the tracks upon the twisting of the handle in the clockwise direction translates that twisting motion to a linear movement of the plunger along the central longitudinal axis X in the forward direction to the third position. When the plunger is moved from the second position to the third position the transverse ridge 548 will have slid off of the conical cam surface 532 and onto an immediately adjacent cylindrical surface 538 (FIGS. 52A and 52B) of the plunger, thereby acting as a detent mechanism effectively locking the plunger in place with respect to the nose section 544. As such the coupling device 520 is now in its locked and sealed state, i.e., the pawls of coupling device are locked onto the bib and the gasket ring is tightly interposed (sealed) between the end face 10 of the bib and the engagement surface 126 of the plunger. The coupling device 520 will remain in that locked and sealed state until it is desired to release the coupling device from the bib, which will be described later.

Figure 52A:
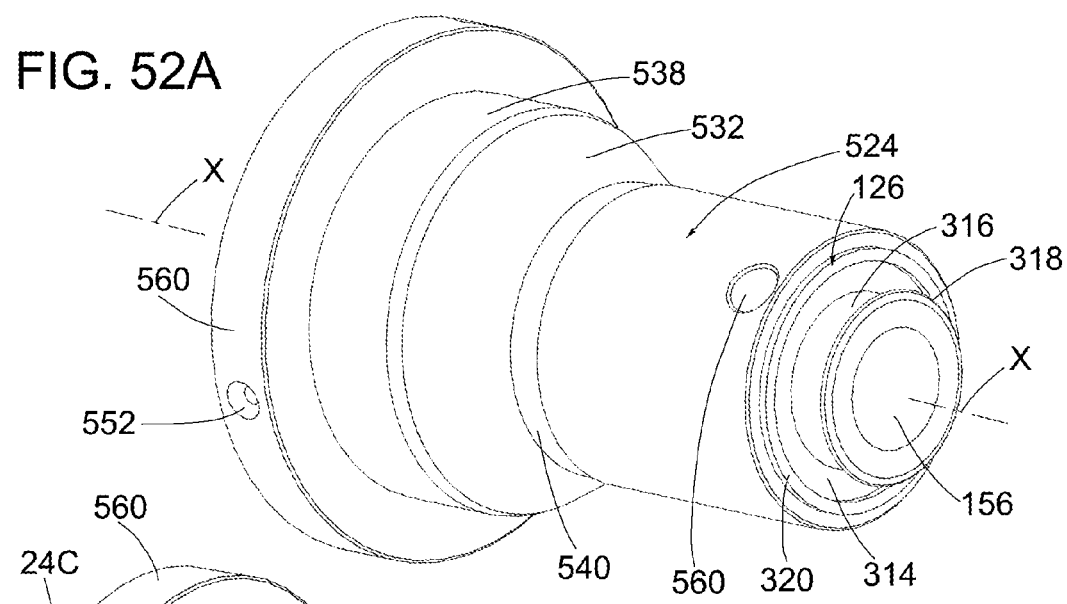
FIG. 52A is an enlarged isometric view of another component, i.e., a plunger, of the coupling device of FIG. 45.
Figure 52B:
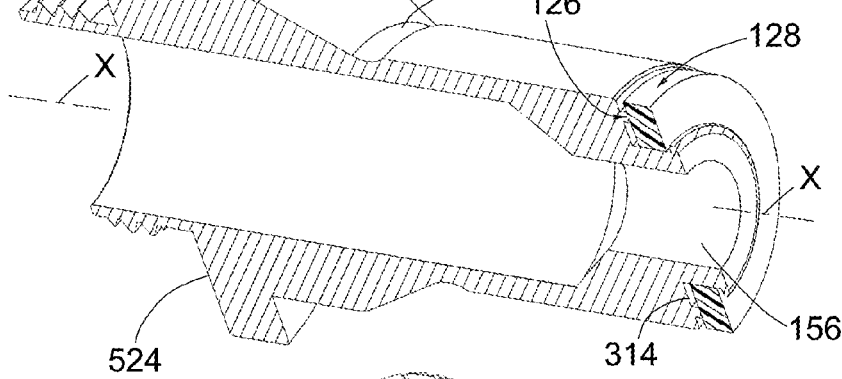
FIG. 52B is a slightly reduced isometric view in longitudinal section showing the coupling device mounting a sealing gasket, which is another component of the coupling device of FIG. 45.

The plunger 524 is best seen in FIGS. 52A and 52B and constitutes a modification of the plunger 124 which obviates the need for the front section 152 and the cam member 132 of the coupling device 420 since it includes relevant features of the front section 152 and the cam member 132 as will be described hereinafter. In particular, as can be seen in those figures, the plunger 524 comprises an integral tubular member including a central passageway 156 extending through it from one end to the other for carrying liquid therethrough. The rear or proximal end of the plunger 524 includes a helical male threaded section 24C for releasable securement to the internally threaded connector 14 of the hose 4 like that described with reference to the coupling assemblies 20 and 120. The heretofore identified flange 554 of the plunger 524 is located immediately forward of the threaded male section 24C, whereas the heretofore identified cylindrical surface 538 is located immediately forward of the flange 554, the heretofore identified conical cam surface 532 is located immediately forward of the cylindrical surface 538, and the heretofore identified annular recess 540 is located immediately forward of the conical cam surface 532.

The front or distal end of the plunger 524 is constructed like the front section 152 of the plunger 124. As best seen in FIGS. 52A and 52B, the front end of the plunger includes a first annular wall 316 projecting outward from the planar end surface 314 and centered about the central longitudinal axis X. The outer end of the annular wall 316 includes a small annular flange 318 extending outward from the outer surface of the annular wall at the front end of the annular wall. The annular wall 316 serves as the means for mounting the gasket ring 128 onto the front section of the plunger. The gasket ring 128 is a disk-like member formed of any suitable material, e.g., a rubber washer or other elastomeric material, and has a central opening through which the annular wall 316 extends, with the annular flange 318 overlying a portion of the front surface of the gasket ring contiguous with the central opening in the gasket ring. The front surface 314 also includes a second annular wall 320 projecting outward from the planar end surface 314. The annular wall 320 is also centered about the central longitudinal axis and forms the engagement surface 126. A pair of diametrically opposed bores 560 are located in the cylindrical portion of the plunger immediately to the rear of the planar end surface 314. Each bore is configured to receive a respective one of the heretofore mentioned follower pins 556.

Turning now to FIGS. 47-51C the details of the front or nose section 544 will now be described. As can be seen the nose section 544 is a tubular member having a sidewall including a central passageway 562 centered on the central longitudinal axis X and extending from the front end of the nose section to its rear end. Plural, e.g., four, linear channels 564 are located in the outer periphery of the nose section extending parallel to the central longitudinal axis X. Each of the channels 564 is configured for pivotably mounting a respective one of the pawls 150 therein, with the leg portion 180 of the pawl being located within the channel, with the transverse ridge 548 at the rear end of the leg portion extending out of the channel beyond the rear face of the nose section and with the flanged head 186 of the pawl located within an enlarged recess 566 at the front end of the channel. The pivot pins 166 are located within respective bores 568 in portions of the nose section immediately to the rear of the enlarged recesses 566, with each bore extending perpendicularly to the central longitudinal axis X. Each pivot pin 166 extends through the heretofore identified bore 182 in the leg 180 of the associated pawl to serve as a pivot axis, thereby mounting the pawl within the channel 564 for pivotably movement about that axis.

The heretofore identified recesses 546 for receipt of the target disks 536 are located in the bottom wall of the channels 564, with each recess being located slightly to the rear of the pivot axis established by the pivot pin in that channel. The target disks 536 are fixedly secured within respective ones of the recesses 546.

As mentioned earlier the nose assembly 544 includes two guide tracks 558. Those tracks are in the form of channels located in the inner surface of the central passageway 562. Each track includes two sections. One section 558A of each track is linear and extends parallel to the central longitudinal axis X from the rear end of the nose section as best seen in FIGS. 51A-51C. Each linear section 558A terminates in a spiral section 558B which extends at an acute angle to the linear section. As best seen in FIGS. 48, and 50B-50E the portion of the nose section which forms the bottom surface of the linear track section 558A is in the form of a resilient finger 572 located within a chamber 574. Each chamber extends parallel to the central longitudinal axis X within the tubular sidewall of the nose section. As best seen in FIG. 51A, the front end 572A of each finger 572 merges with the sidewall of the nose section at approximately a midpoint of the length of the nose section. The rear end of each finger 572 is free and is located adjacent the rear end of the nose section. Each finger is configured so that its free end is biased radially inward towards the central longitudinal axis X. As best seen in FIGS. 50C-50E the rear end portion of the finger 572 includes a low height flange or tab 576 projecting upward therefrom and which forms a stop defining the rear end of the linear track section 558A. The stop 576 establishes the heretofore mentioned "first" position. Accordingly, when the plunger 524 has been moved to the position wherein its follower pins 556 abut the tabs 576 of the associated track sections 558A, the coupling device will be in its "open" state, and the bias provided by the flexible fingers will tend to hold the coupling device in that open state, by deterring the follower pins from accidentally sliding down the linear track sections 558A from the first position.

When the plunger has been moved to the position wherein its follower pins 556 reach the point at which the associated linear track section 558A merges with the near end of the associated spiral track section 558B, the plunger will be in the heretofore mentioned "second" position. When the plunger has been moved to the position wherein each of its follower pins has moved to the far end of the spiral track section 558B, the plunger will be in the heretofore mentioned "third" position.

Turning now FIGS. 47-50B the details of the clamp assembly 530 will now be described. That assembly basically comprises the four pawls 150, the nose or front section 544, the annular recess 540, the conical cam surface 532, the cylindrical surface 538, the magnet rods 168, and the target disks 536. Each magnet rod 168 is configured to be magnetically attracted to an associated target disk 536 located in the associated channel 564 in the nose section 544. The magnetic attraction between the magnet rods 168 and their associated target disk 536 normally holds the pawls in their open state when the handle 428 of the coupling device is in the first position. When the handle is slid along the longitudinal central axis X in the forward direction from the first position to the second position, the ridged end 548 of each pawl will move out of the annular recess 540 and start to slide up the conical cam surface 532, thereby pivoting each pawl about its pivot axis against the bias provided by the magnetic attraction between its associated magnet rod and its target disk. Once the handle has reached the second position, i.e., the locked state, further linear movement forward is precluded since the follower pins will be at the end of the linear track sections 558A where they merge with the spiral track sections 558B. In order to place the coupling device in the locked and sealed state, i.e., to move the plunger to the third position, all that is required is for the user to twist the handle 528 clockwise, whereupon the follower pins will enter their associated spiral track sections and slide down those sections until they reach the far end thereof. At that time the plunger will be in the third position and the coupling device will be in its locked and sealed state. The coupling device 520 will remain in that locked and sealed state until it is desired to release the coupling device from the bib.

When it is desired to release the coupling device from the bib, all that is required is for the user to twist the handle 528 in the counter-clockwise direction, whereupon the plunger will be rotated in that direction and the follower pins 556 will slide down the spiral track sections 558B from the end of those sections to the point at which the spiral sections merge with the linear extending track sections 558A. Once the follower pins are in that position, which as noted earlier constitutes the heretofore identified "second" position, the user can pull on the handle to the rear to draw the pins into the linear extending track sections 558A, whereupon the ridge 548 at the rear end of each pawl will slide over the cylindrical surface 538 of the plunger towards the conical cam surface 532. Continued pulling of the handle in the rearward direction will cause the ridge 548 to slide off of the cylindrical surface 538 and onto the conical cam surface 532, whereupon the pawls will start to pivot outward about their respective pivot axes so that the serrations at their flanged heads 186 will start to disengage from the threads of the bib. Further pulling of the handle rearwardly will cause the pawls to pivot further outward, thereby further separating the flanged heads of the pawls from one another until the handle has pulled the plunger back to the first position, at which time the coupling device will be released from the bib.

As best seen in FIGS. 51A-51C and 54A-54C, the coupling device 520 also includes an elastomeric O-ring 580 which is located within an annular recess 582 in the nose section 544 immediately to the front of the spiral sections 558B of the tracks 558. The O-ring 580 is provided for the purpose of providing an initial fluid seal between the coupling device 520 and the bib 6 when the coupling device is mounted on the bib. In particular, when the coupling device is juxtaposed opposite the bib like shown in FIG. 54A and moved axially toward the bib the end surface of the bib will enter the space or mouth between the serrated ends 188 of the pawls and the O-ring will engage peripheral portions of the external threads 8 of the bib like shown in FIGS. 54B and 55B.

Figure 53:
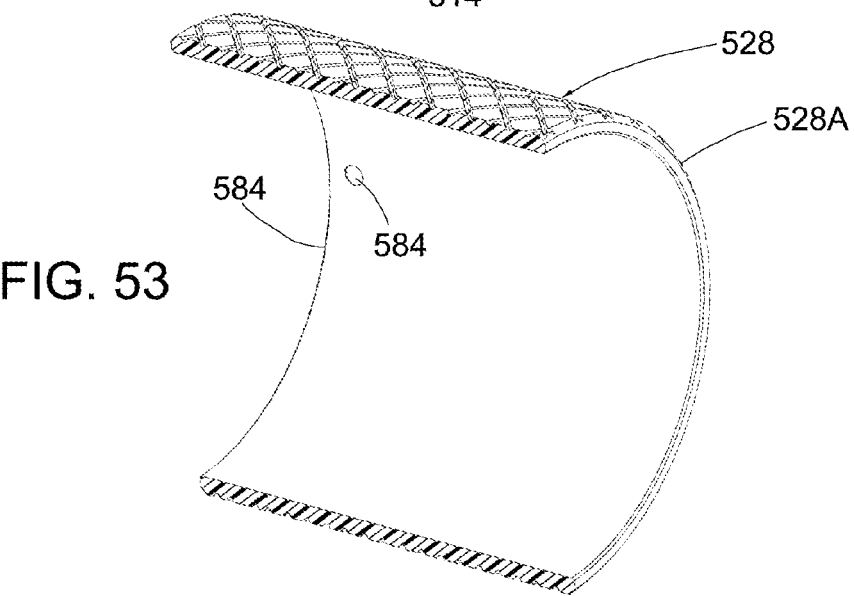
FIG. 53 is a longitudinal sectional view of another component, i.e., a handle, of the coupling device of FIG. 45.

The handle 528 basically comprises a tubular body. FIG. 53 is a longitudinal sectional view of the tubular body. As can be seen the handle includes three equidistantly spaced chamfered opening or hole 584 located adjacent its rear edge. The other sidewall section 528B includes two chamfered openings or holes 584 located adjacent the rear edge of the handle. The inner diameter of the handle is equal to the outer diameter of the flange 554 of the plunger 524. The handle is secured to the plunger by extending the threaded screws 550 through the chamfered holes 584 into respective ones of the three respective threaded bores 552 in a flange 554 of the plunger. In so doing the flange 554 becomes the back wall of the handle 528. The outer surface of the handle is knurled like the handle of the coupling devices 120 and 420. That feature facilitates gripping of the handle to move it to the from the first position to the second position and then to the third position to mount the coupling device 520 on the bib 6, and to move it from the third position to the second position and then to the first position to dismount or disconnect the coupling device from the bib.

The use and operation of the coupling device 520 will now be discussed with reference to FIGS. 45 and 54A-54C. The coupling device 520 is normally in its open state, like shown in FIGS. 45 and 54A. In the open state the handle 528 is in the heretofore identified first position. In that position the ridge 548 on the rear end of each of the pawls 150 of the clamping assembly is located within the recess 540 on the plunger 524, whereupon the pawls are pivoted to the open position and held in that position by the magnetic attraction between the magnet rods 168 and the target disks 536. That action creates an open mouth of the coupling device for receipt of the bib. When it is desired to mount the coupling device 520 onto the bib 6 the nose section 544 of the coupling device is juxtaposed opposite the bib so that the mouth of the coupling device is ready to receive the free end of the bib like shown in FIGS. 45 and 54A. The coupling device 520 is then moved along central longitudinal axis X towards the bib so that the free end surface 10 of the bib enters the open mouth of the coupling device with the O-ring 580 surrounding the exterior threads 8 on the bib at the free end of the bib. That action centers the coupling device to the bib, whereupon the engagement surface 126 is axially aligned with the planar end surface 10 of the bib. The handle 528 of the coupling device is then pushed forward to move the plunger from the first position to the second position, whereupon the follower pins 556 of the plunger slide down the linear track sections 558A. That action causes the ridge 548 on each of the pawls to exit the recess 540 of the plunger and to slide up the conical cam surface 532 of the plunger, thereby pivoting the pawls to their closed state, against the bias provided by the magnetic attraction between the magnet rods 168 and the target disks 536, whereupon the serrated surfaces 188 of the pawls tightly engage the external threads of the bib to releasably lock the coupling device onto the bib, as shown in FIG. 54B. At this time the gasket ring 126 will be interposed between the planar end surface 10 and the engagement surface 126, but will not be compressed so that it will not produce a fluid-tight seal between the bib and the passageway in the plunger. However the O-ring will tend to inhibit any liquid from exiting the interface between it and the bib.

The coupling device 520 is now ready to be placed in its locked and sealed state. To that end, the handle 538 is twisted clockwise and pushed forward along the central longitudinal axis X. This action causes the follower pins to slide into the associated spiral track sections 558B, whereupon the plunger is moved further into the front section 544. The movement of the plunger further into the front section causes the ridge 548 on each of the pawls to slide off of the conical cam surface 532 and onto the cylindrical surface 538. When handle has been twisted to the clockwise to maximum amount of rotation, the follower pins will have reached the end of the spiral track sections 558B and the plunger will have been moved to its third position and will be held thereat like shown in FIG. 54C. Since the pawls of the clamping member, which are mounted in the nose section of the housing are locked to the bib, the sliding action of the plunger forward to the third position causes the engagement surface 126 to tightly sandwich and deform the gasket ring 128 between it and the planar end surface 10 of the bib. That action tightly seals the bib to the plunger so that no liquid can leak out of the interface with the compressed gasket ring. Thus, the coupling device 120 will now be in the locked and sealed state.

As should be appreciated by those skilled in the art the twisting of the handle to move the ridge on each pawl onto the cylindrical surface acts as a detent mechanism for releasably holding the coupling device in its locked and sealed state. Thus, the plunger will be releasably locked in the locked and sealed state and will remain in that state so that it cannot be accidentally disconnected from the bib. When removal of the coupling device 520 from the bib is desired, all that is necessary is for a user to grasp the handle 528 and twist it in the counter-clockwise direction, whereupon the follower pins will slide back down the spiral track sections 558B to the second position. That action causes the ridge 548 on each pawl to slide off of the cylindrical surface 538 and onto the conical surface 532. The user can then pull rearwardly on the handle to cause the follower pins to enter the linear track sections, whereupon the ridge 548 on each pawl will slide down the conical surface thereby enabling the magnetic attraction between the magnet rods 168 and the associated disks 536 to cause the pawls to begin to pivot back toward their open state. When the ridge 548 on each pawl reaches the annular recess 540, the pawls will be in their fully open state and will be held in that state by the location of the ridges within that recess.

It must be pointed out at this juncture that the various coupling devices disclosed above are merely some exemplary embodiment of various coupling devices that can be constructed in accordance with this invention. For example, the hose-coupling member or rear section of the plunger may be modified to eliminate the external threads 24E and to substitute an internally threaded socket for releasable securement to a male externally threaded connector of a hose. Moreover, outer end of the hose-coupling device or plunger may be modified so that a hose or some other component, e.g., a sprinkler, drip feeder, etc., is permanently connected to it, whereupon the coupling device will form an integral and permanent part of the hose or other component rather than merely being a device suitable for releasable connection to a hose or other component. Further still, the movable members of the clamping assembly need not be pivotable members or pawls that pivot toward and away from the bib of the spout, but may be members constructed to move radially towards and away from the bib to releasably lock onto the bib (whether the bib includes external threads or is smooth walled). Further yet, the movable members of the clamp assembly need not be serrated or include teeth that are configured to mate with the external threads of the spout. Thus, the movable members, whether pivotable fingers or pawls or radially movable members, may include other types of engagement surfaces, e.g., small nubs, small ball bearings, etc., to tightly grasp the bib of the spout. In fact, the movable members, whether pivotable fingers or pawls or radially movable members, may be constructed so that the surfaces which engage and lock onto the external threads of the spout will prevent the coupling device from being disconnected from the spout by merely unscrewing it from the spout after those movable members have been pivoted or otherwise moved to their closed or clamped position. Many other modifications to the coupling devices of the subject invention are also contemplated. For example, different materials can be used for the various components, e.g., the glass-filled Ryton® synthetic resin used for various of the components may include an ultraviolet (UV) stabilizer in it due to the environment in which the coupling device will be used.

Without further elaboration the foregoing will so fully illustrate our invention that others may, by applying current or future knowledge, adopt the same for use under various conditions of service.

We claim:

1. A coupling device for releasably securing a first liquid-carrier to a second liquid-carrier, the second liquid-carrier having a cylindrical end portion terminating in a free end surface, said coupling device comprising:
   a housing configured for receipt of said end portion of said second-liquid carrier;
   a plunger located within said housing, said plunger including an engagement surface, an inner end portion, an outer end portion, and a passageway extending between said inner end portion and said outer end portion, said outer end portion being configured for releasable or fixed securement to the first liquid-carrier, said plunger being movable relative to a first portion of said housing between a first position, a second position and a third position;
   a gasket ring coupled to said inner end of said plunger and movable with said plunger, said gasket ring being interposed between the free end surface of the second liquid-carrier and said engagement surface of said plunger;
   a clamp assembly comprising portions of said housing and said plunger, said clamp assembly being located at said first portion of said housing and including at least one movable member having an engagement surface and another member, said at least one movable member being configured for pivoting movement or radial movement from an open state to a closed state, whereupon said engagement surface of said at least one movable member engages the cylindrical portion of the second liquid-carrier to releasably secure said coupling device thereto; and
   a handle coupled to said plunger to selectively move said plunger to said first, second and third positions;
   a locking assembly comprising a portion of said plunger and portions of said clamp assembly which are coupled to said portion of said plunger, said locking assembly being configured for selectively releasably holding said plunger in an unlocked state when said plunger is in said first position, a locked state when said plunger is in said second position, and in a locked and sealed state when said plunger is in said third position.

2. The coupling device of claim 1, wherein said locking assembly is in said locked state and in said locked and sealed state when said at least one movable member is in said closed state, said gasket ring being interposed between the free end surface of the second liquid carrier and said engagement surface of said plunger when said locking assembly is in said locked and sealed state to form a fluid-tight seal between said free end surface of said second liquid carrier and said engagement surface of said plunger, said movable member of said clamp assembly being in said open state and released from engagement with the cylindrical portion of the second liquid-carrier when said locking assembly is in said unlocked state.

3. The coupling device of claim 2, wherein said at least one movable member comprises plural movable members.

4. The coupling device of claim 1, wherein said at least one movable member is pivotable between said open state and said closed state and vice versa.

5. The coupling device of claim 4 wherein said housing comprises a front section, and a rear section, with said handle being located at said rear section and being coupled to said plunger to slide said plunger from said first position to said second position and from said second position to said third position.

6. The coupling device of claim 5, wherein said locking assembly comprises a first surface on said plunger and a second surface on said plunger, said first surface being a cam surface configured to be engaged by a portion of said movable member to cause said moveable member to pivot to said closed position when said handle is slid along said longitudinal axis to said second position, said second surface being configured to be engaged by portions of said movable member when said handle is slid to said third position.

7. The coupling device of claim 1, additionally comprising a magnet associated with said movable member to normally bias said movable member in said open state.

8. The coupling device of claim 1, wherein said gasket ring is elastomeric.

9. The coupling device of claim 1, additionally comprising an O-ring configured for engaging a peripheral portion of the cylindrical end portion of the second liquid carrier when said plunger is in said second position.

10. The coupling device of claim 9, wherein said O-ring is located in recess in a front section of said housing.

11. The coupling device of claim 10 wherein said front section includes a portion having a passageway extending at least partially therethrough, said passageway having a cylindrical inner surface including at least one interior track, and wherein said plunger includes at least one follower pin configured to slide along said interior track as said plunger is moved by said handle from said first position to said second position and from said second position to said third position.

12. The coupling device of claim 11, wherein said interior track includes a first section and a second section, said first section being linear and extending along a longitudinal axis of said housing, said second section being spiral and extending at an acute angle to said longitudinal axis.

13. The coupling device of claim 12, additionally comprising a flexible finger configured to apply a bias to said follower pin.

14. The coupling device of claim 1, wherein said at least one movable member comprises plural movable members.

15. The coupling device of claim 14, wherein said plural movable members are pivotable between said open state and said closed state and vice versa.

16. The coupling device of claim 14, wherein said plural movable members are configured to move radially between said open state and said closed state and vice versa.

17. The coupling device of claim 16, wherein said engagement surface of said plural movable members comprise a serrated engagement surface for engaging the cylindrical portion of the second liquid-carrier.

18. The coupling device of claim 1, wherein said engagement surface of said at least one movable member comprises a serrated engagement surface for engaging the cylindrical portion of the second liquid-carrier.

19. The coupling device of claim 1, wherein said handle comprises plural sections connected together to form a member having a sidewall, and wherein said plunger includes a flange to which said plural sections are connected to form an end wall of said handle.

20. The coupling device of claim 1, wherein said engagement surface of said plunger comprises an annular wall of substantially the same size and shape as the free end surface of the cylindrical end portion of the second liquid-carrier and is aligned therewith.

* * * * *